United States Patent
Long et al.

(10) Patent No.: US 10,702,850 B2
(45) Date of Patent: Jul. 7, 2020

(54) ADSORBENTS WITH STEPPED ISOTHERMS FOR GAS STORAGE APPLICATIONS

(71) Applicant: The Regents of the University of California, Oakland, CA (US)

(72) Inventors: Jeffrey R. Long, Oakland, CA (US); Jarad A. Mason, Chicago, IL (US); Mercedes K. Taylor, Oakland, CA (US); Julia Oktawiec, Berkeley, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 15/766,495

(22) PCT Filed: Oct. 7, 2016

(86) PCT No.: PCT/US2016/055933
§ 371 (c)(1),
(2) Date: Apr. 6, 2018

(87) PCT Pub. No.: WO2017/062733
PCT Pub. Date: Apr. 13, 2017

(65) Prior Publication Data
US 2018/0297010 A1    Oct. 18, 2018

Related U.S. Application Data

(60) Provisional application No. 62/239,243, filed on Oct. 8, 2015.

(51) Int. Cl.
| | |
|---|---|
| *B01J 20/22* | (2006.01) |
| *B60K 15/03* | (2006.01) |
| *C01B 3/00* | (2006.01) |
| *C07F 15/02* | (2006.01) |
| *C07F 15/06* | (2006.01) |
| *B01J 20/28* | (2006.01) |
| *B01J 20/34* | (2006.01) |

(52) U.S. Cl.
CPC ....... *B01J 20/226* (2013.01); *B01J 20/28066* (2013.01); *B01J 20/3425* (2013.01); *B01J 20/3491* (2013.01); *B60K 15/03006* (2013.01); *C01B 3/0015* (2013.01); *C07F 15/025* (2013.01); *C07F 15/065* (2013.01); *B01D 2253/204* (2013.01); *B01D 2256/16* (2013.01); *B01D 2256/245* (2013.01); *B60K 2015/03315* (2013.01); *B60K 2015/03322* (2013.01)

(58) Field of Classification Search
None
See application file for complete search history.

(56) References Cited

U.S. PATENT DOCUMENTS

2014/0061540 A1    3/2014    Long et al.

FOREIGN PATENT DOCUMENTS

| WO | 2014/071351 A1 | 5/2014 |
| WO | 2014/074378 A1 | 5/2014 |

OTHER PUBLICATIONS

Dinca, Mircea. Microporous Metal—Organic Frameworks Incorporating 1,4-Benzeneditetrazolate: Syntheses, Structures, and Hydrogen Storage Properties. J. Am. Chem. Soc. 2006, 128, 8904-8913.*
Yang, Xi. Organogold oligomers: exploiting iClick and aurophilic cluster formation to prepare solution stable Au4 repeating units. Dalton Trans. 44 (2015), 11437-11443.*
Wittmann-Regis, Agnes, International Preliminary Report on Patentability and Written Opinion, PCT/US2016/055933, dated Apr. 19, 2018.
Copenheaver, Blaine R., International Search Report and Written Opinion, PCT/US2016/055933, dated Dec. 30, 2016.

* cited by examiner

*Primary Examiner* — Samantha L Shterengarts
(74) *Attorney, Agent, or Firm* — Gavilrovich, Dodd & Lindsey LLP

(57) ABSTRACT

The disclosure provides for adsorbents with stepped isotherms for gas storage applications.

19 Claims, 38 Drawing Sheets

H₂bdp expanded Co(bdp)

high $P_{CH_4}$ ⇌ low $P_{CH_4}$ collapsed Co(bdp)

50 bar CH₄ Fe(bdp)

DMF-solvated Fe(bdp)

ADSORBENTS WITH STEPPED ISOTHERMS FOR GAS STORAGE APPLICATIONS

CROSS REFERENCE TO RELATED APPLICATIONS

This application is a U.S. National Stage Application filed under 35 U.S.C. § 371 and claims priority to International Application No. PCT/US2016/055933, filed Oct. 7, 2016, which application claims priority under 35 U.S.C. § 119 from Provisional Application Ser. No. 62/239,243, filed Oct. 8, 2015, the disclosures of which are incorporated herein by reference.

STATEMENT OF GOVERNMENT SUPPORT

This invention was made with government support under grant numbers DE-AR0000251 awarded by the U.S. Department of Energy's Advanced Research Projects Agency-Energy (ARPA-E) and RQ12-334R09 awarded by the U.S. Department of Energy. The government has certain rights in the invention.

TECHNICAL FIELD

The disclosure provides for adsorbents with stepped isotherms for gas storage applications.

BACKGROUND

As a cleaner, cheaper, and more evenly distributed fuel, natural gas has significant environmental, economic, and political advantages over petroleum as a source of energy for the transportation sector. Despite the potential benefits of natural gas, its low volumetric energy density at ambient temperature and pressure presents substantial challenges, particularly for light-duty passenger vehicles that have little extra space available for on-board fuel storage. While many commercial fleets have converted to natural gas, the vast majority of passenger vehicles continue to burn gasoline, because consumers are unwilling to sacrifice driving range, space for passengers and cargo, and convenient access to refueling stations. Adsorbed natural gas (ANG) systems have the potential to eliminate these issues by storing high densities of methane within a porous material at ambient temperature and reduced pressures. Although activated carbons, zeolites, and metal-organic frameworks have been investigated extensively for natural gas storage there are still no commercially available ANG vehicles, owing to the challenges involved in designing a practical storage system with a high capacity of usable CH4, sufficient thermal management, and a low cost.

SUMMARY

Disclosed herein are new approaches to designing porous adsorbents for gas storage applications. Specifically, adsorbents with steps in their high-pressure gas adsorption isotherms are shown to have significant advantages in terms of maximizing the amount of gas that can be delivered during an adsorption/desorption cycle by: (1) significantly reducing the amount of gas adsorbed at the minimum desorption pressure of a particular application, (2) reducing the heat that is released during adsorption or refueling, and/or (3) reducing the cooling that takes place during desorption or discharge.

Provided herein are adsorbents for gas storage, wherein the adsorbents have a reversible phase transition that is used to maximize the deliverable capacity of a gas while also providing internal heat management during adsorption and desorption. In particular, the flexible metal-organic frameworks are shown to undergo a structural phase transition in response to specific $CH_4$ pressures, resulting in adsorption and desorption isotherms that feature a sharp step. Such behavior enables storage capacities that push beyond what has been achieved for classical adsorbents, while also reducing the amount of heat released during $CH_4$ adsorption and the impact of cooling during desorption. Significantly, the pressure and energy associated with the phase transition can be tuned either chemically or by application of mechanical pressure.

In a particular embodiment, the disclosure provides for an adsorbent having a stepped isotherm comprising a flexible metal-organic framework which has repeating cores comprising the formula M-L-M, wherein L is a linking moiety comprising a structure of Formula I:

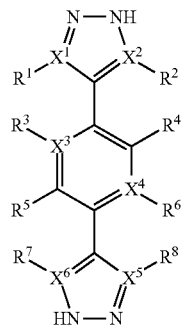

Formula I wherein, $X^1$-$X^6$ are each independently a C or a N; $R^1$-$R^2$ and $R^7$-$R^8$ are each independently selected from the group consisting of H, D, optionally substituted $C_1$-$C_3$ alkyl, optionally substituted $C_1$-$C_3$ alkenyl, halo, hydroxyl, aldehyde, carboxyl, amine, nitrile, azide, and nitro; and $R^3$-$R^6$ are each independently selected from the group consisting of H, D, FG, optionally substituted ($C_1$-$C_{12}$)alkyl, optionally substituted hetero-($C_1$-$C_{12}$)alkyl, optionally substituted ($C_2$-$C_{12}$)alkenyl, optionally substituted hetero-($C_1$-$C_{12}$)alkenyl, optionally substituted ($C_2$-$C_{12}$)alkynyl, optionally substituted hetero-($C_2$-$C_{12}$)alkynyl, optionally substituted cycloalkyl, optionally substituted cycloalkenyl, optionally substituted aryl, optionally substituted heterocycle, optionally substituted mixed ring system, —C($R^{11}$)$_3$, —CH($R^{11}$)$_2$, —CH$_2$$R^{11}$, —C($R^{12}$)$_3$, —CH($R^{12}$)$_2$, —CH$_2$$R^{12}$, —OC($R^{11}$)$_3$, OCH($R^{11}$)$_2$, —OCH$_2$$R^{11}$, —OC($R^{12}$)$_3$, —OCH($R^{12}$)$_2$, OCH$_2$$R^{12}$, and adjacent R groups can be linked together to form an optionally substituted ring; $R^{11}$ is selected from the group consisting of FG, optionally substituted ($C_1$-$C_{12}$)alkyl, optionally substituted hetero-($C_1$-$C_{12}$)alkyl, optionally substituted ($C_1$-$C_{12}$)alkenyl, optionally substituted hetero-($C_1$-$C_{12}$)alkenyl, optionally substituted ($C_1$-$C_{12}$)alkynyl, optionally substituted hetero-($C_1$-$C_{12}$) alkynyl; and $R^{12}$ is selected from the group consisting of cycloalkyl, aryl and heterocycle; and wherein M is selected from the group consisting of $Be^{2+}$, $Mg^{2+}$, $Ca^{2+}$, $Sr^{2+}$, $Ba^{2+}$, $Sc^{2+}$, $Y^{2+}$, $Ti^{2+}$, $Zr^{2+}$, $V^{2+}$, $Nb^{2+}$, $Ta^{2+}$, $Cr^{2+}$, $Mo^{2+}$, $W^{2+}$, $Mn^{2+}$, $Re^{2+}$, $Fe^{2+}$, $Ru^{2+}$, $Os^{2+}$, $Rh^{2+}$, $Ir^{2+}$, $Ni^{2+}$, $Pd^{2+}$, $Pt^{2+}$, $Cu^+$, $Ag^+$, $Au^{2+}$, $Hg^{2+}$, $Al^{2+}$, $In^{2+}$, $Si^{2+}$, $Ge^{2+}$, $Sn^{2+}$, $Pb^{2+}$, $As^{2+}$, $Te^{2+}$, $La^{2+}$, $Ce^{2+}$, $Pr^{2+}$, $Nd^{2+}$, $Sm^{2+}$, $Eu^{2+}$, $Gd^{2+}$, $Tb^{2+}$, $Db^{2+}$, $Tm^{2+}$, $Yb^{2+}$, $La^{2+}$, and combinations thereof, including any complexes which contain the metals or metal ions, as well as any corresponding metal salt counter-anions; and wherein tetrahedrally or pseudo-tetrahedrally M is bridged by $\mu^2$-pyrazolate units of L. In a specific embodiment, the ligand excludes alkyls at $R^3$-$R^6$. In a further embodiment, L comprises a structure of Formula I(a):

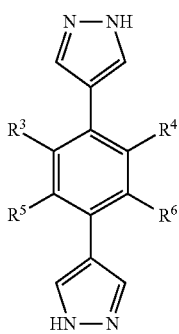

Formula I(a)

wherein, $R^3$-$R^6$ are each independently selected from the group consisting of H, D, halos, hydroxyls, carboxyls, carbonates, carboxylates, aldehydes, esters, ethers, amines, amides, azides, nitriles, sulfides, nitros, optionally substituted $(C_1$-$C_6)$alkyl, optionally substituted hetero-$(C_1$-$C_6)$alkyl, optionally substituted $(C_2$-$C_6)$alkenyl, optionally substituted hetero-$(C_1$-$C_6)$alkenyl, optionally substituted $(C_2$-$C_6)$alkynyl, optionally substituted hetero-$(C_2$-$C_6)$alkynyl. In yet a further embodiment, L comprises a structure of Formula I(b):

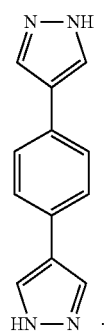

Formula I(b)

In another embodiment, M is selected from the group consisting of $Mg^{2+}$, $Ca^{2+}$, $Ba^{2+}$, $Zr^{2+}$, $V^{2+}$, $Cr^{2+}$, $Mo^{2+}$, $W^{2+}$, $Mn^{2+}$, $Fe^{2+}$, $Ni^{2+}$, $Cu^{2+}$, and $Ce^{2+}$. In a particular embodiment, M is $Fe^{2+}$.

In a certain embodiment, the disclosure provides for a gas storage device comprising an adsorbent having a stepped isotherm comprising a flexible metal-organic framework which has repeating cores comprising the formula M-L-M, wherein L is a linking moiety comprising a structure of Formula I:

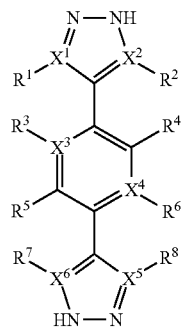

Formula I wherein, $X^1$-$X^6$ are each independently a C or a N; $R^1$-$R^2$ and $R^7$-$R^8$ are each independently selected from the group consisting of H, D, optionally substituted $C_1$-$C_3$ alkyl, optionally substituted $C_1$-$C_3$ alkenyl, halo, hydroxyl, aldehyde, carboxyl, amine, nitrile, azide, and nitro; and $R^3$-$R^6$ are each independently selected from the group consisting of H, D, FG, optionally substituted $(C_1$-$C_{12})$alkyl, optionally substituted hetero-$(C_1$-$C_{12})$alkyl, optionally substituted $(C_2$-$C_{12})$alkenyl, optionally substituted hetero-$(C_1$-$C_{12})$alkenyl, optionally substituted $(C_2$-$C_{12})$alkynyl, optionally substituted hetero-$(C_2$-$C_{12})$alkynyl, optionally substituted cycloalkyl, optionally substituted cycloalkenyl, optionally substituted aryl, optionally substituted heterocycle, optionally substituted mixed ring system, $-C(R^{11})_3$, $-CH(R^{11})_2$, $-CH_2R^{11}$, $-C(R^{12})_3$, $-CH(R^{12})_2$, $-CH_2R^{12}$, $-OC(R^{11})_3$, $OCH(R^{11})_2$, $-OCH_2R^{11}$, $-OC(R^{12})_3$, $-OCH(R^{12})_2$, $OCH_2R^{12}$, and adjacent R groups can be linked together to form an optionally substituted ring; $R^{11}$ is selected from the group consisting of FG, optionally substituted $(C_1$-$C_{12})$alkyl, optionally substituted hetero-$(C_1$-$C_{12})$alkyl, optionally substituted $(C_1$-$C_{12})$alkenyl, optionally substituted hetero-$(C_1$-$C_{12})$alkenyl, optionally substituted $(C_1$-$C_{12})$alkynyl, optionally substituted hetero-$(C_1$-$C_{12})$alkynyl; and $R^{12}$ is selected from the group consisting of cycloalkyl, aryl and heterocycle; and wherein M is selected from the group consisting of $Be^{2+}$, $Mg^{2+}$, $Ca^{2+}$, $Sr^{2+}$, $Ba^{2+}$, $Sc^{2+}$, $Y^{2+}$, $Co^{2+}$, $Ti^{2+}$, $Zr^{2+}$, $V^{2+}$, $Nb^{2+}$, $Ta^{2+}$, $Cr^{2+}$, $Mo^{2+}$, $W^{2+}$, $Mn^{2+}$, $Re^{2+}$, $Fe^{2+}$, $Ru^{2+}$, $Os^{2+}$, $Rh^{2+}$, $Ir^{2+}$, $Ni^{2+}$, $Pd^{2+}$, $Pt^{2+}$, $Cu^{2+}$, $Ag^{2+}$, $Au^{2+}$, $Hg^{2+}$, $Al^{2+}$, $In^{2+}$, $Si^{2+}$, $Ge^{2+}$, $Sn^{2+}$, $Pb^{2+}$, $As^{2+}$, $Te^{2+}$, $La^{2+}$, $Ce^{2+}$, $Pr^{2+}$, $Nd^{2+}$, $Sm^{2+}$, $Eu^{2+}$, $Gd^{2+}$, $Tb^{2+}$, $Db^{2+}$, $Tm^{2+}$, $Yb^{2+}$, $La^{2+}$, and combinations thereof, including any complexes which contain the metals or metal ions, as well as any corresponding metal salt counter-anions; and wherein tetrahedrally or pseudo-tetrahedrally M is bridged by $\mu^2$-pyrazolate units of L. In a further embodiment, wherein L is a linking moiety comprising a structure of Formula I(b):

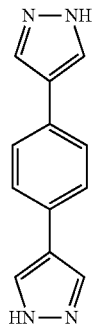

Formula I(b)

and wherein M is selected from the group consisting of $Mg^{2+}$, $Ca^{2+}$, $Ba^{2+}$, $Zr^{2+}$, $V^{2+}$, $Cr^{2+}$, $Co^{2+}$, $Mo^{2+}$, $W^{2+}$, $Mn^{2+}$, $Fe^{2+}$, $Ni^{2+}$, $Cu^{2+}$, and $Ce^{2+}$.

In a certain embodiment, the adsorbent of the disclosure is characterized by having a volumetric usable capacity is (i) not significantly reduced when there is a minimum desorption pressure requirement, (ii) not significantly reduced due to heat released during adsorption of the one or more gases to the adsorbent, and/or (iii) is not significantly reduced due to cooling resulting from de-adsorption of the one or more gases from the adsorbent. In a further embodiment, an adsorbent of the disclosure has a minimum desorption pressure requirement around 5.8 bar and one or more gases is a natural gas. In another embodiment, the device stores one or more gases under an adsorption pressure of greater than 1 bar (e.g., between 1 and 100 bar; about 35 to about 65 bar for natural gas). The adsorption pressure will be dependent upon the gas to be stored and can be empirically determined by one of skill in the art. In a further embodiment, the one or more gases are selected from natural gas, hydrogen or methane.

In a particular embodiment, the disclosure provides for a gas storage device comprising an adsorbent with a stepped isotherm, wherein the adsorbent comprises a flexible metal organic framework with a stepped isotherm, wherein the framework is capable of undergoing a phase change accompanied by significant expansion of volume based upon physical and chemical stimuli. In another embodiment, the disclosure provides for a gas storage device comprising an adsorbent with a stepped isotherm, wherein the adsorbent comprises a porous rigid framework material which comprises dynamic functional groups. In a certain embodiment, the disclosure provides for a gas storage device comprising an adsorbent with a stepped isotherm that is a fuel tank or fuel cylinder. In a further embodiment, the fuel tank or fuel cylinder delivers stored natural gas, methane or hydrogen to a combustion engine. In yet a further embodiment, an automobile, bus, or truck comprises a gas storage device disclosed herein.

In a particular embodiment, the disclosure further provides a method to reversibly store one or more gases comprising contacting the one or more gases with an adsorbent having a stepped isotherm comprising a flexible metal-organic framework which has repeating cores comprising the formula M-L-M, wherein L is a linking moiety comprising a structure of Formula I:

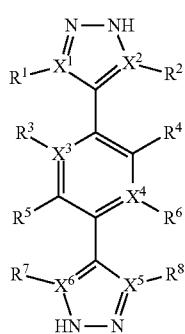

Formula I wherein, $X^1$-$X^6$ are each independently a C or a N; $R^1$-$R^2$ and $R^7$-$R^8$ are each independently selected from the group consisting of H, D, optionally substituted $C_1$-$C_3$ alkyl, optionally substituted $C_1$-$C_3$ alkenyl, halo, hydroxyl, aldehyde, carboxyl, amine, nitrile, azide, and nitro; and $R^3$-$R^6$ are each independently selected from the group consisting of H, D, FG, optionally substituted $(C_1$-$C_{12})$alkyl, optionally substituted hetero-$(C_1$-$C_{12})$alkyl, optionally substituted $(C_2$-$C_{12})$alkenyl, optionally substituted hetero-$(C_1$-$C_{12})$alkenyl, optionally substituted $(C_2$-$C_{12})$alkynyl, optionally substituted hetero-$(C_2$-$C_{12})$alkynyl, optionally substituted cycloalkyl, optionally substituted cycloalkenyl, optionally substituted aryl, optionally substituted heterocycle, optionally substituted mixed ring system, —$C(R^{11})_3$, —$CH(R^{11})_2$, —$CH_2R^{11}$, —$C(R^{12})_3$, —$CH(R^{12})_2$, —$CH_2R^{12}$, —$OC(R^{11})_3$, $OCH(R^{11})_2$, —$OCH_2R^{11}$, —$OC(R^{12})_3$, —$OCH(R^{12})_2$, $OCH_2R^{12}$, and adjacent R groups can be linked together to form an optionally substituted ring; $R^{11}$ is selected from the group consisting of FG, optionally substituted $(C_1$-$C_{12})$alkyl, optionally substituted hetero-$(C_1$-$C_{12})$alkyl, optionally substituted $(C_1$-$C_{12})$alkenyl, optionally substituted hetero-$(C_1$-$C_{12})$alkenyl, optionally substituted $(C_1$-$C_{12})$alkynyl, optionally substituted hetero-$(C_1$-$C_{12})$alkynyl; and $R^{12}$ is selected from the group consisting of cycloalkyl, aryl and heterocycle; and wherein M is selected from the group consisting of $Be^{2+}$, $Mg^{2+}$, $Ca^{2+}$, $Sr^{2+}$, $Ba^{2+}$, $Sc^{2+}$, $Y^{2+}$, $Co^{2+}$, $Ti^{2+}$, $Zr^{2+}$, $V^{2+}$, $Nb^{2+}$, $Ta^{2+}$, $Cr^{2+}$, $Mo^{2+}$, $W^{2+}$, $Mn^{2+}$, $Re^{2+}$, $Fe^{2+}$, $Ru^{2+}$, $Os^{2+}$, $Rh^{2+}$, $Ir^{2+}$, $Ni^{2+}$, $Pd^{2+}$, $Pt^{2+}$, $Cu^{2+}$, $Ag^{2+}$, $Au^{2+}$, $Hg^{2+}$, $Al^{2+}$, $In^{2+}$, $Si^{2+}$, $Ge^{2+}$, $Sn^{2+}$, $Pb^{2+}$, $As^{2+}$, $Te^{2+}$, $La^{2+}$, $Ce^{2+}$, $Pr^{2+}$, $Nd^{2+}$, $Sm^{2+}$, $Eu^{2+}$, $Gd^{2+}$, $Tb^{2+}$, $Db^{2+}$, $Tm^{2+}$, $Yb^{2+}$, $La^{2+}$, and combinations thereof, including any complexes which contain the metals or metal ions, as well as any corresponding metal salt counter-anions; and wherein tetrahedrally or pseudo-tetrahedrally M is bridged by $\mu^2$-pyrazolate units of L. In a further embodiment, L comprises a structure of Formula I(a):

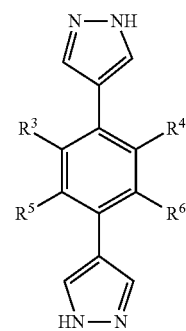

Formula I(a)

wherein, $R^3$-$R^6$ are each independently selected from the group consisting of H, D, halos, hydroxyls, carboxyls, carbonates, carboxylates, aldehydes, esters, ethers, amines, amides, azides, nitriles, sulfides, nitros, optionally substituted $(C_1$-$C_6)$alkyl, optionally substituted hetero-$(C_1$-$C_6)$alkyl, optionally substituted $(C_2$-$C_6)$alkenyl, optionally substituted hetero-$(C_1$-$C_6)$alkenyl, optionally substituted $(C_2$-$C_6)$alkynyl, optionally substituted hetero-$(C_2$-$C_6)$alkynyl. In yet a further embodiment, L comprises a structure of Formula I(b):

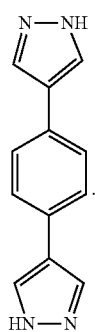

Formula I(b)

In another embodiment, M is selected from the group consisting of $Mg^{2+}$, $Ca^{2+}$, $Ba^{2+}$, $Zr^{2+}$, $V^{2+}$, $Cr^{2+}$, $Mo^{2+}$, $W^{2+}$, $Mn^{2+}$, $Fe^{2+}$, $Ni^{2+}$, $Cu^{2+}$, $Co^{2+}$ and $Ce^{2+}$. In a certain embodiment, M is $Fe^{2+}$ or $Co^{2+}$. In a particular embodiment, the one or more gases are selected from natural gas, hydrogen or methane.

DETAILED DESCRIPTION

Figure 1:
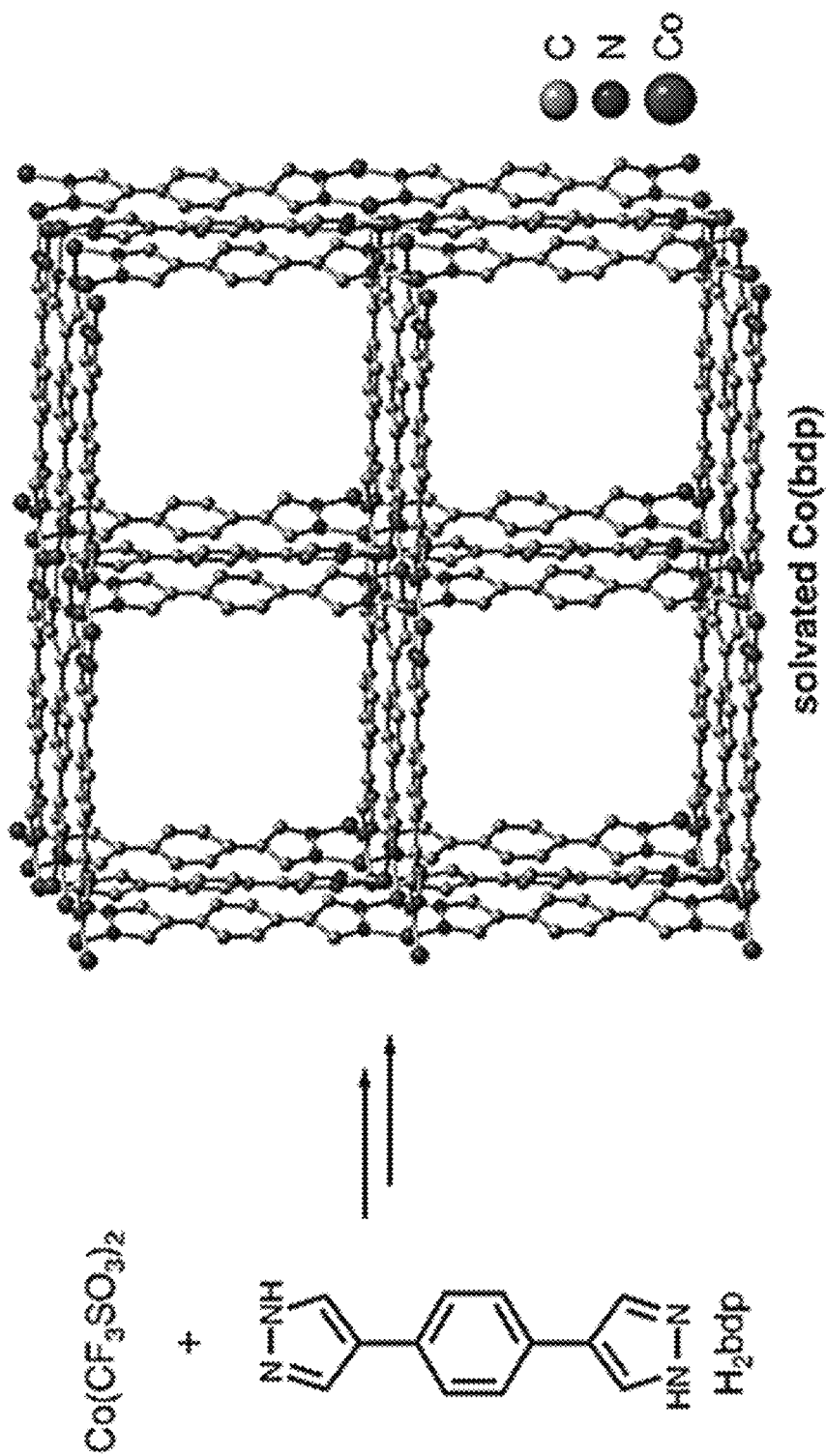
FIG. 1 presents the synthesis of a MOF of the disclosure, Co(bdp) ($bdp^{2-}$=1,4-benzenedipyrazole), that has stepped adsorption isotherms. Gray, blue, and purple spheres represent C, N, and Co atoms, respectively; H atoms have been omitted for clarity.

As used herein and in the appended claims, the singular forms "a," "an," and "the" include plural referents unless the context clearly dictates otherwise. Thus, for example, reference to "a linking moiety" includes a plurality of such linking moieties and reference to "the framework" includes reference to one or more frameworks and equivalents thereof known to those skilled in the art, and so forth.

Also, the use of "or" means "and/or" unless indicated otherwise, such as by the use of the term "either." Similarly, "comprise," "comprises," "comprising" "include," "includes," and "including" are interchangeable and not intended to be limiting.

It is to be further understood that where descriptions of various embodiments use the term "comprising," those skilled in the art would understand that in some specific instances, an embodiment can be alternatively described using language "consisting essentially of" or "consisting of."

All publications mentioned herein are incorporated by reference in full for the purpose of describing and disclosing methodologies that might be used in connection with the description herein. Moreover, with respect to any term that is presented in the publications that is similar to, or identical with, a term that has been expressly defined in this disclosure, the definition of the term as expressly provided in this disclosure will control in all respects.

Unless defined otherwise, all technical and scientific terms used herein have the same meaning as commonly understood to one of ordinary skill in the art. Although many methods and reagents similar or equivalent to those described herein, the exemplary methods and materials are presented herein.

The term "alkyl", refers to an organic group that is comprised of carbon and hydrogen atoms that contain single covalent bonds between carbons. Typically, an "alkyl" as used in this disclosure, refers to an organic group that contains 1 to 30 carbon atoms, unless stated otherwise. Where if there is more than 1 carbon, the carbons may be connected in a linear manner, or alternatively if there are more than 2 carbons then the carbons may also be linked in a branched fashion so that the parent chain contains one or more secondary, tertiary, or quaternary carbons. An alkyl may be substituted or unsubstituted, unless stated otherwise.

The term "alkenyl", refers to an organic group that is comprised of carbon and hydrogen atoms that contains at least one double covalent bond between two carbons. Typically, an "alkenyl" as used in this disclosure, refers to organic group that contains 1 to 30 carbon atoms, unless stated otherwise. While a $C_1$-alkenyl can form a double bond to a carbon of a parent chain, an alkenyl group of three or more carbons can contain more than one double bond. It certain instances the alkenyl group will be conjugated, in other cases an alkenyl group will not be conjugated, and yet other cases the alkenyl group may have stretches of conjugation and stretches of nonconjugation. Additionally, if there is more than 1 carbon, the carbons may be connected in a linear manner, or alternatively if there are more than 3 carbons then the carbons may also be linked in a branched fashion so that the parent chain contains one or more secondary, tertiary, or quaternary carbons. An alkenyl may be substituted or unsubstituted, unless stated otherwise.

The term "alkynyl", refers to an organic group that is comprised of carbon and hydrogen atoms that contains a triple covalent bond between two carbons. Typically, an "alkynyl" as used in this disclosure, refers to organic group that contains 1 to 30 carbon atoms, unless stated otherwise. While a $C_1$-alkynyl can form a triple bond to a carbon of a parent chain, an alkynyl group of three or more carbons can contain more than one triple bond. Where if there is more than 1 carbon, the carbons may be connected in a linear manner, or alternatively if there are more than 4 carbons then the carbons may also be linked in a branched fashion so that the parent chain contains one or more secondary, tertiary, or quaternary carbons. An alkynyl may be substituted or unsubstituted, unless stated otherwise.

The term "aryl", as used in this disclosure, refers to a conjugated planar ring system with delocalized pi electron clouds that contain only carbon as ring atoms. An "aryl" for the purposes of this disclosure encompass from 1 to 12 aryl rings wherein when the aryl is greater than 1 ring the aryl rings are joined so that they are linked, fused, or a combination thereof. An aryl may be substituted or unsubstituted, or in the case of more than one aryl ring, one or more rings may be unsubstituted, one or more rings may be substituted, or a combination thereof. Examples of aryls, include but are not limited to, phenyl and napthylene, and anthracene.

The term "cycloalkyl", as used in this disclosure, refers to an alkyl that contains at least 3 carbon atoms but no more than 12 carbon atoms connected so that it forms a ring. A "cycloalkyl" for the purposes of this disclosure encompass from 1 to 12 cycloalkyl rings, wherein when the cycloalkyl is greater than 1 ring, then the cycloalkyl rings are joined so that they are linked, fused, or a combination thereof. A cycloalkyl may be substituted or unsubstituted, or in the case of more than one cycloalkyl ring, one or more rings may be unsubstituted, one or more rings may be substituted, or a combination thereof.

The term "cycloalkenyl", as used in this disclosure, refers to an alkene that contains at least 3 carbon atoms but no more than 12 carbon atoms connected so that it forms a ring. A "cycloalkenyl" for the purposes of this disclosure encompass from 1 to 12 cycloalkenyl rings, wherein when the cycloalkenyl is greater than 1 ring, then the cycloalkenyl rings are joined so that they are linked, fused, or a combination thereof. A cycloalkenyl may be substituted or unsubstituted, or in the case of more than one cycloalkenyl ring, one or more rings may be unsubstituted, one or more rings may be substituted, or a combination thereof.

The term "framework" as used herein, refers to a highly ordered structure comprised of secondary building units (SBUs) that can be linked together in defined, repeated and controllable manner, such that the resulting structure is characterized as being porous, periodic and crystalline. Typically, "frameworks" are two dimensional (2D) or three dimensional (3D) structures. Examples of "frameworks" include, but are not limited to, "metal-organic frameworks" or "MOFs", "zeolitic imidazolate frameworks" or "ZIFs", or "covalent organic frameworks" or "COFs". While MOFs and ZIFs comprise SBUs of metals or metal ions linked together by forming covalent bonds with linking clusters on organic linking moieties, COFs are comprised of SBUs of organic linking moieties that are linked together by forming covalent bonds via linking clusters. As used herein, "framework" does not refer to coordination complexes or metal complexes. Coordination complexes or metal complexes are comprised of a relatively few number of centrally coordinated metal ions (i.e., less than 4 central ions) that are coordinately bonded to molecules or ions, also known as ligands or complexing agents. By contrast, "frameworks" are highly ordered and extended structures that are not based upon a centrally coordinated ion, but involve many repeated secondary building units (SBUs) linked together (e.g., >10, >100, >1000, >10,000, etc.). Accordingly, "frameworks" are orders of magnitude much larger than coordination complexes and have different structural and chemical properties due to the framework's open and ordered structure.

The term "functional group" or "FG" refers to specific groups of atoms within molecules that are responsible for the characteristic chemical reactions of those molecules. While the same functional group will undergo the same or similar chemical reaction(s) regardless of the size of the molecule it is a part of, its relative reactivity can be modified by nearby functional groups. The atoms of functional groups are linked to each other and to the rest of the molecule by covalent bonds. Examples of FGs that can be used in this disclosure, include, but are not limited to, substituted or unsubstituted alkyls, substituted or unsubstituted alkenyls, substituted or unsubstituted alkynyls, substituted or unsubstituted aryls, substituted or unsubstituted hetero-alkyls, substituted or unsubstituted hetero-alkenyls, substituted or unsubstituted hetero-alkynyls, substituted or unsubstituted cycloalkyls, substituted or unsubstituted cycloalkenyls, substituted or unsubstituted hetero-aryls, substituted or unsubstituted heterocycles, halos, hydroxyls, anhydrides, carbonyls, carboxyls, carbonates, carboxylates, aldehydes, haloformyls, esters, hydroperoxy, peroxy, ethers, orthoesters, carboxamides, amines, amides, imines, imides, azides, azos, cyanates, isocyanates, nitrates, nitriles, isonitriles, nitrosos, nitros, nitrosooxy, pyridyls, sulfhydryls, sulfides, disulfides, sulfinyls, sulfos, thiocyanates, isothiocyanates, carbonothioyls, phosphinos, phosphonos, phosphates, $Si(OH)_3$, $Ge(OH)_3$, $Sn(OH)_3$, $Si(SH)_4$, $Ge(SH)_4$, $AsO_3H$, $AsO_4H$, $P(SH)_3$, $As(SH)_3$, $SO_3H$, $Si(OH)_3$, $Ge(OH)_3$, $Sn(OH)_3$, $Si(SH)_4$, $Ge(SH)_4$, $Sn(SH)_4$, $AsO_3H$, $AsO_4H$, $P(SH)_3$, and $As(SH)_3$. In a particular embodiment, a functional group refers to halos, hydroxyls, carboxyls, carbonates, carboxylates, aldehydes, esters, ethers, amines, amides, azides, nitriles, sulfides, and nitros.

A "gaseous composition" refers to a natural gas (elemental gases and compound gases), artificial gases (e.g., synthetic gases), a substantially purified gas or a purified gas. Exemplary elemental gases include hydrogen, oxygen, and nitrogen and mixtures thereof. Compound gases include, for example, carbon-dioxide, methane, sulfur dioxide and ammonia.

The term "heterocycle", as used in this disclosure, refers to ring structures that contain at least 1 noncarbon ring atom. A "heterocycle" for the purposes of this disclosure encompass from 1 to 12 heterocycle rings wherein when the heterocycle is greater than 1 ring the heterocycle rings are joined so that they are linked, fused, or a combination thereof. A heterocycle may be a hetero-aryl or nonaromatic, or in the case of more than one heterocycle ring, one or more rings may be nonaromatic, one or more rings may be hetero-aryls, or a combination thereof. A heterocycle may be substituted or unsubstituted, or in the case of more than one heterocycle ring one or more rings may be unsubstituted, one or more rings may be substituted, or a combination thereof. Typically, the noncarbon ring atom is N, O, S, Si, Al, B, or P. In case where there is more than one noncarbon ring atom, these noncarbon ring atoms can either be the same element, or combination of different elements, such as N and O. Examples of heterocycles include, but are not limited to: a monocyclic heterocycle such as, aziridine, oxirane, thiirane, azetidine, oxetane, thietane, pyrrolidine, pyrroline, imidazolidine, pyrazolidine, pyrazoline, dioxolane, sulfolane 2,3-dihydrofuran, 2,5-dihydrofuran tetrahydrofuran, thiophane, piperidine, 1,2,3,6-tetrahydro-pyridine, piperazine, morpholine, thiomorpholine, pyran, thiopyran, 2,3-dihydropyran, tetrahydropyran, 1,4-dihydropyridine, 1,4-dioxane, 1,3-dioxane, dioxane, homopiperidine, 2,3,4,7-tetrahydro-1H-azepine homopiperazine, 1,3-dioxepane, 4,7-dihydro-1,3-dioxepin, and hexamethylene oxide; and polycyclic heterocycles such as, indole, indoline, isoindoline, quinoline, tetrahydroquinoline, isoquinoline, tetrahydroisoquinoline, 1,4-benzodioxan, coumarin, dihydrocoumarin, benzofuran, 2,3-dihydrobenzofuran, isobenzofuran, chromene, chroman, isochroman, xanthene, phenoxathiin, thianthrene, indolizine, isoindole, indazole, purine, phthalazine, naphthyridine, quinoxaline, quinazoline, cinnoline, pteridine, phenanthridine, perimidine, phenanthroline, phenazine, phenothiazine, phenoxazine, 1,2-benzisoxazole, benzothiophene, benzoxazole, benzthiazole, benzimidazole, benztriazole, thioxanthine, carbazole, carboline, acridine, pyrolizidine, and quinolizidine. In addition to the polycyclic heterocycles described above, heterocycle includes polycyclic heterocycles wherein the ring fusion between two or more rings includes more than one bond common to both rings and more than two atoms common to both rings. Examples of such bridged heterocycles include quinuclidine, diazabicyclo[2.2.1]heptane and 7-oxabicyclo[2.2.1]heptane.

The terms "heterocyclic group", "heterocyclic moiety", "heterocyclic", or "heterocyclo" used alone or as a suffix or prefix, refers to a heterocycle that has had one or more hydrogens removed therefrom.

The term "hetero-" when used as a prefix, such as, hetero-alkyl, hetero-alkenyl, hetero-alkynyl, or hetero-hydrocarbon, for the purpose of this disclosure refers to the specified hydrocarbon having one or more carbon atoms replaced by non-carbon atoms as part of the parent chain. Examples of such non-carbon atoms include, but are not limited to, N, O, S, Si, Al, B, and P. If there is more than one non-carbon atom in the hetero-based parent chain then this atom may be the same element or may be a combination of different elements, such as N and O.

The term "hydrocarbons" refers to groups of atoms that contain only carbon and hydrogen. Examples of hydrocarbons that can be used in this disclosure include, but are not limited to, alkanes, alkenes, alkynes, arenes, and benzyls. In a particular embodiment, the hydrocarbon is an aromatic hydrocarbon.

The term "mixed ring system" refers to optionally substituted ring structures that contain at least two rings, and wherein the rings are joined together by linking, fusing, or a combination thereof. A mixed ring system comprises a combination of different ring types, including cycloalkyl, cycloalkenyl, aryl, and heterocycle.

"Natural gas" refers to a multi-component gas obtained from a, for example, a crude oil well (associated gas) or from a subterranean gas-bearing formation (non-associated gas). The composition and pressure of natural gas can vary significantly. A typical natural gas stream contains methane as a significant component. The natural gas will also typically contain ethane, higher molecular weight hydrocarbons, one or more acid gases (such as carbon dioxide, hydrogen sulfide, carbonyl sulfide, carbon disulfide, and mercaptans), and minor amounts of contaminants such as water, nitrogen, iron sulfide, wax, and crude oil.

Sorption is a general term that refers to a process resulting in the association of atoms or molecules with a target material. Sorption includes both adsorption and absorption. Absorption refers to a process in which atoms or molecules move into the bulk of a porous material, such as the absorption of water by a sponge. Adsorption refers to a process in which atoms or molecules move from a bulk phase (that is, solid, liquid, or gas) onto a solid or liquid surface. The term adsorption may be used in the context of solid surfaces in contact with liquids and gases. Molecules that have been adsorbed onto solid surfaces are referred to generically as adsorbates, and the surface to which they are adsorbed as the substrate or adsorbent. Adsorption is usually described through isotherms, that is, functions which connect the amount of adsorbate on the adsorbent, with its pressure (if gas) or concentration (if liquid). In general, desorption refers to the reverse of adsorption, and is a process in which molecules adsorbed on a surface are transferred back into a bulk phase.

The term "substituted" with respect to hydrocarbons, heterocycles, and the like, refers to structures wherein the parent chain contains one or more substituents.

The term "substituent" refers to an atom or group of atoms substituted in place of a hydrogen atom. For purposes of this disclosure, a substituent would include deuterium atoms.

The term "unsubstituted" with respect to hydrocarbons, heterocycles, and the like, refers to structures wherein the parent chain contains no substituents.

There are several problems with natural gas as a vehicle fuel. Natural gas requires a lot more space in a vehicle than gasoline or diesel, because there's less energy in a similar quantity. And since it's a gas, it must be stored at high pressure (3,600 PSI, like a SCUBA tank) to get enough onboard the vehicle. And since it's stored at a high pressure, the tank must be larger to be strong enough to be safer, resulting in big, bulky tanks that take up space, sacrificing storage while still not giving the range of typical vehicles.

Figure 22A:
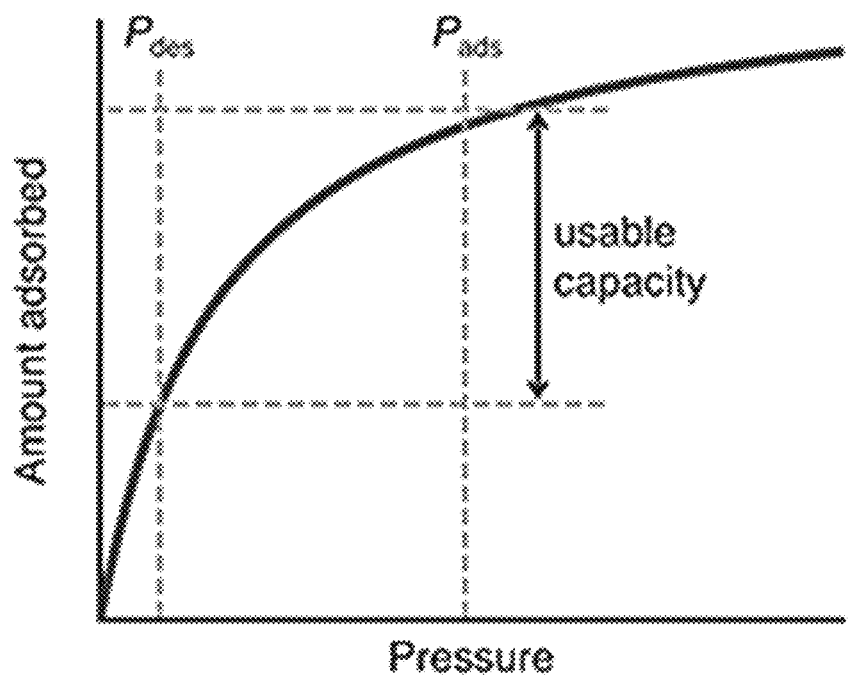
FIG. 22A-D presents high-pressure $CH_4$ adsorption isotherms. The usable capacity is compared for an idealized adsorbent that exhibits a classical Langmuir-type adsorption isotherm (A) and an "S-shaped", or stepped, adsorption isotherm (B). Total $CH_4$ adsorption isotherms for Co(bdp) (C) and Fe(bdp) (D) at 25° C., where a minimum desorption pressure of 5.8 bar and a maximum adsorption pressure of 35 bar are indicated by dashed gray lines. Filled circles represent adsorption, while empty circles represent desorption.
Figure 22B:
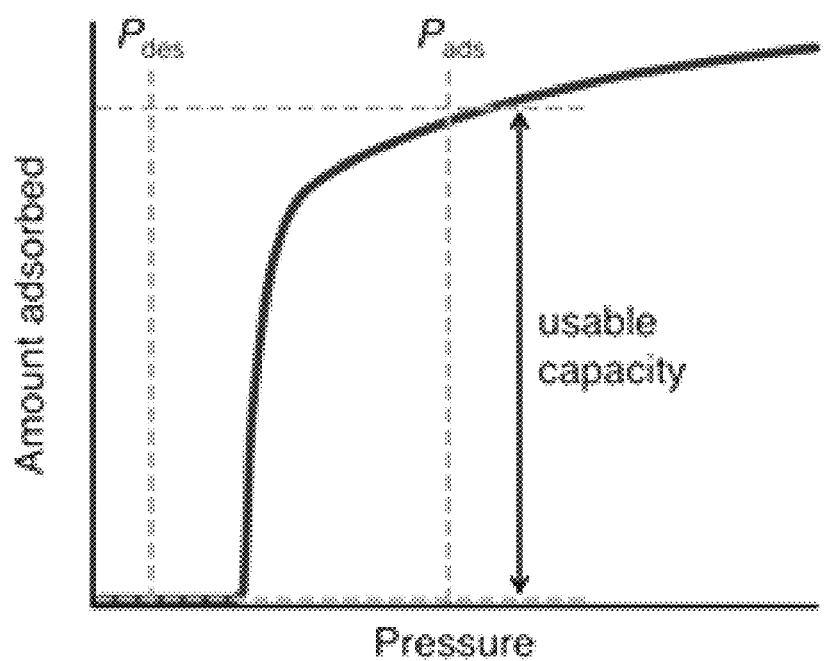

The driving range of an ANG vehicle is determined primarily by the volumetric usable $CH_4$ capacity of the adsorbent, which is defined as the difference between the amount of $CH_4$ adsorbed at the target storage pressure, generally 35-65 bar, and the amount that is still adsorbed at the lowest desorption pressure, generally 5.8 bar. With only a few exceptions, nearly all adsorbents that have been investigated in the context of natural gas storage exhibit classical Langmuir-type adsorption isotherms, where the amount of $CH_4$ adsorbed increases continuously, and with decreasing steepness, as the pressure is increased (see FIG. 22A). Despite a significant research effort, it has therefore proved difficult to develop adsorbents with the higher usable $CH_4$ capacities needed for a commercially viable ANG storage system. In pursuit of a new strategy for boosting usable capacity, an adsorbent was designed with an "S-shaped" or stepped $CH_4$ adsorption isotherm, where the amount of $CH_4$ adsorbed would be small at low pressures but rise sharply just before the desired storage pressure (see FIG. 22B). Intriguingly, stepped isotherms have been observed for many flexible metal-organic frameworks that exhibit "gate-opening" behavior, whereby a nonporous structure expands to a porous structure after a certain threshold gas pressure is reached, but none of these materials have exhibited characteristics beneficial for $CH_4$ storage applications. If, however, a responsive adsorbent could be designed to expand to store a high density of $CH_4$ at 35-65 bar, and collapse to push out all adsorbed $CH_4$ at a pressure near 5.8 bar, then it should be possible to reach much higher usable capacities than have been realized for classical adsorbents.

In many cases, it is beneficial to lower the pressure or raise the temperature needed to store a given amount of gas through the use of an adsorbent. While a significant effort has been directed toward developing adsorbents such as metal-organic frameworks and activated carbons with high gas capacities at specific storage pressures, classical adsorbed gas storage systems typically have several disadvantages over compressed gas storage: (i) the usable capacity of the adsorbent is reduced when an application imposes a minimum desorption pressure, (ii) the usable capacity of the adsorbent is reduced due to the heat that is released during adsorption, (iii) the usable capacity of the adsorbent is reduced due to the cooling that occurs during desorption, and (iv) the volumetric usable capacity of the adsorbent is reduced due to interparticle void spaces that form when packing adsorbent particles inside a storage tank. The adsorbents with stepped isotherms disclosed herein overcome all of these issues.

The metal-organic framework Co(bdp) was selected as a potential responsive adsorbent for methane storage, owing to its large internal surface area and its previously demonstrated high degree of flexibility. In its solvated form, this framework features one-dimensional chains of tetrahedral $Co^{2+}$ cations bridged by $\mu^2$-pyrazolate units to form 13 Å-wide square channels. Notably, the $N_2$ adsorption isotherm of the evacuated framework at 77 K exhibits five distinct steps, which have been attributed to four structural transitions as the framework progresses from a collapsed phase with minimal porosity to a maximally expanded phase with a Langmuir surface area of 2911 $m^2/g$.

Figure 11:
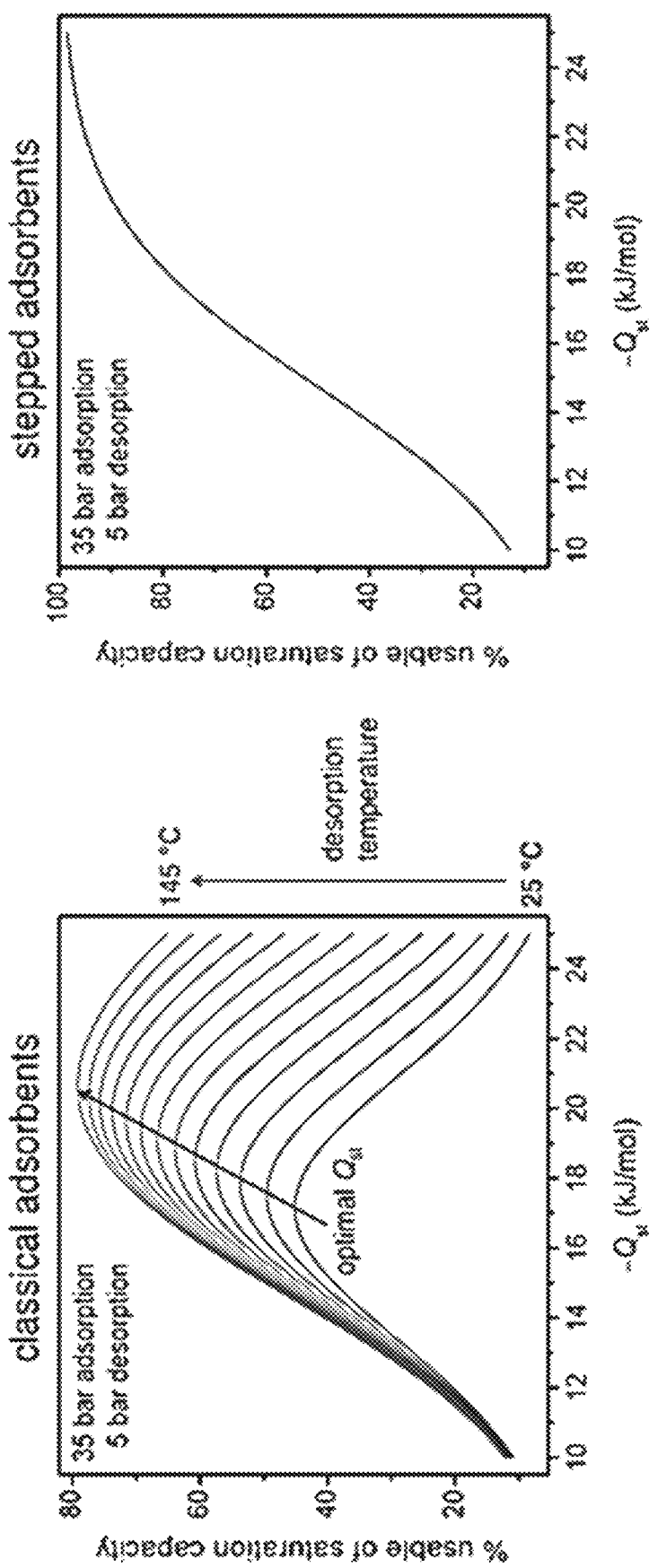
FIG. 11 presents: left, classical adsorbents will always have an optimal binding enthalpy for a given set of adsorption-desorption conditions, as long as the minimum desorption pressure is greater than zero. Right, adsorbents with stepped isotherms do not have an optimal binding enthalpy-stronger binding sites in the post-step phase of the adsorbent will always lead to higher usable capacities.

By comparing the high-pressure $CH_4$ adsorption isotherms of Co(bdp) and Cu-BTC metal-organic framework (HKUST-1), adsorbents with stepped isotherms of the disclosure were found to have several advantages over classical adsorbents. First, so long as the step in the adsorption isotherm is at a pressure above the minimum desorption pressure for an application, the usable capacity of the adsorbent can be significantly enhanced. Whenever there is a minimum desorption pressure that is greater than zero, classical adsorbents will always have an optimal gas binding energy for every set of adsorption/desorption temperatures and pressures (see FIG. 11). If the binding energy is too low, the capacity of the adsorbent will be small; however, if the binding energy is too high, then a large amount of gas will be adsorbed at low pressures, which will reduce the usable capacity. For example, the optimal binding energy for $CH_4$ storage with 35 bar adsorption and 5.8 bar desorption at 25° C. is calculated to be −17 kJ/mol. This optimal binding energy makes it challenging to design adsorbents with higher volumetric usable capacities, as adsorption sites with high binding energies are typically required to increase the density of gas molecules stored inside an adsorbent. In contrast, adsorbents with stepped isotherms do not have an optimal binding energy. Increasing the binding energy of the adsorption sites that are present after the step will always increase the usable capacity of the adsorbents (see FIG. 11). As a result, dramatically higher usable capacities are possible for adsorbents with stepped isotherms disclosed herein. This was demonstrated with Co(bdp), where the step in the high-pressure $CH_4$ adsorption isotherm leads to a higher usable capacity than that of the classical adsorbent HKUST-1, and this concept provides a general strategy to realize adsorbents with dramatically increased volumetric $CH_4$ usable capacities.

It is important to note that almost all reported volumetric uptakes for metal-organic frameworks, including those presented here, are calculated using the density of a perfect single crystal and represent a maximum achievable volumetric capacity. In reality, metal-organic frameworks synthesized on a large enough scale to fill a storage tank will be powders that contain a significant amount of empty space between particles. This interparticle void space results in a much lower density, and consequently a lower volumetric $CH_4$ capacity, for a bulk powder than that calculated for a single crystal. In order to minimize the losses in capacity that result from packing classical adsorbent particles inside a storage tank, it will be likely be necessary to compact the material in some fashion. External compaction reduces the interparticle void space and increases the bulk density of the powder, but it often causes partial or complete collapse of framework pores.

The adsorbents with stepped isotherms of the disclosure (e.g., Co(bdp)) can undergo a phase change which is accompanied by a significant expansion in volume offer significant advantages in terms of maximizing packing efficiency without the need for external compaction. As the dense adsorbent particles expand, the outward force of the expanding particles likely result in "internal compaction", leading to a more optimized packing of expanded adsorbent particles than would be expected from simply filling a tank with classical (or already expanded) particles. It is also likely that the pressure of the isotherm step can be tuned by controlling the amount of free volume in the storage vessel or by controlling the applied external force used to compact the adsorbent inside the storage vessel.

In addition to increasing the usable capacity, adsorbents with stepped isotherms disclosed herein can significantly reduce the thermal management requirements of gas storage systems by decreasing the magnitude of both the heats of adsorption and desorption. While storing gas, the exothermic adsorption process leads to an increase in the temperature of the adsorbent, reducing the amount of gas that can be stored. While discharging gas, the endothermic desorption process leads to a decrease in the temperature of the adsorbent, reducing the amount of gas that can be delivered. In the absence of a thermal management system, which would add significant complexity and cost to a gas storage system, both of these effects will lead to a decreased usable capacity.

Figure 12:
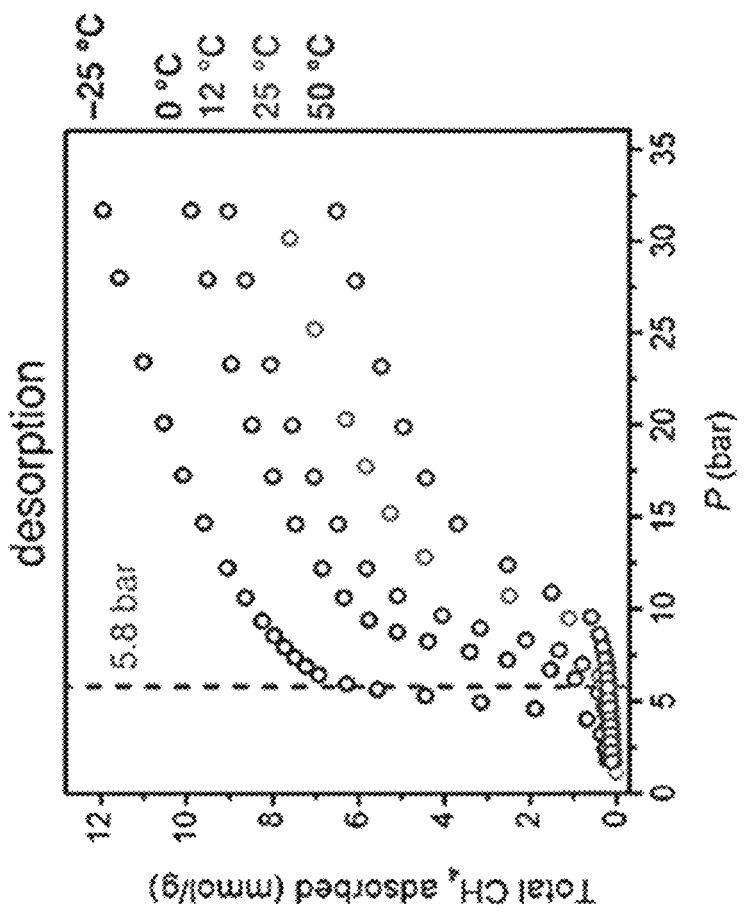
FIG. 12 presents the total $CH_4$ adsorption (left) and desorption (right) isotherms for Co(bdp) at −25, 0, 12, 25, and 50° C.
Figure 12:
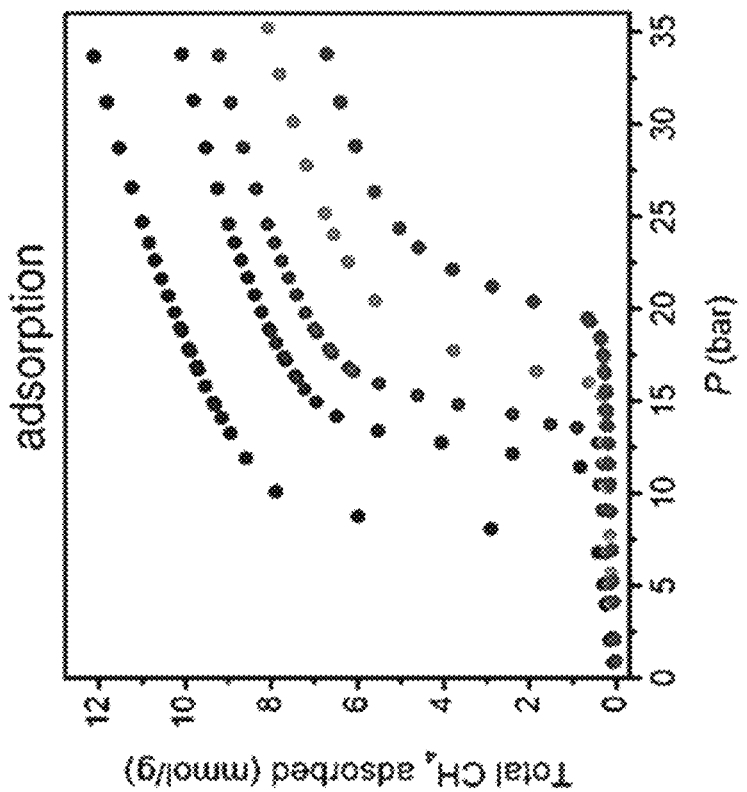
Figure 13:
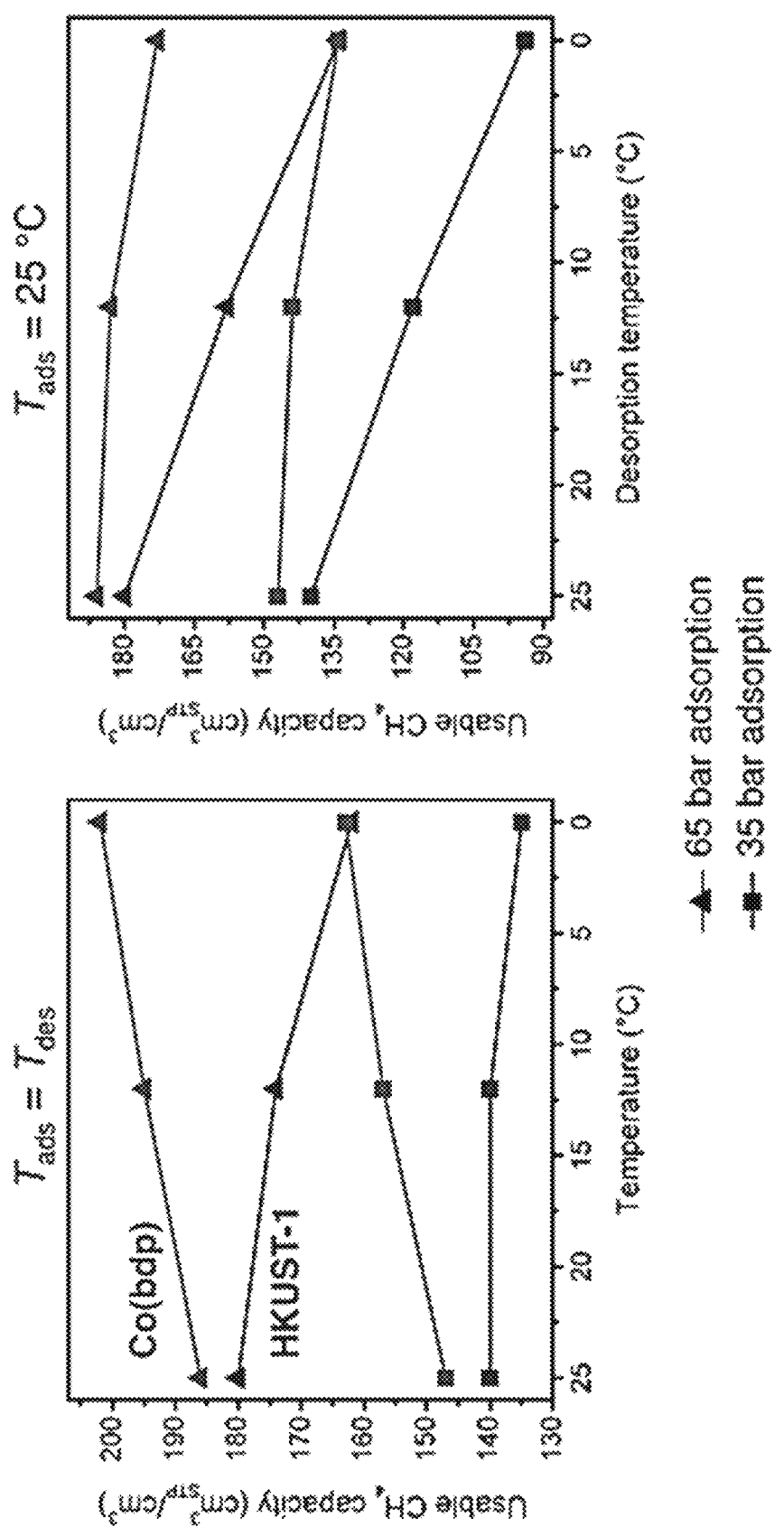
FIG. 13 presents a comparison between the total $CH_4$ usable capacity for Co(bdp) (green) and HKUST-1 (blue) during isothermal adsorption and desorption at 0-25° C., 65 bar (triangles) or 35 (bar) adsorption, and 5.8 bar desorption.

Adsorbents with stepped isotherms, such as Co(bdp), can significantly reduce the loss in usable capacity that occurs due to cooling during desorption. For instance, at all temperatures above 0° C., Co(bdp) has negligible $CH_4$ adsorption at pressures below 5.8 bar (see FIG. 12). As a result, the usable capacity of Co(bdp) for adsorption at 25° C. is unaffected by cooling, as long as the final adsorbent temperature remains above 0° C. Classical adsorbents, on the other hand, are significantly affected by cooling. Indeed, the volumetric usable capacity of Co(bdp) for 25° C. and 35 bar adsorption and 0° C. and 5.8 bar desorption is 43% greater than that of HKUST-1 (see FIG. 13). Additionally, moderate cooling of the storage vessel can be used to boost the usable capacity of adsorbents with stepped isotherms disclosed herein much more than classical adsorbents. For classical adsorbents, cooling increases the amount of $CH_4$ stored at both the high adsorption pressure and the low desorption pressure. For the adsorbents with stepped isotherms disclosed herein, however, cooling will only increase the amount of $CH_4$ stored at the high adsorption pressure. Indeed, the volumetric usable capacity of Co(bdp) for 0° C. and 35 bar adsorption and 5.8 bar desorption is 21% greater than that of HKUST-1 (see FIG. 13).

For the adsorbents with stepped isotherms disclosed herein (e.g., Co(bdp)), an endothermic phase change is responsible for the step in the isotherm as the pressure is increased. This should offer significant advantages in terms of the thermal management requirements of the complete gas storage system. For $CH_4$ storage in Co(bdp), the pore opening process will offset some of the heat released during adsorption (refueling), and the exothermic pore closing process will offset some of the cooling that occurs as $CH_4$ is desorbed during discharge (driving). This was demonstrated by showing that the heat of adsorption for $CH_4$ in Co(bdp) is just −7.9(3) kJ/mol, more than half of the −17.1 kJ/mol for HKUST-1.

While there can be a significant change in the volume of the adsorbent during the phase change process, such is the case for flexible metal-organic frameworks (e.g., Co(bdp)), the adsorbents of the disclosure do not require the use of flexible materials to generate stepped isotherms. For example, an interpenetrated metal-organic framework or dynamic functional groups (e.g., halogen, amine, alkyl, alkenyl, alkynyl, carboxylic acid, thiol, hydroxyl, nitro, cyano, carbonyl, phosphate groups) inside the pores of a rigid framework, can also lead to materials with stepped isotherms that will offer the same advantages for gas storage applications. Flexible metal-organic frameworks that have stepped isotherms that are expected to have similar gas storage abilities as Co(bdp), include, but are not limited to, M(bdp) (where M is a transition metal, such as Fe, Cu, Zn), and MOFs comprised of metal atoms linked together by linear linking ligands which comprise a central aryl and/or heteroaryl (e.g., pyridine) ring(s) that may be optionally substituted with one or more functional groups, including alkyls, alkenyls, alkynyls, oxygen containing functional groups, nitrogen containing functional groups, sulfur containing functional groups, boron containing functional groups, phosphorous containing functional groups, or combination of any of the foregoing, linked to terminal azolate-based rings (e.g., triazolates, benzimidazolates, imidazolates, tetrazolates, or any combination of the foregoing).

The disclosure thus provides for the preparation of flexible metal-organic frameworks capable of reversibly adsorbing a gas, wherein the flexible metal-organic frameworks are characterized by having a volumetric usable capacity that is (i) not significantly reduced when there is a minimum desorption pressure requirement, (ii) not significantly reduced due to heat released during adsorption of the one or more gases to the flexible MOF, and/or (iii) is not significantly reduced due to cooling resulting from de-adsorption of the one or more gases from the flexible MOF. MOFs having these characteristics are described herein.

In a particular embodiment, the disclosure provides for an adsorbent having a stepped isotherm comprising a flexible metal-organic framework which has repeating cores comprising the formula M-L-M, wherein L is a linking moiety comprising a structure of Formula I:

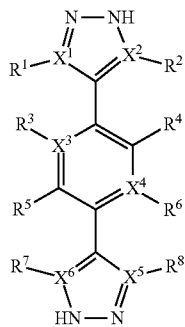

Formula I wherein, $X^1$-$X^6$ are each independently a C or a N;

$R^1$-$R^2$ and $R^7$-$R^8$ are each independently selected from the group consisting of H, D, optionally substituted $C_1$-$C_3$ alkyl, optionally substituted $C_1$-$C_3$ alkenyl, halo, hydroxyl, aldehyde, carboxyl, amine, nitrile, azide, and nitro; and $R^3$-$R^6$ are each independently selected from the group consisting of H, D, FG, optionally substituted ($C_1$-$C_{12}$)alkyl, optionally substituted hetero-($C_1$-$C_{12}$)alkyl, optionally substituted ($C_2$-$C_{12}$)alkenyl, optionally substituted hetero-($C_1$-$C_{12}$)alkenyl, optionally substituted ($C_2$-$C_{12}$)alkynyl, optionally substituted hetero-($C_2$-$C_{12}$)alkynyl, optionally substituted cycloalkyl, optionally substituted cycloalkenyl, optionally substituted aryl, optionally substituted heterocycle, optionally substituted mixed ring system, —C($R^{11}$)$_3$, —CH($R^{11}$)$_2$, —CH$_2$$R^{11}$, —C($R^{12}$)$_3$, —CH($R^{12}$)$_2$, —CH$_2$$R^{12}$, —OC($R^{11}$)$_3$, OCH($R^{11}$)$_2$, —OCH$_2$$R^{11}$, —OC($R^{12}$)$_3$, —OCH($R^{12}$)$_2$, OCH$_2$$R^{12}$, and adjacent R groups can be linked together to form an optionally substituted ring;

$R^{11}$ is selected from the group consisting of FG, optionally substituted ($C_1$-$C_{12}$)alkyl, optionally substituted hetero-($C_1$-$C_{12}$)alkyl, optionally substituted ($C_1$-$C_{12}$)alkenyl, optionally substituted hetero-($C_1$-$C_{12}$)alkenyl, optionally substituted ($C_1$-$C_{12}$)alkynyl, optionally substituted hetero-($C_1$-$C_{12}$)alkynyl; and $R^{12}$ is selected from the group consisting of cycloalkyl, aryl and heterocycle; and wherein tetrahedrally or pseudo-tetrahedrally M is bridged by $\mu^2$-pyrazolate units of L.

In a further embodiment, the disclosure also provides for an adsorbent having a stepped isotherm comprising a flexible metal-organic framework which has repeating cores comprising the formula M-L-M, wherein L is a linking moiety comprising a structure of Formula I(a):

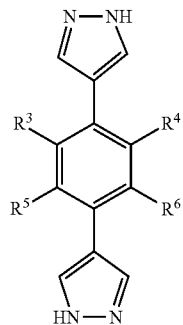

Formula I(a)

wherein, $R^3$-$R^6$ are each independently selected from the group consisting of H, D, halos, hydroxyls, carboxyls, carbonates, carboxylates, aldehydes, esters, ethers, amines, amides, azides, nitriles, sulfides, nitros, optionally substituted ($C_1$-$C_6$)alkyl, optionally substituted hetero-($C_1$-$C_6$)alkyl, optionally substituted ($C_2$-$C_6$)alkenyl, optionally substituted hetero-($C_1$-$C_6$)alkenyl, optionally substituted ($C_2$-$C_6$)alkynyl, optionally substituted hetero-($C_2$-$C_6$)alkynyl.

In yet a further embodiment, the disclosure provides for an adsorbent having a stepped isotherm comprising a flexible metal-organic framework which has repeating cores comprising the formula M-L-M, wherein L is a linking moiety comprising a structure of Formula I(b):

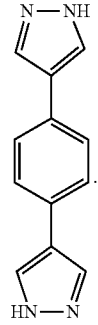

Formula I(b)

In a particular embodiment, the disclosure provides for a flexible MOF which comprises one or more metals or metal ions selected from: $Li^+$, $Na^+$, $K^+$, $Rb^+$, $Cs^+$, $Be^{2+}$, $Mg^{2+}$, $Ca^{2+}$, $Sr^{2+}$, $Ba^{2+}$, $Sc_{3+}$, $Sc^{2+}$, $Sc^+$, $Y^{3+}$, $Y^{2+}$, $Y^+$, $Ti^{4+}$, $Ti^{3+}$, $Ti^{2+}$, $Zr^{4+}$, $Zr^{3+}$, $Zr^{2+}$, $Hf^{4+}$, $Hf^{3+}$, $V^{5+}$, $V^{4+}$, $V^{3+}$, $V^{2+}$, $Nb^{5+}$, $Nb^{4+}$, $Nb^{3+}$, $Nb^{2+}$, $Ta^{5+}$, $Ta^{4+}$, $Ta^{3+}$, $Ta^{2+}$, $Cr^{6+}$, $Cr^{5+}$, $Cr^{4+}$, $Cr^{3+}$, $Cr^{2+}$, $Cr^+$, Cr, $Mo^{6+}$, $Mo^{5+}$, $Mo^{4+}$, $Mo^{3+}$, $Mo^{2+}$, $Mo^+$, Mo, $W^{6+}$, $W^{5+}$, $W^{4+}$, $W^{3+}$, $W^{2+}$, $W^+$, W, $Mn^{7+}$, $Mn^{6+}$, $Mn^{5+}$, $Mn^{4+}$, $Mn^{3+}$, $Mn^{2+}$, $Mn^+$, $Re^{7+}$, $Re^{6+}$, $Re^{5+}$, $Re^{4+}$, $Re^{3+}$, $Re^{2+}$, $Re^+$, Re, $Fe^{6+}$, $Fe^{4+}$, $Fe^{3+}$, $Fe^{2+}$, $Fe^+$, Fe, $Ru^{8+}$, $Ru^{7+}$, $Ru^{6+}$, $Ru^{4+}$, $Ru^{3+}$, $Ru^{2+}$, $Os^{8+}$, $Os^{7+}$, $Os^{6+}$, $Os^{5+}$, $Os^{4+}$, $Os^{3+}$, $Os^{2+}$, $Os^{2+}$, Os, $Co^{5+}$, $Co^{4+}$, $Co^{3+}$, $Co^{2+}$, $Co^{2+}$, $Rh^{6+}$, $Rh^{5+}$, $Rh^{4+}$, $Rh^{3+}$, $Rh^{2+}$, $Rh^+$, $Ir^{6+}$, $Ir^{5+}$, $Ir^{4+}$, $Ir^{3+}$, $Ir^{2+}$, $Ir^{2+}$, Ir, $Ni^{3+}$, $Ni^{2+}$, $Ni^+$, Ni, $Pd^{6+}$, $Pd^{4+}$, $Pd^{2+}$, $Pd^+$, Pd, $Pt^{6+}$, $Pt^{5+}$, $Pt^{4+}$, $Pt^{3+}$, $Pt^{2+}$, $Pt^+$, $Cu^{4+}$, $Cu^{3+}$, $Cu^{2+}$, $Cu^{2+}$, $Ag^{3+}$, $Ag^{2+}$, $Ag^{2+}$, $Au^{5+}$, $Au^{4+}$, $Au^{3+}$, $Au^{2+}$, $Au^{2+}$, $Zn^{2+}$, $Zn^+$, Zn, $Cd^{2+}$, $Cd^+$, $Hg^{4+}$, $Hg^{2+}$, $Hg^{2+}$, $B^{3+}$, $B^{2+}$, $B^+$, $Al^{3+}$, $Al^{2+}$, $Al^+$, $Ga^{3+}$, $Ga^{2+}$, $Ga^+$, $In^{3+}$, $In^{2+}$, $In^{1+}$, $Tl^{3+}$, $Tl^+$, $Si^{4+}$, $Si^{3+}$, $Si^{2+}$, $Si^+$, $Ge^{4+}$, $Ge^{3+}$, $Ge^{2+}$, $Ge^+$, Ge, $Sn^{4+}$, $Sn^{2+}$, $Pb^{4+}$, $Pb^{2+}$, $As^{5+}$, $As^{3+}$, $As^{2+}$, $As^+$, $Sb^{5+}$, $Sb^{3+}$, $Bi^{5+}$, $Bi^{3+}$, $Te^{6+}$, $Te^{5+}$, $Te^{4+}$, $Te^{2+}$, $La^{3+}$, $La^{2+}$, $Ce^{4+}$, $Ce^{3+}$, $Ce^{2+}$, $Pr^{4+}$, $Pr^{3+}$, $Pr^{2+}$, $Nd^{3+}$, $Nd^{2+}$, $Sm^{3+}$, $Sm^{2+}$, $Eu^{3+}$, $Eu^{2+}$, $Gd^{3+}$, $Gd^{2+}$, $Gd^+$, $Tb^{4+}$, $Tb^{3+}$, $Tb^{2+}$, $Tb^+$, $Db^{3+}$, $Db^{2+}$, $Ho^{3+}$, $Er^{3+}$, $Tm^{4+}$, $Tm^{3+}$, $Tm^{2+}$, $Yb^{3+}$, $Yb^{2+}$, $Lu^{3+}$, $La^{3+}$, $La^{2+}$, $La^{2+}$, and combinations thereof, including any complexes which contain the metals or metal ions, as well as any corresponding metal salt counter-anions. In another embodiment, the flexible MOFs disclosed herein comprise one or more divalent metal ions selected from: $Be^{2+}$, $Mg^{2+}$, $Ca^{2+}$, $Sr^{2+}$, $Ba^{2+}$, $Sc^{2+}$, $Y^{2+}$, $Ti^{2+}$, $Zr^{2+}$, $V^{2+}$, $Nb^{2+}$, $Ta^{2+}$, $Cr^{2+}$, $Mo^{2+}$, $W^{2+}$, $Mn^{2+}$, $Re^{2+}$, $Fe^{2+}$, $Ru^{2+}$, $Os^{2+}$, $Co^{2+}$, $Rh^{2+}$, $Ir^{2+}$, $Ni^{2+}$, $Pd^{2+}$, $Pt^{2+}$, $Cu^{2+}$, $Ag^{2+}$, $Au^{2+}$, $Zn^{2+}$, $Cd^{2+}$, $Hg^{2+}$, $B^{2+}$, $Al^{2+}$, $Ga^{2+}$, $In^{2+}$, $Si^{2+}$, $Ge^{2+}$, $Sn^{2+}$, $Pb^{2+}$, $As^{2+}$, $Te^{2+}$, $La^{2+}$, $Ce^{2+}$, $Pr^{2+}$, $Nd^{2+}$, $Sm^{2+}$, $Eu^{2+}$, $Gd^{2+}$, $Tb^{2+}$, $Db^{2+}$, $Tm^{2+}$, $Yb^{2+}$, and $La^{2+}$, including any complexes which contain the metal ions, as well as any corresponding metal salt counter-anions. In a particular embodiment, the MOF disclosed herein comprise $Co^{2+}$ or $Fe^{2+}$.

All the aforementioned linking ligands possess appropriate reactive functionalities can be chemically transformed by a suitable reactant post synthesis of the framework to add further functionalities to the framework. By modifying the organic links within the framework post-synthetically, access to functional groups that were previously inaccessible or accessible only through great difficulty and/or cost is possible and facile.

In a further embodiment, the flexible MOFs of the disclosure may be further modified by reacting with one or more post framework reactants that may or may not have denticity. In another embodiment, a flexible MOF as-synthesized is reacted with at least one, at least two, or at least three post framework reactants. In yet another embodiment, a flexible MOF as-synthesized is reacted with at least two post framework reactants. In a further embodiment, a flexible MOF as-synthesized is reacted with at least one post framework reactant that will result in adding denticity to the framework.

The disclosure provides that a flexible MOF disclosed herein can be modified by a post framework reactant by using chemical reactions that modify, substitute, or eliminate a functional group post-synthesis. These chemical reactions may use one or more similar or divergent chemical reaction mechanisms depending on the type of functional group and/or post framework reactant used in the reaction. Examples of chemical reaction include, but are not limited to, radical-based, unimolecular nucleophilic substitution (SN1), bimolecular nucleophilic substitution (SN2), unimolecular elimination (E1), bimolecular elimination (E2), E1cB elimination, nucleophilic aromatic substitution (SnAr), nucleophilic internal substitution (SNi), nucleophilic addition, electrophilic addition, oxidation, reduction, cycloaddition, ring closing metathesis (RCM), pericyclic, electrocyclic, rearrangement, carbene, carbenoid, cross coupling, and degradation. Other agents can be added to increase the rate of the reactions disclosed herein, including adding catalysts, bases, and acids.

In another embodiment, a post framework reactant adds at least one effect to a flexible MOF of the disclosure including, but not limited to, modulating the aromatic hydrocarbon storage and/or separation ability of the flexible MOF; modulating the sorption properties of the MOF; modulating the pore size of the flexible MOF; modulating the catalytic activity of the flexible MOF; modulating the conductivity of the flexible MOF; modulating the metal-metal separation distance of the MOF; and modulating the sensitivity of the flexible MOF to the presence of an analyte of interest. In a further embodiment, a post framework reactant adds at least two effects to the flexible MOF of the disclosure including, but not limited to, modulating the aromatic hydrocarbon storage and/or separation ability of the flexible MOF; modulating the sorption properties of the flexible MOF; modulating the pore size of the flexible MOF; modulating the catalytic activity of the flexible MOF; modulating the conductivity of the flexible MOF; modulating the metal-metal separation distance of the flexible MOF; and modulating the sensitivity of the flexible MOF to the presence of an analyte of interest.

For example, the disclosure demonstrates that modifications of the bdp ligand provides for changes in the framework's adsorption characteristics. The disclosure demonstrates control over the phase change pressure via systematic ligand modification in a series of functionalized Co(bdp) frameworks. X-ray diffraction studies and low-pressure $N_2$ adsorption measurements indicate that all derivatives are isoreticular to Co(bdp) and exhibit similar structural flexibility. To further illustrate the effects of ligand functionalization, $CH_4$ was used as a probe molecule for high-pressure adsorption measurements and in situ powder x-ray diffraction experiments, allowing for rationalize changes in step pressures relative to the non-functionalized framework. Because the operating conditions for industrial gas adsorption applications vary widely, this ability to systematically tune the position of an isotherm step is of tremendous advantage in facilitating the design of new adsorbents. Moreover, the synthetic approach described here can be applied to other flexible metal-organic frameworks and gases, enabling materials scientists to design phase-change adsorbents for specific applications.

Variants of the $H_2$bdp ligand with methyl, deuterium, or fluorine functionalities on the central ring are provided. These changes were synthesized to investigate how changing the non-covalent interactions between linkers in the collapsed Co(bdp) phase influence adsorption-induced structural changes. Specifically, the selected groups were expected to show increased, similar, or decreased electrostatic affinities for the n cloud of a neighboring aryl ring, respectively. This array of dipyrazole ligands was realized by coupling protected pyrazoleboronic esters to a variety of commercially available dibromobenzenes (Scheme 1), thus enabling late-stage diversification.

SCHEME 1

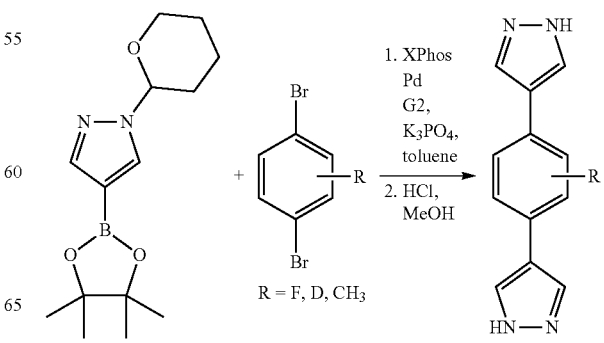

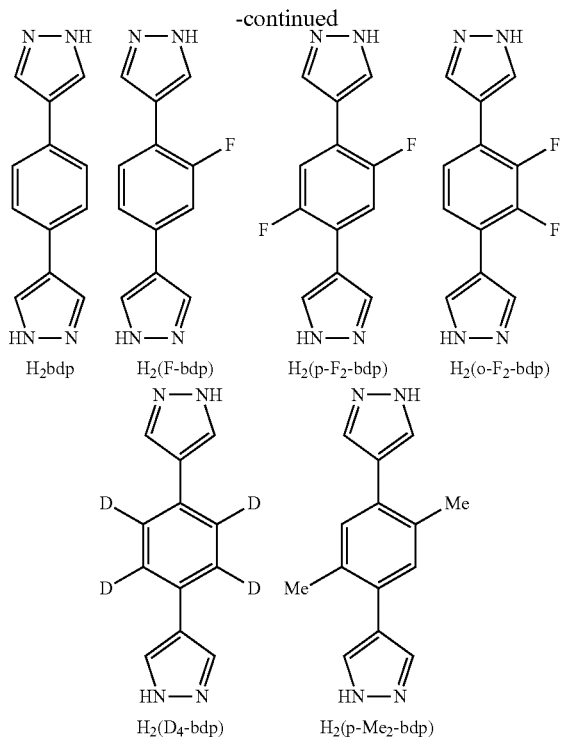

H₂bdp, H₂(F-bdp), H₂(p-F₂-bdp), H₂(o-F₂-bdp), H₂(D₄-bdp), H₂(p-Me₂-bdp)

The general synthesis provides, for example, ligands of Formula I(a):

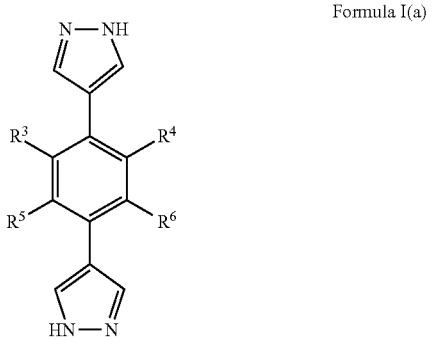

Formula I(a)

wherein,
(i) $R^3$, $R^5$ and $R^6$ are H and $R^4$ are F; or
(ii) $R^3$ and $R^6$ are H and $R^4$ and $R^5$ are F; or
(iii) $R^3$ and $R^5$ are H and $R^4$ and $R^6$ are F; or
(iv) $R^3$-$R^6$ are D; or
(v) $R^3$ and $R^6$ are H and $R^4$ and $R^5$ are $CH_3$.

Figure 29:
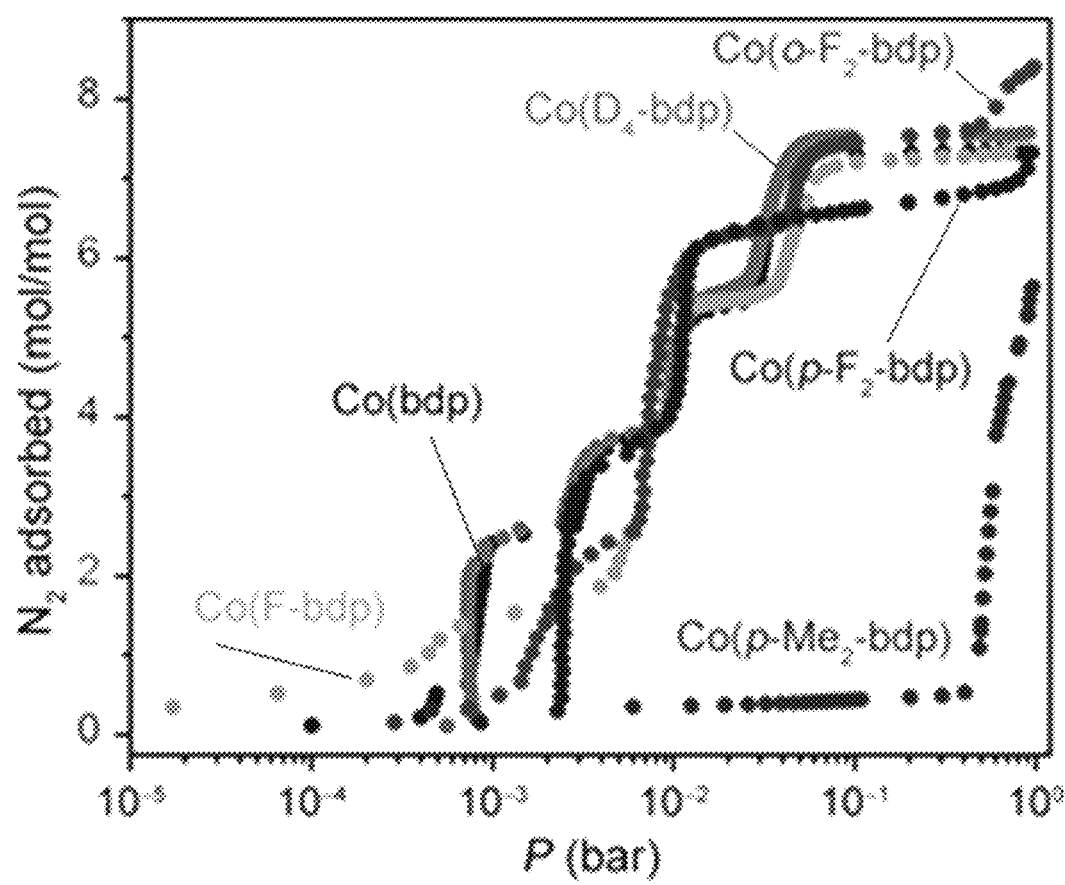
FIG. 29 shows low pressure $N_2$ adsorption for Co(bdp) and derivatives at 77 K. Co(bdp) adsorption largely underlays Co($D_4$-bdp) adsorption.

Low-temperature $N_2$ adsorption measurements were then used to assess the porosity and flexibility of the various derivatives (FIG. 29). Similar to the $N_2$ isotherm of Co(bdp), the frameworks Co(F-bdp), Co(p-F₂-bdp), Co(o-F₂-bdp), and Co(D₄-bdp) exhibit low initial $N_2$ uptake, followed by a series of distinct adsorption steps beginning at pressures below 3 mbar. This isotherm shape indicates that these materials are collapsed when fully evacuated, but transition to a series of expanded structures under increasing gas pressure, demonstrating that the introduction of functional groups does not eliminate framework flexibility. The step positions in each isotherm vary among the derivatives, showing that the stability of each structural intermediate (and thus the $N_2$ pressure associated with that particular phase change) is uniquely affected by ligand functionalization. All of the aforementioned Co(bdp) derivatives reach an expanded phase with $N_2$ saturation capacities between 7.1 and 8.3 mol/mol, indicating that these materials have similarly high permanent porosities, with Langmuir surface areas between 2279 and 2702 m/g (Table 1). In contrast, Co(p-Me₂-bdp) remains relatively nonporous until nearly 500 mbar, at which point it undergoes a phase change to reach a saturation capacity of only 5.3 mol/mol. This much higher phase change pressure suggests that the ligand methyl groups significantly stabilize a collapsed framework structure.

TABLE 1

Langmuir surface areas of Co(bdp) derivatives.

| Material | Langmuir Surface Area |
|---|---|
| Co(F-bdp) | 2529 m²/g |
| Co(p-F₂-bdp) | 2279 m²/g |
| Co(o-F₂-bdp) | 2668 m²/g |
| Co(D₄-bdp) | 2702 m²/g |
| Co(p-Me₂-bdp) | 1741 m²/g |

In one embodiment of the disclosure, a gas storage material comprising an adsorbent with a stepped isotherm of the disclosure is provided. Advantageously, an adsorbent with a stepped isotherm of the disclosure includes a number of adsorption sites for storing and/or separating gas molecules. Suitable examples of such gases include, but are not limited to, gases comprising ammonia, argon, methane, propane, carbon dioxide, carbon monoxide, sulfur dioxide, hydrogen sulfide, phosphine, nitrous oxide, hydrogen, oxygen, nitrogen, fluorine, chlorine, helium, carbonyl sulfide, and combinations thereof. In a particularly useful variation an adsorbent with a stepped isotherm disclosed herein is a hydrogen storage material that is used to store hydrogen ($H_2$). In yet another particularly useful variation, an adsorbent with a stepped isotherm disclosed herein is a natural gas storage material (e.g., a methane storage material) that may be used to store natural gas(es).

The disclosure also provides an apparatus and method for separating one or more components from a multi-component gas using a separation system having a feed side and an effluent side separated by an adsorbent with a stepped isotherm of the disclosure. The apparatus may comprise a column format.

An adsorbent with a stepped isotherm of the disclosure can be used as an adsorbent for a gaseous composition, e.g., a natural gas. In a certain embodiment, an adsorbent with a stepped isotherm disclosed herein can be used to separate and/or store one or more gases from a natural gas stream. In another embodiment, an adsorbent with a stepped isotherm disclosed herein can be used to separate and/or store methane from a natural gas stream. In yet another embodiment, an adsorbent with a stepped isotherm disclosed herein can be used to store one of more gases from a town gas stream. In yet another embodiment, an adsorbent with a stepped isotherm disclosed herein can be used to separate and/or store one of more gases from a biogas stream. In a certain embodiment, an adsorbent with a stepped isotherm disclosed herein can be used to separate and/or store one of more gases from a syngas stream.

In a particular embodiment, an adsorbent with a stepped isotherm disclosed herein is part of a device. In another embodiment, a gas storage device comprises an adsorbent with a stepped isotherm of the disclosure. In a further embodiment, a gas storage device used to separate one or more component gases from a multi-component gas mixture comprises an adsorbent with a stepped isotherm disclosed herein. Examples of gas storage devices include, but are not limited to, purifiers, filters, scrubbers, pressure swing adsorption devices, molecular sieves, hollow fiber membranes, ceramic membranes, cryogenic air separation devices, and hybrid devices.

In a particular embodiment, a gas storage device comprises an adsorbent with a stepped isotherm disclosed herein. A gas that may be stored by the methods, compositions and systems of the disclosure includes gases such as natural gas, ammonia, acetylene, argon, methane, propane, carbon dioxide, carbon monoxide, sulfur dioxide, hydrogen sulfide, phosphine, nitrous oxide, hydrogen, oxygen, nitrogen, fluorine, chlorine, helium, carbonyl sulfide, and combinations thereof. In a further embodiment, a gas storage device is a tank or cylinder comprising an adsorbent with a stepped isotherm disclosed herein. In yet a further embodiment, a vehicle, such as a car, truck, or bus comprises the gas storage device. In another embodiment, the gas storage device is a device which stores hydrogen, and wherein the hydrogen is used to power fuel cells when electricity is needed. In yet another embodiment, the gas storage device is used to transport and/or store natural gas.

The disclosure also provides methods using an adsorbent with a stepped isotherm disclosed herein disclosed herein. In a certain embodiment, a method to separate or store one or more gases comprises contacting one or more gases with an adsorbent with a stepped isotherm disclosed herein. In a further embodiment, a method to separate or store one or more gases from a mixed gas mixture comprises contacting the gas mixture with an adsorbent with a stepped isotherm disclosed herein. In a certain embodiment, a method to separate or store one or more gases from a fuel gas stream comprises contacting the fuel gas stream with an adsorbent with a stepped isotherm disclosed herein. In a further embodiment, a method to separate or store methane from a natural gas stream comprises contacting the natural gas stream with an adsorbent with a stepped isotherm disclosed herein. In a certain embodiment, a method to separate or store one or more gases from flue-gas comprises contacting the flue-gas with an adsorbent with a stepped isotherm disclosed herein.

M(bdp) adsorbents of the disclosure are thus provided. The disclosure also provides Fe(bdp) and Co(bdp)-derivatives. The M(bdp) can be, for example, a Co(bdp), Co(bdp)-derivatives, Fe(bdp) and/or Fe(bdp)-derivatives. The M(bdp) adsorbents of the disclosure can be used for gas storage (e.g., $CH_4$ storage) and gas separation devices and systems. Adsorbents with stepped isotherms of the disclosure can be used as standard compounds for sorption instruments, and obtained results would be helpful to improve various industrial plants (i.e. separation or recovery of chemical substance).

The following examples are intended to illustrate but not limit the disclosure. While they are typical of those that might be used, other procedures known to those skilled in the art may alternatively be used.

EXAMPLES

Materials.

Anhydrous N,N-dimethylformamide (DMF) was obtained from a JC Meyer solvent system. The ligand 1,4-benzenedipyrazole ($H_2$bdp) was synthesized according to Choi et al. (*J. Am. Chem. Soc.* 130, 7848-7850 (2008)). All other reagents were obtained from commercial vendors and used without further purification. Ultra-high purity grade (99.999% purity) helium, dinitrogen, and methane were used for all adsorption measurements.

Synthesis of Co(bdp).

The compound Co(bdp) was synthesized using a strategy adopted from Choi et al. Specifically, a 500 mL solvent bomb was charged with a magnetic stir bar, $Co(CF_3SO_3)_2$ (4.96 g, 0.0139 mol), $H_2$bdp (2.46 g, 0.0117 mol), and N,N-diethylformamide (90 mL). The reaction mixture was degassed by the freeze-pump-thaw method for 5 cycles then sealed by closing the stopcock of the solvent bomb while the frozen reaction mixture was still under vacuum. The solvent bomb was then heated at 160° C. for 4.5 days to afford a purple microcrystalline solid. The solvent bomb was backfilled with $N_2$, and the solid was collected by filtration. Before drying, the wet solid powder was immediately transferred to a 500 mL glass jar, and 400 mL of DMF was added. The jar was heated at 120° C. for 12 h, then cooled to room temperature. The DMF was decanted and replaced with 400 mL of fresh DMF. The jar was reheated at 120° C., followed by decanting and replacing with fresh DMF. This was repeated four additional times. The DMF was then decanted and replaced with dichloromethane (DCM). The DCM was partially decanted until 50 mL of solution was remaining. The resulting slurry was transferred to a 100 mL Schlenk flask, and the DCM was evaporated by flowing $N_2$ at room temperature. The resulting solid was dried by flowing $N_2$ at 160° C. for 12 h, then placed under dynamic vacuum at 160° C. for 24 h. The activated solid was immediately transferred to a glovebox and handled under a $N_2$ atmosphere for all further experiments.

Synthesis of $H_2$bdp Derivatives.

The ligand 1,4-benzenedipyrazole ($H_2$bdp) was synthesized according to a previously reported procedure. The functionalized dibromobenzene analogues used were 1,4-dibromo-2-fluorobenzene, 1,4-dibromo-2,5-difluorobenzene, 1,4-dibromo-2,3-difluorobenzene, 1,4-dibromobenzene-d4, or 1,4-dibromo-2,5-dimethylbenzene.

Functionalized 1,4-dibromobenzene (8.00 mmol, 1.00 equiv), 1-(2-tetrahydropyranyl)-1H-pyrazole-4-boronic acid pinacol ester (5.56 g, 20.0 mmol, 2.50 equiv), and $K_3PO_4$ (8.48 g, 40.0 mmol, 5.00 equiv) were suspended in toluene (16 mL) in a 40-mL glass scintillation vial equipped with a magnetic stir bar, which was then sparged with Ar for 10 min. The vial was uncapped quickly to add XPhos Pd G2 (1.26 g, 1.60 mmol, 0.200 equiv) and then briefly purged with Ar, sealed with a PTFE-lined cap, and heated to 110° C. with stirring for 2 days. After 2 days, the reaction mixture was cooled to room temperature, exposed to air, concentrated under reduced pressure, and diluted with 250 mL of diethyl ether. The ether layer was then washed with saturated aqueous $NaHCO_3$ (5×250 mL), dried over $MgSO_4$, and concentrated under reduced pressure to yield a yellow oil, which was used in the subsequent reaction without additional purification. The crude ligand was then dissolved in 60 mL of methanol in a 250-mL round-bottom flask equipped with a magnetic stir bar. To this flask was added 12 mL of concentrated aqueous HCl, and the reaction mixture was stirred at 50° C. for 2 h, during which time a white precipitate formed. The reaction mixture was then filtered, and the filtrate was suspended in water and neutralized with $NaHCO_3$. The precipitate was isolated in a second filtration, washed with water, and dried under reduced pressure to yield a white or beige powder.

Synthesis of Co(Bdp) Derivatives.

A 100-mL solvent bomb was charged with a magnetic stirbar, Co(CF$_3$SO$_3$)$_2$ (0.72 g, 2.0 mmol, 1.1 equiv), H$_2$bdp or H$_2$bdp derivative (1.9 mmol, 1.0 equiv), and 10 mL N,N-diethylformamide (DEF). The mixture was degassed using 5 freeze-pump-thaw cycles and then sealed by closing the stopcock of the solvent bomb while the frozen reaction mixture remained under vacuum. The solvent bomb was then heated at 160° C. for 3 days to afford a purple microcrystalline solid. Upon completion of the reaction, the solvent bomb was backfilled with Ar, the supernatant was removed under positive Ar pressure and discarded, and 80 mL of anhydrous DMF was added to the solid product under an Ar atmosphere. The solvent bomb was then sealed under Ar and heated to 110° C. overnight. This solvent-exchange procedure was performed once daily for 7 days to completely remove unreacted starting material from the pores. Subsequently, the DMF was replaced with anhydrous CH$_2$Cl$_2$ following the same procedure but without heating. These CH$_2$Cl$_2$ exchanges were performed once daily for 3 days to allow activation from a lower-boiling solvent. To activate the material, the CH$_2$C$_2$ was evaporated under positive Ar pressure until 25 mL of solution remained. The resultant slurry was transferred to a 100-mL Schlenk flask under inert atmosphere, and the CH$_2$Cl$_2$ was evaporated over the course of 1 h under a flow of Ar at room temperature. The resultant solid was dried under a flow of Ar at 160° C. for 6 h and then placed under dynamic vacuum at 160° C. overnight. The activated solid was immediately transferred to a glovebox and handled under a dinitrogen atmosphere for all further experiments.

Synthesis of H$_2$(F-bdp).

H$_2$(F-bdp) was prepared via a Suzuki-Miyaura coupling as generally outlined in Scheme 2. Specifically, 1,4-dibromo-2-fluorobenzene (3.03 g, 11.9 mmol, 1.0 equiv), 1-(2-tetrahydropyranyl)-1H-pyrazole-4-boronic acid pinacol ester (8.30 g, 29.8 mmol, 2.5 equiv), and K$_3$PO$_4$ (12.7 g, 60 mmol, 5 equiv) were suspended in toluene (24 mL) in a 40-mL glass scintillation vial with a magnetic stir bar and sparged with Ar for 10 minutes. XPhos Pd G2 (1.74 g, 2.4 mmol, 0.2 equiv) was added quickly in air, and vial was briefly purged with Ar, sealed with a PTFE-lined cap, and heated to 110° C. while stirring for 2 days. Upon completion, the reaction mixture was cooled to room temperature, concentrated under reduced pressure, and diluted with 250 mL of diethyl ether. The ether layer was washed 5 times with 250 mL of saturated aqueous NaHCO$_3$ solution, dried over MgSO$_4$, and concentrated under reduced pressure to yield a yellow oil, which was used in the subsequent reaction without additional purification. The crude ligand was dissolved in 90 mL of methanol in a 250-mL round-bottom flask with a magnetic stir bar, 18 mL of concentrated aqueous HCl was added, and the reaction mixture was stirred at 50° C. for 2 h, during which time a yellow precipitate formed. The reaction mixture was filtered, and the filtrate was suspended in water and neutralized with NaHCO$_3$. The precipitate was again isolated by filtration, washed with water, and dried in vacuo to yield H$_2$(F-bdp) (1.31 g, 5.8 mmol, 49%) as a beige powder. $^1$H NMR (400 MHz, DMSO-d$_6$): δ 8.13 (s, 2H), 8.05 (s, 2H) 7.70 (t, J=8.2 Hz, 1H), 7.52 (dd, J=12.8, 1.8 Hz, 1H), 7.46 (dd, J=8.1, 1.8 Hz, 1H) ppm; $^{13}$C NMR (101 MHz, DMSO-d$_6$): δ 160.65, 158.22, 133.04 (d, J=9.3 Hz), 128.58 (d, J=5.0 Hz), 121.77, 120.55, 115.15, 112.79, 112.56 ppm; $^{19}$F NMR (376 MHz, DMSO-d$_6$): δ -114.70 ppm. Note that the $^1$H NMR signals from the hydrogen atoms bonded to the pyrazole nitrogen atoms are too broad to be visible. Anal. Calcd. for C$_{12}$H$_9$FN$_4$: C, 63.15, H, 3.97, N, 24.55; found: C, 61.85, H, 3.99, N, 23.64. IR: 3137 (w), 3079 (w), 2935 (m), 2848 (m), 1624 (w), 1587 (m), 1473 (m), 1452 (m), 1374 (m), 1271 (w), 1252 (w), 1230 (w), 1200 (w), 1157 (m), 1111 (m), n) 1038 (m), 984 (w), 961 (m), 950 (m), 876 (m), 857 (s), 814 (s), 750 (m), 724 (m), 669 (w), 661 (w), 594 (s), 556 (m), 533 (m), 520 (m), 508 (m), 498 (w), 483 (m), 471 (m), 459 (s), 452 (m) cm$^{-1}$.

Synthesis of H$_2$ (p-F$_2$-bdp).

SCHEME 2

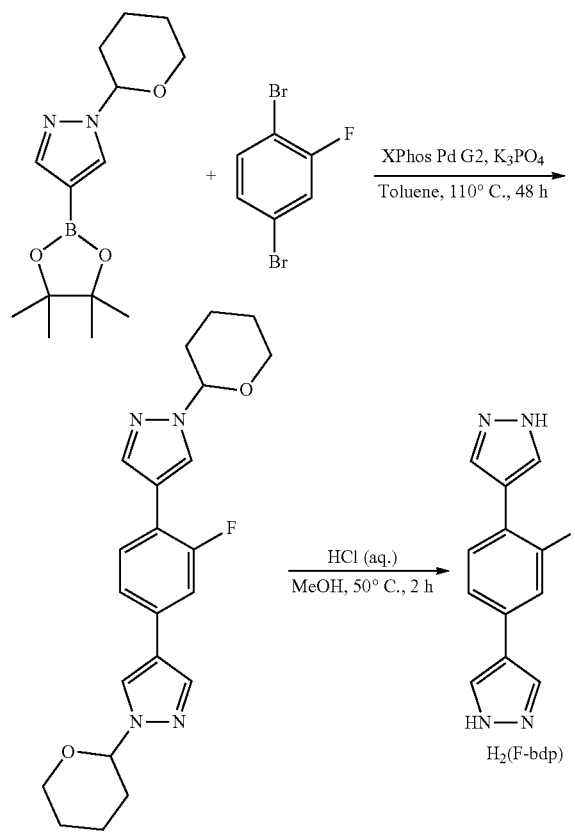

H$_2$(F-bdp)

SCHEME 3

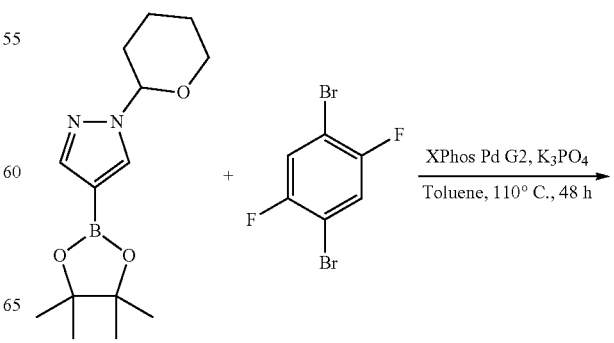

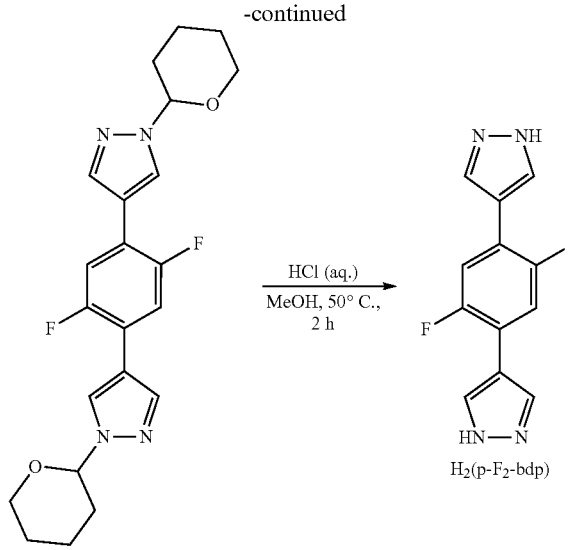

H₂(p-F₂-bdp)

H₂(p-F₂-bdp) was prepared via a Suzuki-Miyaura coupling as generally depicted in Scheme 3. Specifically, 1,4-dibromo-2,5-difluorobenzene (2.18 g, 8.0 mmol, 1.0 equiv), 1-(2-tetrahydropyranyl)-1H-pyrazole-4-boronic acid pinacol ester (5.56 g, 20.0 mmol, 2.5 equiv), and K₃PO₄ (8.48 g, 40 mmol, 5 equiv) were suspended in toluene (16 mL) in a 40-mL glass scintillation vial with a magnetic stir bar and sparged with Ar for 10 minutes. XPhos Pd G2 (1.26 g, 1.6 mmol, 0.2 equiv) was added quickly in air, and vial was briefly purged with Ar, sealed with a PTFE-lined cap, and heated to 110° C. while stirring for 2 days. Upon completion, the reaction mixture was cooled to room temperature, concentrated under reduced pressure, and diluted with 250 mL of diethyl ether. The ether layer was washed 5 times with 250 mL of saturated aqueous NaHCO₃ solution, dried over MgSO₄, and concentrated under reduced pressure to yield a yellow oil, which was used in the subsequent reaction without additional purification. The crude ligand was dissolved in 60 mL of methanol in a 250-mL round-bottom flask with a magnetic stir bar, 12 mL of concentrated aqueous HCl was added, and the reaction mixture was stirred at 50° C. for 2 h, during which time a white precipitate formed. The reaction mixture was filtered, and the filtrate was suspended in water and neutralized with NaHCO₃. The precipitate was again isolated by filtration, washed with water, and dried in vacuo to yield H₂(p-F₂-bdp) (0.86 g, 3.5 mmol, 44%) as a beige powder. $^1$H NMR (400 MHz, DMSO-d₆): δ 8.11 (s, 4H), 7.68 (t, J=9.3 Hz, 2H) ppm; $^{13}$C NMR (101 MHz, DMSO-d₆): δ 156.06, 153.68, 132.40, 119.33-119.81 (m), 118.58-118.14 (m), 114.60-113.78 (m) ppm; $^{19}$F NMR (400 MHz, DMSO-d₆): δ −119.78 (t, J=9.3 Hz) ppm. Note that the $^1$H NMR signals from the hydrogen atoms bonded to the pyrazole nitrogen atoms are too broad to be visible. Anal. Calcd. for $C_{12}H_8F_2N_4$: C, 58.54, H, 3.27, N, 22.75; found: C, 57.72, H, 3.35, N, 21.82. IR: 3139 (m), 3076 (w), 2966 (m), 2938 (m), 2850 (m), 1589 (m), 1539 (w), 1490 (m), 1435 (w), 1374 (m), 1350 (w), 1273 (m), 1241 (w), 1155 (s), 1041 (m), 963 (s), 867 (s), 818 (m), 780 (s), 698 (m), 668 (w), 605 (s), 549 (w), 531 (w), 512 (w), 482 (w), 472 (w), 460 (m) cm$^{-1}$.

Synthesis of H₂(o-F₂-bdp).

SCHEME 4

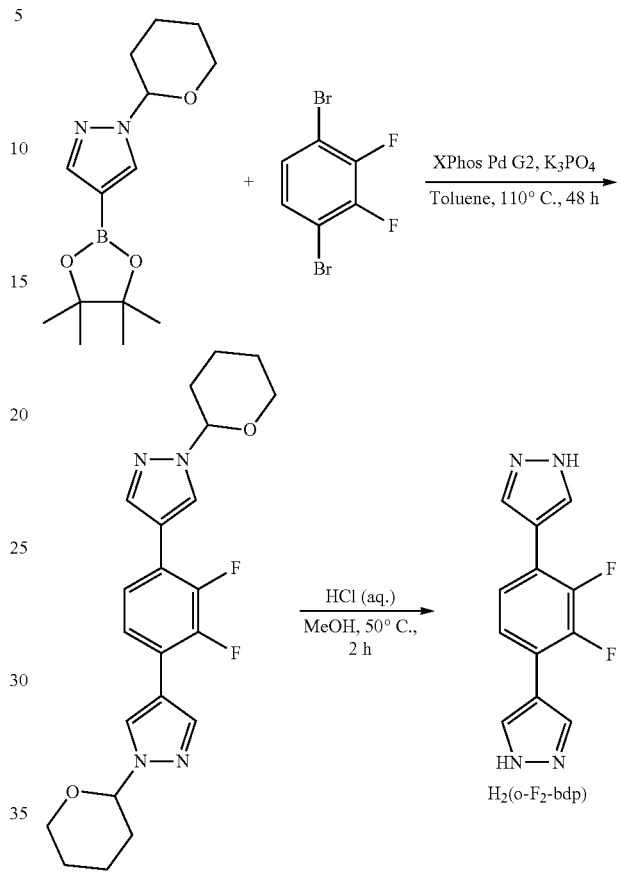

H₂(o-F₂-bdp)

H₂(o-F₂-bdp) was prepared via a Suzuki-Miyaura coupling as generally depicted in Scheme 4. Specifically, 1,4-dibromo-2,3-difluorobenzene (2.18 g, 8.0 mmol, 1.0 equiv), 1-(2-tetrahydropyranyl)-1H-pyrazole-4-boronic acid pinacol ester (5.56 g, 20.0 mmol, 2.5 equiv), and K₃PO₄ (8.48 g, 40 mmol, 5 equiv) were suspended in toluene (16 mL) in a 40-mL glass scintillation vial with a magnetic stir bar and sparged with Ar for 10 minutes. XPhos Pd G2 (1.26 g, 1.6 mmol, 0.2 equiv) was added quickly in air, and vial was briefly purged with Ar, sealed with a PTFE-lined cap, and heated to 110° C. while stirring for 2 days. Upon completion, the reaction mixture was cooled to room temperature, concentrated under reduced pressure, and diluted with 250 mL of diethyl ether. The ether layer was washed 5 times with 250 mL of saturated aqueous NaHCO₃ solution, dried over MgSO₄, and concentrated under reduced pressure to yield a yellow oil, which was used in the subsequent reaction without additional purification. The crude ligand was dissolved in 60 mL of methanol in a 250-mL round-bottom flask with a magnetic stir bar, 12 mL of concentrated aqueous HCl was added, and the reaction mixture was stirred at 50° C. for 2 h, during which time a white precipitate formed. The reaction mixture was filtered, and the filtrate was suspended in water and neutralized with NaHCO₃. The precipitate was again isolated by filtration, washed with water, and dried in vacuo to yield H₂(o-F₂-bdp) (0.85 g, 3.5 mmol, 43%) as a beige powder. $^1$H NMR (400 MHz, DMSO-d₆): δ 13.17 (s, 2H), 8.21 (s, 2H), 7.96 (s, 2H), 7.54-7.50 (m, 2H) ppm; $^{13}$C NMR (101 MHz, DMSO-d₆): δ 148.74 (d, J=15.4 Hz), 146.28 (d, J=15.2 Hz), 122.96-

122.77 (m), 120.15-199.99 (m), 114.27 ppm; $^{19}$F NMR (376 MHz, DMSO-d$_6$): δ −140.93 ppm. Anal. Calcd. for $C_{12}H_8F_2N_4$: C, 58.54, H, 3.27, N, 22.75; found: C, 57.91, H, 3.27, N, 21.81. IR: 3130 (w), 3072 (w), 3000 (w), 2944 (m), 2841 (m), 1589 (w), 1529 (w), 1465 (m), 1378 (m), 1339 (w), 1290 (w), 1253 (w), 1215 (w), 1159 (m), 1047 (m), 1013 (w), 985 (m), 960 (m), 888 (m), 867 (s), 851 (s), 801 (s), 667 (m), 646 (w), 626 (s), 612 (w), 588 (s), 548 (w), 542 (w), 511 (w), 489 (w), 473 (w), 463 (w) cm$^{-1}$.

Synthesis of H$_2$ (D$_4$-bdp).

SCHEME 5

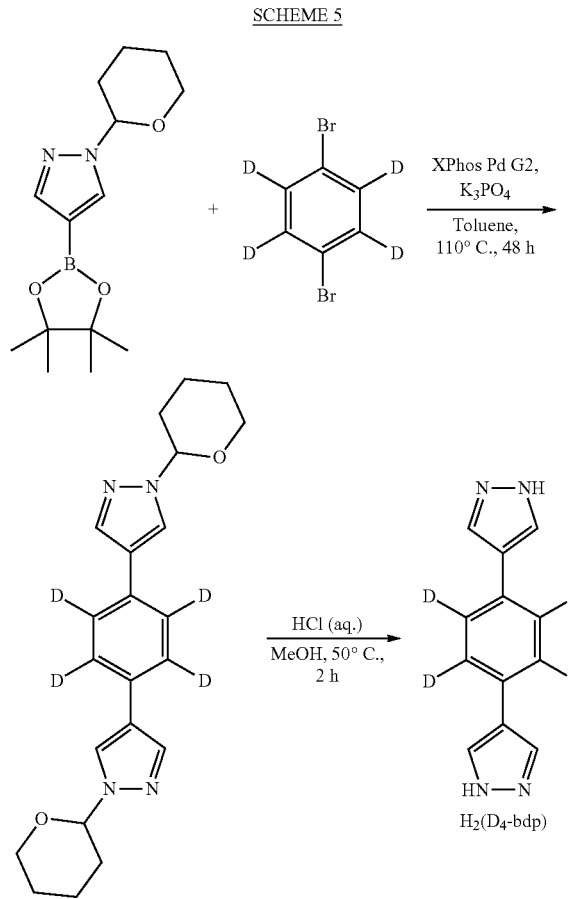

H$_2$(D$_4$-bdp) was prepared via a Suzuki-Miyaura coupling as generally depicted in Scheme 5. Specifically, 1,4-dibromobenzene-d$_4$ (2.0 g, 8.4 mmol, 1.0 equiv), 1-(2-tetrahydropyranyl)-1H-pyrazole-4-boronic acid pinacol ester (5.84 g, 21.0 mmol, 2.5 equiv), and K$_3$PO$_4$ (8.87 g, 41.9 mmol, 5 equiv) were suspended in toluene (16 mL) in a 40-mL glass scintillation vial with a magnetic stir bar and sparged with Ar for 10 minutes. XPhos Pd G2 (0.63 g, 0.8 mmol, 0.2 equiv) was added quickly in air, and vial was briefly purged with Ar, sealed with a PTFE-lined cap, and heated to 110° C. while stirring for 2 days. Upon completion, the reaction mixture was cooled to room temperature, concentrated under reduced pressure, and diluted with 250 mL of diethyl ether. The ether layer was washed 5 times with 250 mL of saturated aqueous NaHCO$_3$ solution, dried over MgSO$_4$, and concentrated under reduced pressure to yield a yellow oil, which was used in the subsequent reaction without additional purification. The crude ligand was dissolved in 60 mL of methanol in a 250-mL round-bottom flask with a magnetic stir bar, 12 mL of concentrated aqueous HCl was added, and the reaction mixture was stirred at 50° C. for 2 h, during which time a white precipitate formed. The reaction mixture was filtered, and the filtrate was suspended in water and neutralized with NaHCO$_3$. The precipitate was again isolated by filtration, washed with water, and dried in vacuo to yield H$_2$(D$_4$-bdp) (1.03 g, 4.8 mmol, 58%) as a beige powder. Due to the partial deuteration of the molecule, $^{13}$C NMR and C/H/N elemental analysis were substituted with $^2$H NMR and high-resolution mass spectrometry, respectively. $^1$H NMR (400 MHz, DMSO-d$_6$): δ 8.06 (s, 4H) ppm; $^2$H NMR (92 MHz, DMSO-d$_6$): δ 7.68 ppm. Note that the $^1$H NMR signals from the hydrogen atoms bonded to the pyrazole nitrogen atoms are too broad to be visible. HRMS (EI+) for $C_{12}H_6D_4N_4$: 214.1157; found: 214.1157. IR: 3160 (w), 3110 (w), 3058 (w), 2979 (w), 1581 (w), 1527 (w), 1437 (w), 1396 (w), 1364 (w), 1318 (w), 1294 (w), 1150 (m), 1097 (w), 1028 (m), 964 (m), 945 (s), 870 (m), 815 (m), 740 (s), 691 (s), 616 (m), 600 (m), 534 (s), 516 (m), 510 (m), 500 (m), 489 (m), 455 (s) cm$^{-1}$.

Synthesis of H$_2$(p-Me$_2$-bdp).

SCHEME 6

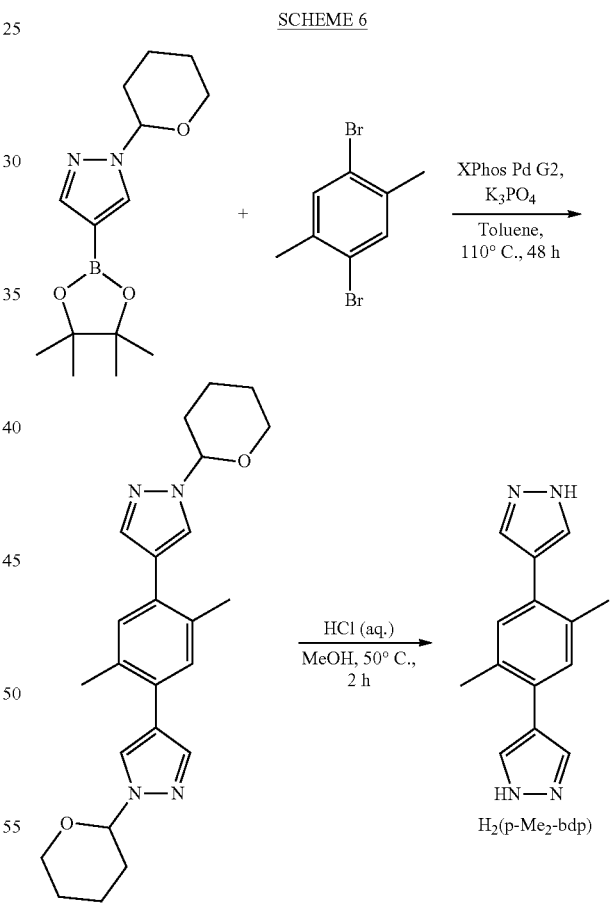

H$_2$(p-Me$_2$-bdp) was prepared via a Suzuki-Miyaura coupling as generally described in Scheme 6. Specifically, 1,4-dibromo-2,5-dimethylbenzene (2.10 g, 8.0 mmol, 1.0 equiv), 1-(2-tetrahydropyranyl)-1H-pyrazole-4-boronic acid pinacol ester (5.56 g, 20.0 mmol, 2.5 equiv), and K$_3$PO$_4$ (8.48 g, 40 mmol, 5 equiv) were suspended in toluene (16 mL) in a 40-mL glass scintillation vial with a magnetic stir bar and sparged with Ar for 10 minutes. XPhos Pd G2 (0.63 g, 0.8 mmol, 0.1 equiv) was added quickly in air, and vial was briefly purged with Ar, sealed with a PTFE-lined cap, and heated to 110° C. while stirring for 2 days. Upon completion, the reaction mixture was cooled to room temperature, concentrated under reduced pressure, and diluted with 250 mL of diethyl ether. The ether layer was washed 5 times with 250 mL of saturated aqueous $NaHCO_3$ solution, dried over $MgSO_4$, and concentrated under reduced pressure to yield a yellow oil, which was used in the subsequent reaction without additional purification. The crude ligand was dissolved in 60 mL of methanol in a 250-mL round-bottom flask with a magnetic stir bar, 12 mL of concentrated aqueous HCl was added, and the reaction mixture was stirred at 50° C. for 2 h, during which time a white precipitate formed. The reaction mixture was filtered, and the filtrate was suspended in water and neutralized with $NaHCO_3$. The precipitate was again isolated by filtration, washed with water, and dried in vacuo to yield $H_2$(p-$Me_2$-bdp) (1.01 g, 4.2 mmol, 53%) as a white powder. $^1$H NMR (400 MHz, DMSO-$d_6$): δ 12.95 (s, 2H), 7.95 (s, 2H), 7.73 (s, 2H), 7.28 (s, 2H), 2.35 (s, 6H); $^{13}$C NMR (101 MHz, DMSO-$d_6$): δ 132.24, 131.22, 130.65, 120.51, 21.19. ppm. Anal. Calcd. for $C_{14}H_{14}N_4$: C, 70.57, H, 5.92, N, 23.51; found: C, 70.60, H, 5.97, N, 23.44. IR: 3124 (m), 2949 (m), 1527 (m), 1445 (m), 1368 (m), 1342 (m), 1247 (w), 1167 (m), 1047 (m), 1032 (w), 951 (s), 893 (m), 862 (s), 816 (s), 682 (s), 622 (w), 604 (m), 570 (w), 559 (w), 552 (w), 516 (w), 485 (w), 458 (m) $cm^{-1}$.

Synthesis of Co(bdp) Derivatives.

Co(bdp) was resynthesized in order to obtain an improved X-ray diffraction structure of the solvated material. Single crystals were obtained following the literature procedure. By collecting data at 298 K, non-uniform structural changes induced by slow- or flash-cooling the crystal to 100 K were avoided, and an improved single crystal structure was obtained.

Synthesis of Co(F-bdp) Derivatives.

Co(F-bdp) was prepared. A 100-mL solvent bomb was charged with a magnetic stirring bar, Co(CF$_3$SO$_3$)$_2$ (0.75 g, 2.1 mmol, 1.0 equiv), $H_2$(F-bdp) (0.48 g, 2.1 mmol, 1.0 equiv), and DMF (10.4 mL). The reaction mixture was degassed by the freeze-pump-thaw method for 5 cycles, then sealed by closing the stopcock of the solvent bomb while the frozen reaction mixture remained under vacuum. The solvent bomb was then heated at 160° C. for 3 days to afford a purple microcrystalline solid. (To obtain crystals suitable for single-crystal X-ray diffraction, the magnetic stir bar was omitted from reaction flask while maintaining all other conditions constant.) Upon completion, the solvent bomb was backfilled with Ar, the supernatant was removed under positive Ar pressure and discarded, and 80 mL of anhydrous DMF was added to the solid product while maintaining under inert atmosphere. The solvent bomb was then sealed under Ar and heated to 110° C. overnight. This solvent-exchange procedure was performed once daily for 7 days to completely remove unreacted starting material from the pores. Subsequently, the DMF was replaced with anhydrous $CH_2Cl_2$ following the same procedure but without heating; these $CH_2Cl_2$ exchanges were performed once daily for 3 days to allow activation from a lower-boiling solvent. To activate the material, the $CH_2Cl_2$ was removed under positive Ar pressure until 25 mL of solution remained. The resultant slurry was transferred to a 100-mL Schlenk flask under inert atmosphere, and the $CH_2C_2$ was evaporated by flowing Ar at room temperature for 1 h. The resultant solid was dried by flowing Ar at 160° C. for 6 h, then placed under dynamic vacuum at 160° C. overnight to yield Co(F-bdp) (0.153 g, 0.5 mmol, 25%). The activated solid was immediately transferred to a glovebox and handled under a dinitrogen atmosphere for all further experiments. Anal. Calcd. for $C_{12}H_9CoFN_4$: C, 50.19, H, 3.16, N, 19.51; found: C, 47.39, H, 2.29, N, 18.29. IR: 1575 (m), 1490 (w), 1442 (w), 1374 (m), 1356 (m), 1331 (m), 1254 (m), 1236 (m), 1198 (w), 1170 (s), 1108 (m), 1079 (w), 1050 (s), 998 (m), 989 (m), 953 (s), 854 (s), 816 (s), 720 (w), 660 (m), 652 (m), 606 (s), 559 (s), 481 (s), 467 (s) $cm^{-1}$.

Synthesis of Co(p-$F_2$-bdp) Derivatives.

A 50-mL solvent bomb was charged with a magnetic stirring bar, Co(CF$_3$SO$_3$)$_2$ (0.95 g, 2.7 mmol, 1.2 equiv), $H_2$(p-$F_2$-bdp) (0.55 g, 2.2 mmol, 1.0 equiv), and DMF (11.0 mL). The reaction mixture was degassed by the freeze-pump-thaw method for 5 cycles, then sealed by closing the stopcock of the solvent bomb while the frozen reaction mixture remained under vacuum. The solvent bomb was then heated at 160° C. for 3 days to afford a purple microcrystalline solid. (To obtain crystals suitable for single-crystal X-ray diffraction, the magnetic stir bar was omitted from reaction flask while maintaining all other conditions constant.) Upon completion, the solvent bomb was backfilled with Ar, the supernatant was removed under positive Ar pressure and discarded, and 40 mL of anhydrous DMF was added to the solid product while maintaining under inert atmosphere. The solvent bomb was then sealed under Ar and heated to 110° C. overnight. This solvent-exchange procedure was performed once daily for 7 days to completely remove unreacted starting material from the pores. Subsequently, the DMF was replaced with anhydrous $CH_2Cl_2$ following the same procedure but without heating; these $CH_2Cl_2$ exchanges were performed once daily for 3 days to allow activation from a lower-boiling solvent. To activate the material, the $CH_2Cl_2$ was removed under positive Ar pressure until 25 mL of solution remained. The resultant slurry was transferred to a 100-mL Schlenk flask under inert atmosphere, and the $CH_2Cl_2$ was evaporated by flowing Ar at room temperature for 1 h. The resultant solid was dried by flowing Ar at 160° C. for 6 h, then placed under dynamic vacuum at 160° C. overnight to yield Co(p-$F_2$-bdp) (0.303 g, 1.0 mmol, 44%). The activated solid was immediately transferred to a glovebox and handled under a dinitrogen atmosphere for all further experiments. Anal. Calcd. for $C_{12}H_8CoF_2N_4$: C, 47.73, H, 2.63, N, 18.36; found: C, 46.98, H, 2.21, N, 18.14. IR: 2926 (m), 2858 (w), 1737 (m), 1581 (w), 1493 (w), 1467 (w), 1444 (w), 1367 (m), 1272 (s), 1162 (s), 1119 (s), 1057 (s), 967 (s), 880 (m), 851 (m), 777 (s), 696 (m), 617 (m), 553 (m), 530 (m), 472 (m), 452 (m) $cm^{-1}$.

Synthesis of Co(o-$F_2$-bdp) Derivatives.

A 100-mL solvent bomb was charged with a magnetic stirring bar, Co(CF$_3$SO$_3$)$_2$ (0.72 g, 2.0 mmol, 1.05 equiv), $H_2$(o-$F_2$-bdp) (0.473 g, 1.9 mmol, 1.0 equiv), and DMF (10.0 mL). The reaction mixture was degassed by the freeze-pump-thaw method for 5 cycles, then sealed by closing the stopcock of the solvent bomb while the frozen reaction mixture remained under vacuum. The solvent bomb was then heated at 160° C. for 3 days to afford a purple microcrystalline solid. (To obtain crystals suitable for single-crystal X-ray diffraction, the magnetic stir bar was omitted from reaction flask while maintaining all other conditions constant.) Upon completion, the solvent bomb was backfilled with Ar, the supernatant was removed under positive Ar pressure and discarded, and 80 mL of anhydrous DMF was added to the solid product while maintaining under inert atmosphere. The solvent bomb was then sealed under Ar and heated to 110° C. overnight. This solvent-exchange procedure was performed once daily for 7 days to completely remove unreacted starting material from the pores. Subsequently, the DMF was replaced with anhydrous $CH_2Cl_2$ following the same procedure but without heating; these $CH_2Cl_2$ exchanges were performed once daily for 3 days to allow activation from a lower-boiling solvent. To activate the material, the $CH_2Cl_2$ was removed under positive Ar pressure until 25 mL of solution remained. The resultant slurry was transferred to a 100-mL Schlenk flask under inert atmosphere, and the $CH_2Cl_2$ was evaporated by flowing Ar at room temperature for 1 h. The resultant solid was dried by flowing Ar at 160° C. for 6 h, then placed under dynamic vacuum at 160° C. overnight to yield Co(o-$F_2$-bdp) (0.182 g, 0.6 mmol, 31%). The activated solid was immediately transferred to a glovebox and handled under a dinitrogen atmosphere for all further experiments. Anal. Calcd. for $C_{12}H_8CoF_2N_4$: C, 47.73, H, 2.63, N, 18.36; found: C, 47.23, H, 2.18, N, 18.36. IR: 1582 (m), 1559 (w), 1466 (m), 1384 (m), 1345 (m), 1290 (w), 1253 (m), 1214 (w), 1175 (m), 1052 (s), 1024 (m), 998 (m), 868 (s), 852 (s), 807 (s), 657 (w), 643 (m), 624 (w), 591 (s), 544 (m), 455 (s) $cm^{-1}$.

Synthesis of Co($D_4$-bdp) Derivatives.

A 100-mL solvent bomb was charged with a magnetic stirring bar, Co($CF_3SO_3$)$_2$ (1.62 g, 4.5 mmol, 1.2 equiv), $H_2$($D_4$-bdp) (0.80 g, 3.7 mmol, 1.0 equiv), and DMF (19.0 mL). The reaction mixture was degassed by the freeze-pump-thaw method for 5 cycles, then sealed by closing the stopcock of the solvent bomb while the frozen reaction mixture remained under vacuum. The solvent bomb was then heated at 160° C. for 3 days to afford a purple microcrystalline solid. (To obtain crystals suitable for single-crystal X-ray diffraction, the magnetic stir bar was omitted from reaction flask while maintaining all other conditions constant.) Upon completion, the solvent bomb was backfilled with Ar, the supernatant was removed under positive Ar pressure and discarded, and 80 mL of anhydrous DMF was added to the solid product while maintaining under inert atmosphere. The solvent bomb was then sealed under Ar and heated to 110° C. overnight. This solvent-exchange procedure was performed once daily for 7 days to completely remove unreacted starting material from the pores. Subsequently, the DMF was replaced with anhydrous $CH_2Cl_2$ following the same procedure but without heating; these $CH_2Cl_2$ exchanges were performed once daily for 3 days to allow activation from a lower-boiling solvent. To activate the material, the $CH_2Cl_2$ was removed under positive Ar pressure until 25 mL of solution remained. The resultant slurry was transferred to a 100-mL Schlenk flask under inert atmosphere, and the $CH_2Cl_2$ was evaporated by flowing Ar at room temperature for 1 h. The resultant solid was dried by flowing Ar at 160° C. for 6 h, then placed under dynamic vacuum at 160° C. overnight to yield Co($D_4$-bdp) (0.362 g, 1.3 mmol, 35%). The activated solid was immediately transferred to a glovebox and handled under a dinitrogen atmosphere for all further experiments. Anal. Calcd. for $C_{12}H_6CoD_4N_4$: C, 52.76, H, 2.21, N, 20.51; found: C, 50.55, H, 2.73, N, 19.55. IR: 1564 (w), 1396 (w), 1366 (m), 1313 (w), 1282 (m), 1219 (w), 1158 (m), 1072 (m), 1038 (s), 995 (m), 946 (s), 858 (s), 825 (m), 738 (s), 635 (s), 606 (w), 493 (s), 483 (s), 460 (s) $cm^{-1}$.

Synthesis of Co(p-$Me_2$-bdp) Derivatives.

A 250-mL solvent bomb was charged with a magnetic stirring bar, Co($CF_3SO_3$)$_2$ (3.50 g, 9.7 mmol, 1.8 equiv), $H_2$(p-$Me_2$-bdp) (1.25 g, 5.3 mmol, 1.0 equiv), and DMF (70.0 mL). The reaction mixture was degassed by the freeze-pump-thaw method for 5 cycles, then sealed by closing the stopcock of the solvent bomb while the frozen reaction mixture remained under vacuum. The solvent bomb was then heated at 160° C. for 36 h to afford a purple microcrystalline solid. (To obtain crystals suitable for single-crystal X-ray diffraction, the magnetic stir bar was omitted from reaction flask while maintaining all other conditions constant.) Upon completion, the solvent bomb was backfilled with Ar, the supernatant was removed under positive Ar pressure and discarded, and 80 mL of anhydrous DMF was added to the solid product while maintaining under inert atmosphere. The solvent bomb was then sealed under Ar and heated to 110° C. overnight. This solvent-exchange procedure was performed once daily for 7 days to completely remove unreacted starting material from the pores. Subsequently, the DMF was replaced with anhydrous $CH_2Cl_2$ following the same procedure but without heating; these $CH_2Cl_2$ exchanges were performed once daily for 3 days to allow activation from a lower-boiling solvent. To activate the material, the $CH_2Cl_2$ was removed under positive Ar pressure until 25 mL of solution remained. The resultant slurry was transferred to a 100-mL Schlenk flask under inert atmosphere, and the $CH_2Cl_2$ was evaporated by flowing Ar at room temperature for 1 h. The resultant solid was dried by flowing Ar at 160° C. for 6 h, then placed under dynamic vacuum at 160° C. overnight to yield Co(p-$Me_2$-bdp) (0.174 g, 0.6 mmol, 11%). The activated solid was immediately transferred to a glovebox and handled under a dinitrogen atmosphere for all further experiments. Anal. Calcd. for $C_{14}H_{14}CoN_4$: C, 56.76, H, 4.75, N, 18.85; found: C, 56.77, H, 3.96, N, 19.10. IR: 1694 (w), 1572 (m), 1458 (w), 1441 (w), 1407 (w), 1370 (s), 1356 (w), 1306 (m), 1239 (w), 1160 (s), 1118 (s), 1051 (s), 1005 (m), 955 (s), 892 (m), 853 (s), 771 (w), 671 (s), 623 (m), 521 (w), 504 (s), 463 (m), 453 (m) $cm^{-1}$.

Synthesis of Fe(bdp).

In a glovebox under a $N_2$ atmosphere, $H_2$(bdp) (0.200 g, 0.95 mmol) in DMF (9 mL) was heated to 120° C. while stirring for 20 min in a 20 mL glass vial. The resulting yellow suspension was cooled. A solution of $FeCl_2$ (0.197 g, 1.55 mmol) in methanol (1 mL) was added to the cooled suspension of $H_2$(bdp) in DMF, and the vial was sealed and heated at 120° C. while stirring. The hot, orange-yellow solution yielded a yellow microcrystalline powder after several hours. Samples suitable for gas adsorption studies were prepared using multiple vials of the same reaction scale in a glovebox under a $N_2$ atmosphere and by washing the resulting material nine times with hot DMF (9×18 mL), before drying under high vacuum at 170° C. for 24 h. The activated sample was handled under a $N_2$ atmosphere for all further experiments. IR (neat, $cm^{-1}$): 1573 (s), 1336 (w), 1239 (s), 1110 (s), 1041 (s), 952 (s), 859 (s), 849 (s), 832 (s), 824 (s), 644 (s), 534 (s). Anal. Calcd. for $FeC_{12}H_8N_4$: C, 54.58; H, 3.05; N, 21.22. Found: C, 54.18; H, 2.36; N, 20.67. In order to obtain single crystals suitable for X-ray diffraction, a 9:1 mixture of DMF and methanol was used to create solutions of $FeCl_2$ (9.0 mg, 0.07 mmol in 0.1 mL solvent) and $H_2$(bdp) (4.0 mg, 0.019 mmol in 0.9 mL solvent). The $FeCl_2$ solution and the $H_2$(bdp) solution were added together in a 4 mL vial. The vial was then sealed, and the clear yellow solution was heated at 120° C. for 24 h. Block-shaped yellow crystals formed on the sides of the vial after several hours.

Low-Pressure Gas Adsorption Measurements.

Figure 14A:
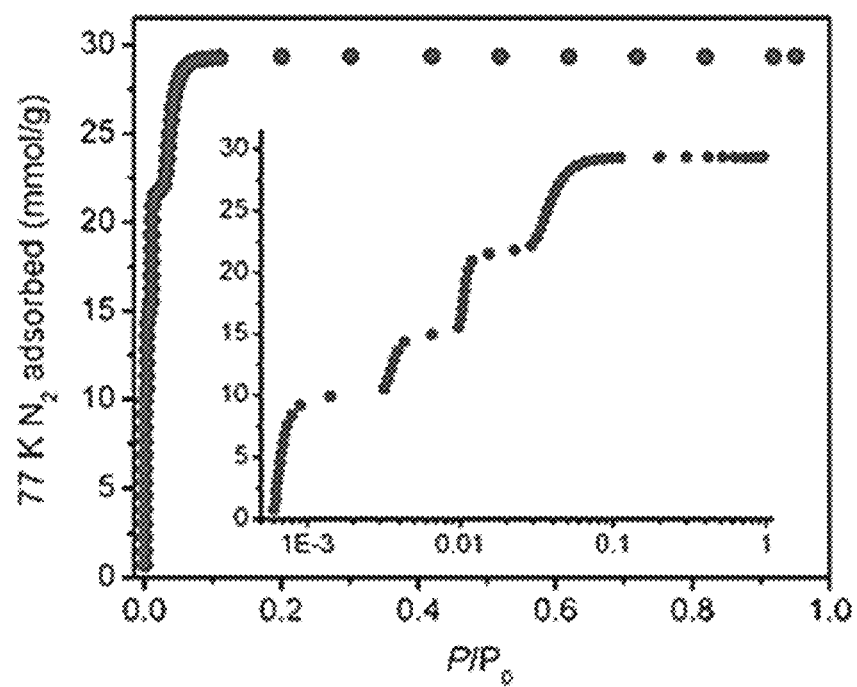
FIG. 14A-B provides nitrogen isotherms for Co(bdp) and Fe (bdp). (A) 77 K $N_2$ adsorption isotherm for Co(bdp) activated at 160° C. The calculated Langmuir surface area is 2911±1 $m^2/g$ ($n_{sat}$=29.8 mmol/g), and the total pore volume is 1.02 $cm^3/g$ ($P/P_0$=0.9). (B) 77 K $N_2$ adsorption isotherm for Fe(bdp) activated at 170° C. The calculated Langmuir surface area is 2780±3 $m^2/g$ ($n_{sat}$=28.5 mmol/g), and the total pore volume is 0.987 $cm^3/g$ ($P/P_0$=0.9). The insets show the isotherms with the x-axis ($P/P_0$, where $P_0$ is the saturation pressure of $N_2$) plotted on a logarithmic scale.
Figure 14B:
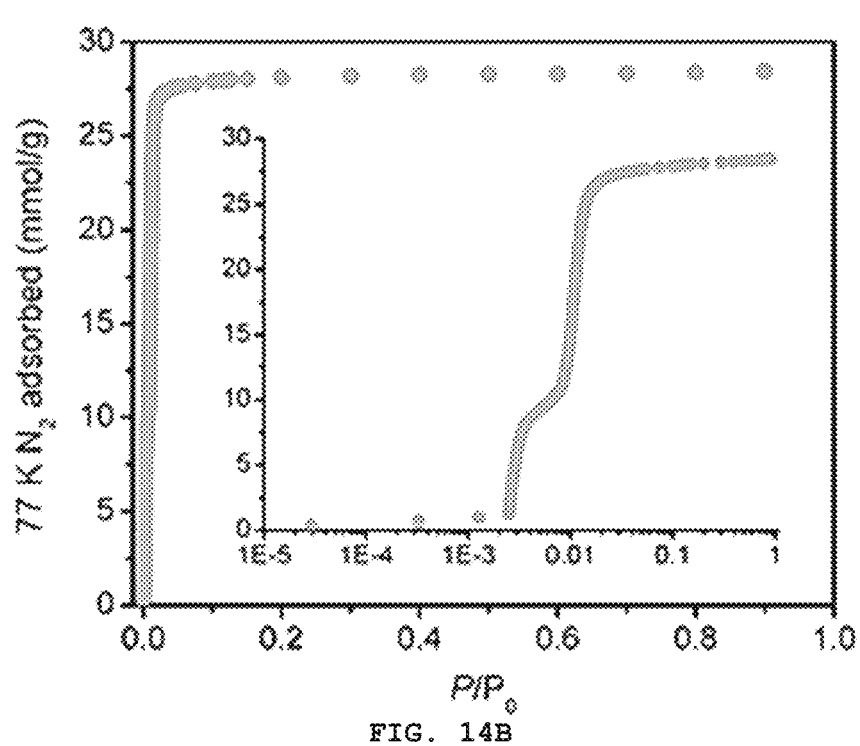
Figure 15:
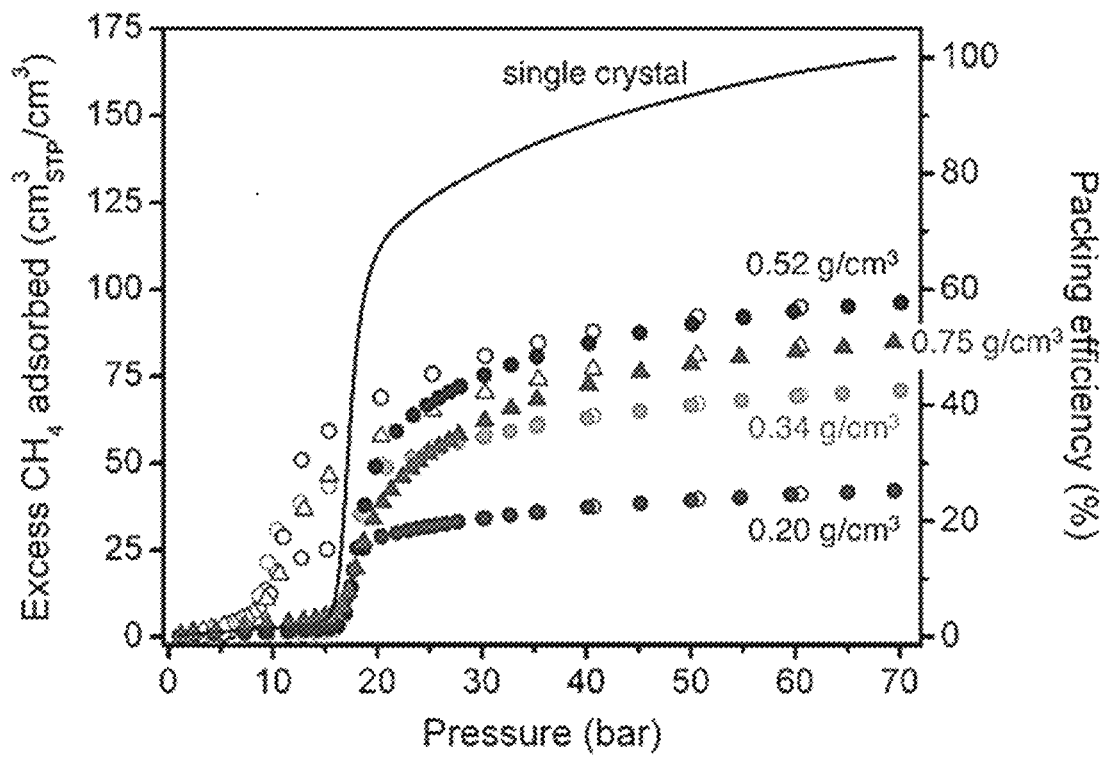
FIG. 15 provides excess high-pressure $CH_4$ adsorption isotherms at 25° C. for Co(bdp) at different packing densities, as measured during the applied uniaxial mechanical pressure experiments. The black line represents the excess $CH_4$ adsorption isotherm for an uncompacted single crystal of Co(bdp). Filled circles represent adsorption, while empty circles represent desorption.
Figure 16:
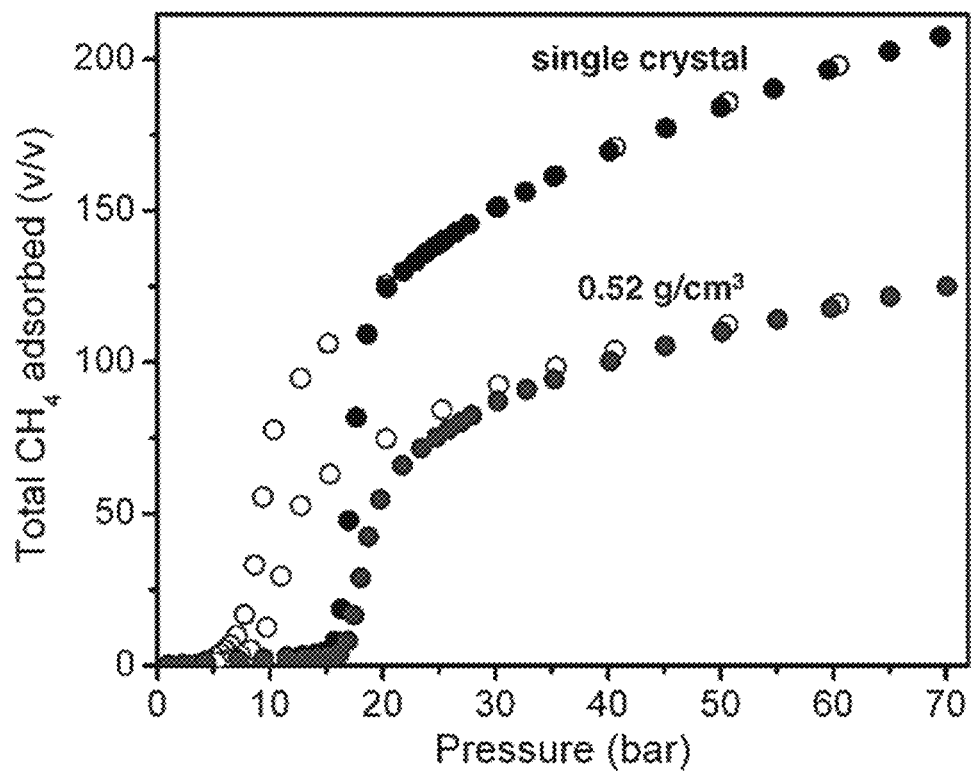
FIG. 16 provides total high-pressure $CH_4$ adsorption isotherms of Co(bdp) with a packing density of 0.52 $g/cm^3$ (blue) and for an uncompacted single crystal (blue). Filled circles represent adsorption, while empty circles represent desorption.

Gas adsorption isotherms for pressures in the range of 0-1.1 bar were measured using a Micromeritics ASAP 2020 or 2420 instrument. Activated samples were transferred under a $N_2$ atmosphere to pre-weighed analysis tubes, which were capped with a Transeal. Each sample was evacuated on the ASAP until the outgas rate was less than 3 μbar/min. The evacuated analysis tube containing degassed sample was then carefully transferred to an electronic balance and weighed to determine the mass of sample (typically 100-200 mg). The tube was then fitted with an isothermal jacked and transferred back to the analysis port of the ASAP. The outgas rate was again confirmed to be less than 3 μbar/min. Langmuir surface areas were determined by measuring $N_2$ adsorption isotherms in a 77 K liquid $N_2$ bath and calculated using the Micromeritics software, assuming a value of 16.2 Å$^2$ for the molecular cross-sectional area of $N_2$. The Langmuir surface areas of Co(bdp) and Fe(bdp) are 2911 and 2780 m$^2$/g, respectively. Full 77 K $N_2$ adsorption isotherms for Co(bdp) and Fe(bdp) can be found in FIG. 14. Note that BET surface areas cannot be accurately determined for either framework because of the steps in the low-pressure region of the 77 K $N_2$ adsorption isotherms.

High-Pressure $CH_4$ Adsorption Measurements.

High-pressure $CH_4$ adsorption isotherms in the range of 0-70 bar were measured on an HPVA-II-100 from Particulate Systems, a Micromeritics company. In a typical measurement, 0.5-1.0 g of activated sample was loaded into a tared stainless steel sample holder inside a glovebox under a $N_2$ atmosphere. Prior to connecting the sample holder to the VCR fittings of the complete high-pressure assembly inside the glovebox, the sample holder was weighed to determine the sample mass. The sample holder was then transferred to the HPVA-II-100, connected to the instrument's analysis port via an OCR fitting, and evacuated at room temperature for at least 2 h. The sample holder was placed inside an aluminum recirculating dewar connected to a Julabo FP89-HL isothermal bath filled with Julabo Thermal C2 fluid. The temperature stability of the isothermal bath is ±0.02° C. Methods for accurately measuring the relevant sample freespace, which involve the expansion of He from a calibrated volume at 0.7 bar and 25° C. to the evacuated sample holder, were described in Mason et al. (*Chem. Sci.* 5, 32-51 (2014)). Nonideality corrections were performed using the $CH_4$ compressibility factors tabulated in the NIST REFPROP database at each measured temperature and pressure.

Note that a sample size of 1.032 g was used for the 25° C. usable capacity calculations, compaction studies, and cycling studies with Co(bdp), while a sample size of 0.584 g was used for the variable-temperature measurements. For Fe(bdp), a sample size of 0.274 g was used for high-pressure adsorption measurements, with the exception for the isotherms measured at −12 and −25° C. for which a sample size of 0.322 g was used. Table 2 and Table 3 demonstrate $CH_4$ adsorption capabilities of Co(bdp) and Fe(bdp) and various pressures.

TABLE 2

Excess and total $CH_4$ adsorption data for Co(bdp) at 25° C.

| Excess Adsorption | | Total Adsorption | | |
|---|---|---|---|---|
| Pressure (bar) | $CH_4$ adsorbed (mmol/g) | Pressure (bar) | $CH_4$ adsorbed (mmol/g) | $CH_4$ adsorbed (cm$^3_{STP}$/cm$^3$)$^a$ |
| 1.0 | 0.0 | 1.0 | 0.0 | 0 |
| 2.3 | 0.0 | 2.3 | 0.0 | 1 |
| 4.2 | 0.0 | 4.2 | 0.1 | 1 |
| 7.2 | 0.1 | 7.2 | 0.1 | 2 |
| 9.5 | 0.1 | 9.5 | 0.1 | 2 |
| 11.5 | 0.2 | 11.5 | 0.2 | 3 |
| 12.9 | 0.2 | 12.9 | 0.2 | 3 |

TABLE 2-continued

Excess and total $CH_4$ adsorption data for Co(bdp) at 25° C.

| Excess Adsorption | | Total Adsorption | | |
|---|---|---|---|---|
| Pressure (bar) | $CH_4$ adsorbed (mmol/g) | Pressure (bar) | $CH_4$ adsorbed (mmol/g) | $CH_4$ adsorbed (cm$^3_{STP}$/cm$^3$)$^a$ |
| 14.1 | 0.2 | 14.1 | 0.2 | 4 |
| 15.0 | 0.3 | 15.0 | 0.3 | 5 |
| 15.8 | 0.4 | 15.8 | 0.5 | 8 |
| 16.4 | 1.0 | 16.4 | 1.1 | 19 |
| 17.0 | 2.5 | 17.0 | 2.8 | 48 |
| 17.7 | 4.3 | 17.7 | 4.7 | 82 |
| 18.6 | 5.8 | 18.6 | 6.3 | 109 |
| 20.4 | 6.5 | 20.4 | 7.2 | 124 |
| 21.8 | 6.8 | 21.8 | 7.5 | 130 |
| 22.9 | 6.9 | 22.9 | 7.7 | 133 |
| 23.8 | 7.1 | 23.8 | 7.8 | 136 |
| 24.7 | 7.2 | 24.7 | 8.0 | 138 |
| 25.6 | 7.3 | 25.6 | 8.1 | 141 |
| 26.5 | 7.4 | 26.5 | 8.2 | 143 |
| 27.7 | 7.5 | 27.7 | 8.4 | 146 |
| 30.2 | 7.7 | 30.2 | 8.7 | 151 |
| 32.7 | 7.9 | 32.7 | 9.0 | 156 |
| 35.2 | 8.1 | 35.2 | 9.3 | 161 |
| 40.1 | 8.4 | 40.1 | 9.8 | 170 |
| 45.2 | 8.7 | 45.2 | 10.2 | 177 |
| 50.0 | 8.9 | 50.0 | 10.6 | 184 |
| 54.7 | 9.1 | 54.7 | 11.0 | 190 |
| 59.6 | 9.3 | 59.6 | 11.3 | 197 |
| 65.0 | 9.4 | 65.0 | 11.7 | 203 |
| 69.5 | 9.5 | 69.5 | 12.0 | 208 |
| 60.5 | 9.3 | 60.5 | 11.4 | 198 |
| 50.7 | 9.0 | 50.7 | 10.7 | 186 |
| 40.7 | 8.5 | 40.7 | 9.9 | 171 |
| 35.4 | 8.1 | 35.4 | 9.3 | 162 |
| 30.3 | 7.7 | 30.3 | 8.7 | 151 |
| 25.3 | 7.2 | 25.3 | 8.0 | 140 |
| 20.4 | 6.6 | 20.4 | 7.2 | 126 |
| 15.2 | 5.7 | 15.2 | 6.1 | 106 |
| 12.7 | 5.1 | 12.7 | 5.5 | 95 |
| 10.3 | 4.3 | 10.3 | 4.5 | 78 |
| 9.4 | 3.1 | 9.4 | 3.2 | 56 |
| 8.6 | 1.8 | 8.6 | 1.9 | 33 |
| 7.8 | 0.9 | 7.8 | 1.0 | 17 |
| 7.1 | 0.6 | 7.1 | 0.6 | 10 |
| 6.5 | 0.4 | 6.5 | 0.4 | 7 |
| 6.1 | 0.3 | 6.1 | 0.3 | 5 |
| 5.7 | 0.2 | 5.7 | 0.2 | 4 |
| 5.3 | 0.2 | 5.3 | 0.2 | 3 |
| 4.6 | 0.1 | 4.6 | 0.1 | 2 |
| 4.2 | 0.1 | 4.2 | 0.1 | 1 |
| 3.2 | 0.0 | 3.2 | 0.0 | 0 |
| 2.0 | 0.0 | 2.0 | 0.0 | 0 |

$^a$Volumetric capacities are calculated using the crystallographic density of the $CH_4$ expanded phase. For usable capacity calculations, a small correction is applied to the amount of $CH_4$ adsorbed at 5.8 bar during desorption to properly account for the residual $CH_4$ present in the void space that is created as the framework contracts.

TABLE 3

Excess and total $CH_4$ adsorption data for Fe(bdp) at 25° C.

| Excess Adsorption | | Total Adsorption | | |
|---|---|---|---|---|
| Pressure (bar) | $CH_4$ adsorbed (mmol/g) | Pressure (bar) | $CH_4$ adsorbed (mmol/g) | $CH_4$ adsorbed (cm$^3_{STP}$/cm$^3$)$^a$ |
| 1.0 | 0.1 | 1.0 | 0.1 | 1 |
| 2.1 | 0.1 | 2.1 | 0.1 | 1 |
| 3.5 | 0.1 | 3.5 | 0.1 | 2 |
| 6.2 | 0.2 | 6.2 | 0.2 | 4 |
| 8.1 | 0.3 | 8.1 | 0.3 | 5 |
| 10.1 | 0.3 | 10.1 | 0.4 | 6 |
| 12.1 | 0.4 | 12.1 | 0.4 | 6 |
| 14.2 | 0.4 | 14.2 | 0.5 | 7 |
| 16.2 | 0.5 | 16.2 | 0.5 | 8 |
| 18.2 | 0.5 | 18.2 | 0.6 | 9 |

TABLE 3-continued

Excess and total CH$_4$ adsorption data for Fe(bdp) at 25° C.

| Excess Adsorption | | Total Adsorption | | |
|---|---|---|---|---|
| Pressure (bar) | CH$_4$ adsorbed (mmol/g) | Pressure (bar) | CH$_4$ adsorbed (mmol/g) | CH$_4$ adsorbed (cm$^3_{STP}$/cm$^3$)$^a$ |
| 20.2 | 0.6 | 20.2 | 0.7 | 11 |
| 21.6 | 0.7 | 21.6 | 0.7 | 12 |
| 22.7 | 0.7 | 22.7 | 0.8 | 13 |
| 23.6 | 0.8 | 23.6 | 0.9 | 15 |
| 24.5 | 1.1 | 24.5 | 1.2 | 19 |
| 25.3 | 1.8 | 25.3 | 2.0 | 32 |
| 25.9 | 3.2 | 25.9 | 3.6 | 56 |
| 26.6 | 4.9 | 26.6 | 5.4 | 86 |
| 27.6 | 6.4 | 27.6 | 7.2 | 114 |
| 28.5 | 7.2 | 28.5 | 8.1 | 128 |
| 29.5 | 7.6 | 29.5 | 8.6 | 136 |
| 30.5 | 7.9 | 30.5 | 8.9 | 141 |
| 31.5 | 8.1 | 31.5 | 9.2 | 145 |
| 32.5 | 8.3 | 32.5 | 9.4 | 148 |
| 33.4 | 8.5 | 33.4 | 9.6 | 151 |
| 34.3 | 8.6 | 34.3 | 9.7 | 154 |
| 35.2 | 8.8 | 35.2 | 9.9 | 157 |
| 36.2 | 8.9 | 36.2 | 10.0 | 159 |
| 37.2 | 9.0 | 37.2 | 10.2 | 161 |
| 38.2 | 9.0 | 38.2 | 10.3 | 163 |
| 39.2 | 9.1 | 39.2 | 10.4 | 165 |
| 40.2 | 9.2 | 40.2 | 10.5 | 166 |
| 42.7 | 9.4 | 42.7 | 10.8 | 171 |
| 45.1 | 9.6 | 45.1 | 11.5 | 175 |
| 47.7 | 9.7 | 47.7 | 11.7 | 178 |
| 50.1 | 9.8 | 50.1 | 11.9 | 181 |
| 55.0 | 9.9 | 55.0 | 12.3 | 186 |
| 59.6 | 10.0 | 59.6 | 12.6 | 191 |
| 65.1 | 10.1 | 65.1 | 12.9 | 196 |
| 70.1 | 10.2 | 70.1 | 13.3 | 202 |
| 60.6 | 9.9 | 60.6 | 12.5 | 191 |
| 50.7 | 9.7 | 50.7 | 11.8 | 179 |
| 40.7 | 9.2 | 40.7 | 10.6 | 167 |
| 35.4 | 8.7 | 35.4 | 9.9 | 156 |
| 30.3 | 8.2 | 30.3 | 9.1 | 145 |
| 25.3 | 7.6 | 25.3 | 8.4 | 133 |
| 20.3 | 6.8 | 20.3 | 7.4 | 117 |
| 18.0 | 6.4 | 18.0 | 6.9 | 109 |
| 16.3 | 5.8 | 16.3 | 6.2 | 97 |
| 14.4 | 3.6 | 14.4 | 3.8 | 61 |
| 13.4 | 2.3 | 13.4 | 2.5 | 39 |
| 12.2 | 1.4 | 12.2 | 1.5 | 23 |
| 11.1 | 0.9 | 11.1 | 1.0 | 15 |
| 10.2 | 0.7 | 10.2 | 0.8 | 12 |
| 9.2 | 0.5 | 9.2 | 0.6 | 9 |
| 7.1 | 0.3 | 7.1 | 0.3 | 5 |
| 5.2 | 0.2 | 5.2 | 0.2 | 3 |
| 3.2 | 0.1 | 3.2 | 0.1 | 2 |
| 1.4 | 0.1 | 1.4 | 0.1 | 1 |

$^a$Volumetric capacities are calculated using the crystallographic density of the CH$_4$ expanded phase. For usable capacity calculations, a small correction is applied to the amount of CH$_4$ adsorbed at 5.8 bar during desorption to properly account for the residual CH$_4$ present in the void space that is created as the framework contracts.

Figure 17A:
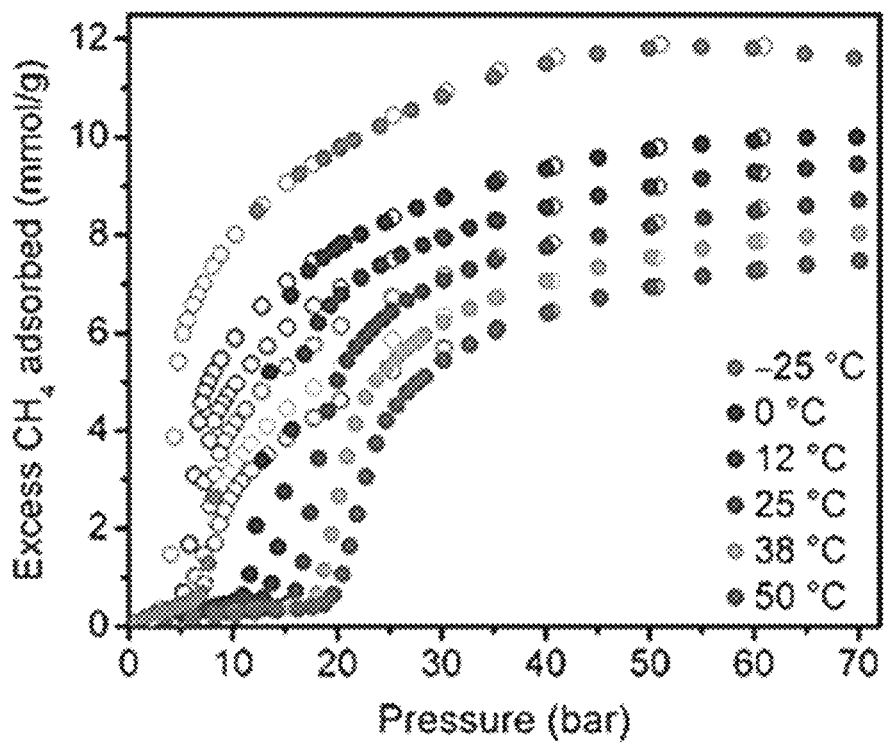
FIG. 17A-C presents excess $CH_4$ adsorption data. (A) Excess $CH_4$ adsorption isotherms at −25, 0, 12, 25, 38, and 50° C. for Co(bdp). (B) Excess $CH_4$ adsorption isotherms at −25, −12, 0, 12, 25, 38, and 50° C. for Fe(bdp). (C) Excess $CH_4$ adsorption isotherms at 25° C. compared for Co(bdp) (purple) and Fe(bdp) (orange). Filled and empty circles correspond to adsorption and desorption, respectively.
Figure 17B:
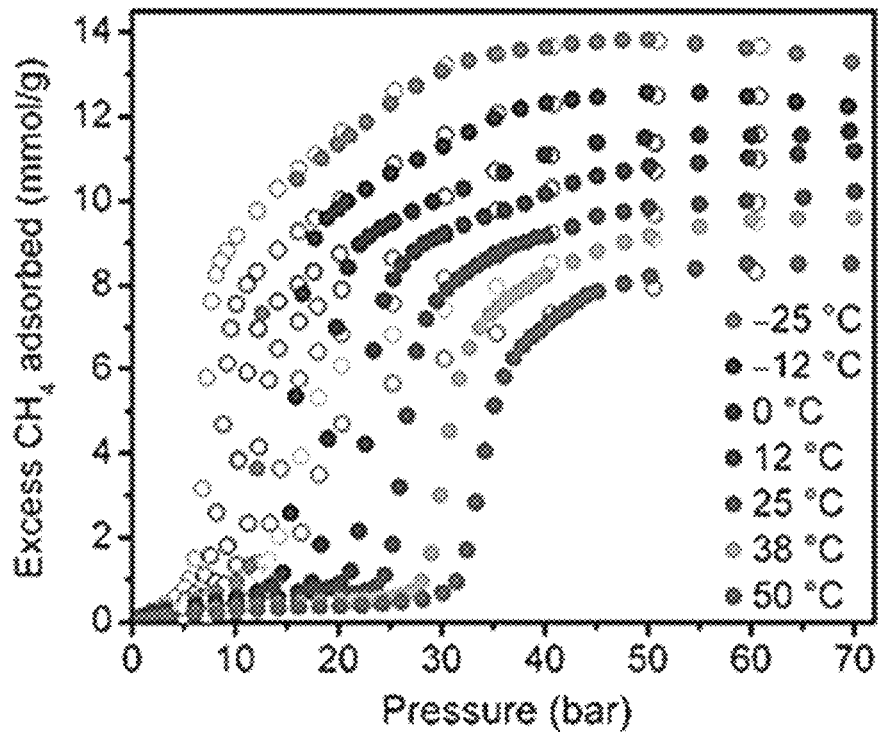
Figure 17C:
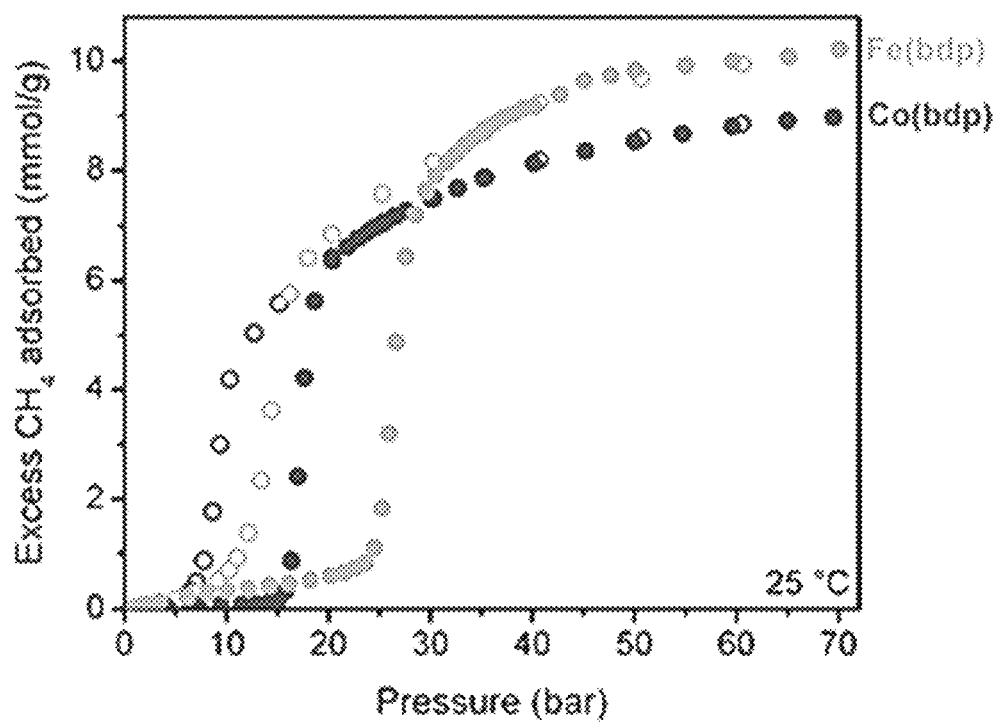

To determine the usable CH$_4$ capacity of Co(bdp) and Fe(bdp), experimentally measured excess gravimetric adsorption data (see FIG. 17) were converted to total volumetric adsorption data using the pore volume and crystallographic density of the CH$_4$ expanded phases. Table 4 demonstrates the usable capacities of Co(bdp) and Fe(bdp) in comparison to other adsorbents.

TABLE 4

Summary of the total gravimetric usable CH$_4$ capacity (mmol/g) calculations at 25° C. for Co(bdp), Fe(bdp), and a selection of the best previously reported metal-organic frameworks. The minimum desorption pressure is 5.8 bar.

| | 5.8 bar total (mmol/g) | 35 bar total (mmol/g) | 65 bar total (mmol/g) | 35 bar usable (mmol/g) | 65 bar usable (mmol/g) |
|---|---|---|---|---|---|
| Co(bdp) | 0.3 | 9.0 | 11.2 | 8.7 | 10.9 |
| Fe(bdp) | 0.2 | 9.9 | 12.9 | 9.7 | 12.7 |
| HKUST-1 | 4.1 | 11.3 | 13.3 | 7.2 | 9.2 |
| UTSA-76a | 4.3 | 13.5 | 16.4 | 9.2 | 12.1 |
| MOF-5 | 2.2 | 10.7 | 15.4 | 8.5 | 13.2 |
| MOF-519 | 2.6 | 9.4 | 12.2 | 6.8 | 9.6 |

High-Pressure CH$_4$ Adsorption Measurements Under Applied Mechanical Pressure.

Figure 18A:
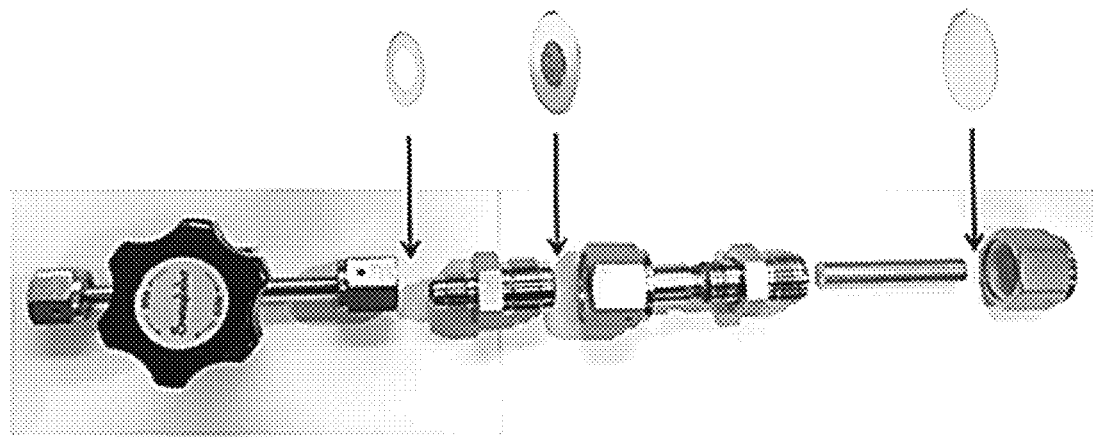
FIG. 18A-B presents mechanical pressure data. (A) Sample holder used for combined applied mechanical pressure and high-pressure $CH_4$ adsorption experiments. The sample is located in the volume to the right of the fritted gasket and to the left of the blank gasket. A press is used to compact metal rods of different lengths against the sample, and the blank gasket is sealed behind the rod so that the uniaxial applied mechanical pressure (and constricted volume) is maintained throughout the high-pressure $CH_4$ adsorption experiment. (B) Excess $CH_4$ isotherms at 25° C. for Co(bdp) before (green) and after (purple) the applied mechanical pressure studies. Filled and empty circles correspond to adsorption and desorption, respectively.
Figure 18B:
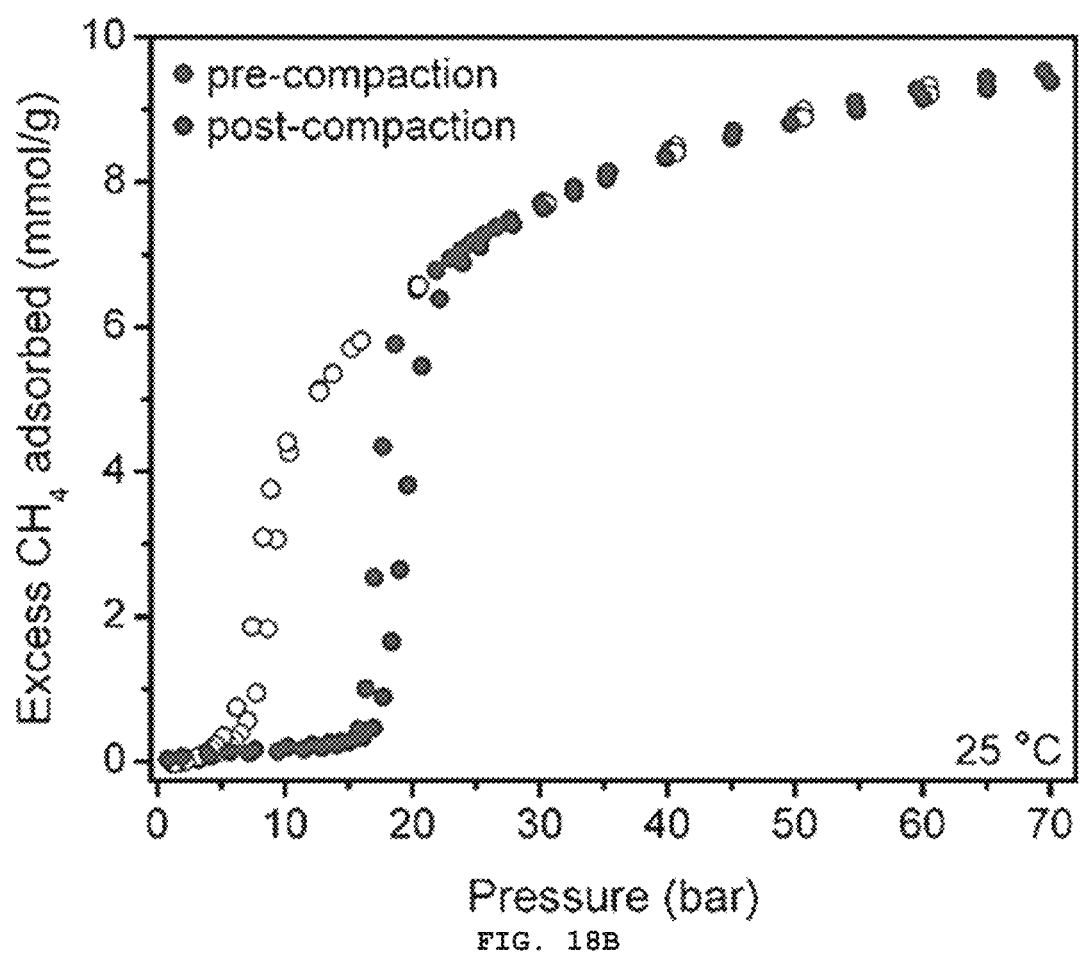

For the high-pressure CH$_4$ adsorption measurements of Co(bdp) at different applied mechanical pressures, a custom aluminum sample holder was designed and used (see FIG. 18). The sample is loaded in the volume between the fritted and blank gaskets. The free volume between the fritted and blank gaskets in the absence of a sample was determined by expansion of He from a calibrated volume to be 5.242 mL. Initially, 1.032 g of Co(bdp) was loaded into this volume, resulting in a bulk density of 0.197 g/mL for the uncompacted powder. After measuring a high-pressure CH$_4$ adsorption isotherm, the sample holder was returned to a glovebox under a N$_2$ atmosphere, and the cell was opened by removing the cap behind the blank gasket. An aluminum rod with an outer diameter slightly less than the inner diameter of the sample holder was then inserted. A mechanical press was used to compact the sample by pushing down on the rod. A fresh blank gasket was then sealed behind the rod so that the rod was left pressed against the sample, with a continuously applied uniaxial mechanical pressure. The sample holder was returned to the high-pressure instrument and fully evacuated before measuring a high-pressure CH$_4$ adsorption isotherm. This experiment was repeated after inserting additional metal rods to further compact the Co(bdp), increase the applied mechanical pressure, and reduce the sample volume. Packing densities for each experiment were calculated by subtracting the volume of each rod from the sample volume.

It is important to note that the decrease in the total amount of CH$_4$ adsorbed at higher mechanical pressures (see FIG. 21) is not due to framework degradation, as is often observed when compacting classical adsorbents, and can instead be explained by insufficient CH$_4$ pressure to induce a phase transition in some crystallites and by a lack of sufficient free volume for all crystallites to expand into. To confirm this, a CH$_4$ adsorption isotherm was measured after compacting collapsed Co(bdp) to a packing density of 0.75 g/cm$^3$, which is just below the crystallographic density of the expanded phase, and releasing the applied mechanical pressure by removing the metal rod. The resulting isotherm was found to be nearly identical to the pre-compaction isotherm, demonstrating that all Co(bdp) crystallites could once again fully expand (see FIG. 18).

Powder X-Ray Diffraction Measurements.

Powder X-ray diffraction data for Co(bdp), Co(bdp)-derivatives and Fe(bdp) were collected on Beamline 17-BM-B at the Advanced Photon Source (APS) at Argonne National Laboratory and Beamline MS-X04SA at the Swiss Light Source (SLS) at the Paul Scherrer Institut (see FIG. 20). For variable CH$_4$ pressure experiments, approximately 10 mg of fully desolvated framework was loaded into 1.5 mm quartz glass capillaries inside a glovebox under a $N_2$ atmosphere. Each capillary was attached to a custom designed gas-dosing cell, which is equipped with a gas valve, and was then transferred to the goniometer head. All adsorbed $N_2$ was removed by evacuating in situ using a turbomolecular pump. A cryostat was used to hold the temperature constant at 25° C., and variable pressures of $CH_4$ were dosed to the samples. Diffraction data were collected after allowing each dose to equilibrate for several minutes. All X-ray wavelengths were between 0.72 Å and 0.78 Å, and are specified for each experiment in the relevant figures and tables.

The structure solution and refinement procedure used in this study followed an in house protocol, and others, for the structural characterization of polycrystalline samples of non-ideal crystallinity and moderately complex structures by ab initio powder diffraction methods The general procedure, which was fully adopted for the collapsed Co(bdp) phase, is presented below.

A standard peak search, followed by peak profile fitting was first used to determine accurate peak positions of several well-separated low-angle peaks. These peak positions were used to obtain approximate lattice parameters via the single-value-decomposition indexing procedure implemented in the software TOPAS-R (Bruker AXS, v 3.0, 2005, Karlsruhe, Germany), which were later refined by the structureless Le Bail method as implemented in TOPAS-R. Systematic absences, density considerations and previous knowledge of isotypic species coherently allowed the derivation of the correct space group, which was later confirmed by successful structure solution and Rietveld refinement. The structural model was derived using the simulated annealing procedure as implemented in TOPAS-R, which is a real-space structure solution technique, with a single freely floating metal ion and an idealized half $bdp^{2-}$ ligand defined using z-matrix formalism. In the collapsed phase of Co(bdp), for instance, the metal atom was located on a twofold axis at 0, y, ¼, while the half $bdp^{2-}$ ligand was hinged about the inversion center at ¼, ¾, 0. Once an initial structural model was established, complete Rietveld refinements were performed in the software TOPAS-R. The background was modeled with Chebyshev polynomials, and Lorentz and absorption correction factors were applied. A single isotropic B value was attributed to all atoms, and found to act, as expected, as a scavenger for θ-dependent systematic errors, not suitably taken into account in the data-reduction process. After the retrieval of the lattice metrics and space group symmetry for the $CH_4$ expanded phases, defining a starting structural model was straightforward, as it is implicit in the isotypic nature of the compounds. The contribution of the (likely tumbling, but not necessarily randomly located) $CH_4$ molecules to the overall scattering power has been neglected, which likely contributes to the decreased physical meaning of the atomic displacement parameter values, as is common for crystal structures determined from powder diffraction data.

As indicated, the peak widths of the collapsed Co(bdp) and Fe(bdp) could not be modeled by convoluting conventional Lorentzian and Gaussian functions (or their combinations) with systematic $\cos^{-1} \theta$ or $\tan \theta$ dependency, respectively, or with smooth hkl dependent models (such as spherical harmonics). Instead, modeling the hkl peak widths as distinct from the axial reflections of the h00 and 0k0 type using a purely phenomenological model was performed. However, in order to have more than a phenomenological description of the complicated peak widths in the diffraction patterns, a paracrystalline model for collapsed Co(bdp) was developed. This model was also representative of the collapsed Fe(bdp) phase. Crystallographic data for Co(bdp) and Fe(bdp) are presented in Tables 5-7.

TABLE 5

Crystallographic data for X-ray powder diffraction structures.

|  | Co(bdp) | Co(bdp) | Fe(bdp) | Fe(bdp) | Fe(bdp) |
|---|---|---|---|---|---|
| $CH_4$ pressure (bar) | 0 | 30 | 0 | 40 | 50 |
| Temperature (° C.) | 25 | 25 | 25 | 25 | 25 |
| Crystal system | Monoclinic | Monoclinic | Monoclinic | Monoclinic | Tetragonal |
| Space group | C 2/c | C 2/c | C 2/c | C 2/c | $P4_2/mmc$ |
| a (Å) | 24.8274(6) | 21.763(2) | 25.086(2) | 20.15(3) | 13.41(1) |
| b (Å) | 6.6747(4) | 15.220(2) | 6.8878(3) | 17.91(2) | =a |
| c (Å) | 7.1456(3) | 6.9827(7) | 6.9845(5) | 6.953(4) | 7.20(1) |
| β (Å) | 92.550(2) | 97.37(1) | 91.653(6) | 97.34(6) | 90.0 |
| V (Å$^3$) | 1182.97(9) | 2293.8(5) | 1206.4(1) | 2489(5) | 1295(3) |
| Z | 4 | 4 | 4 | 4 | 2 |
| λ (Å) | 0.77475 | 0.75009 | 0.72768 | 0.72768 | 0.72768 |

TABLE 6

Summary of estimated standard deviations (esd's) in unit cell volumes and crystallographic densities for x-ray powder diffraction structures.

| phase | unit cell volume (Å$^3$) | esd (Å$^3$) | crystallographic density (g/cm$^3$) | esd (g/cm$^3$) |
|---|---|---|---|---|
| collapsed Co(bdp) | 1182.97 | 0.09 | 1.50 | 0.0001 |
| expanded Co(bdp) | 2293.8 | 0.5 | 0.774 | 0.0002 |
| collapsed Fe(bdp) | 1206.4 | 0.1 | 1.45 | 0.0001 |
| expanded Fe(bdp) (40 bar) | 2489 | 5 | 0.705 | 0.001 |
| expanded Fe(bdp) (50 bar) | 1295 | 3 | 0.678 | 0.002 |

TABLE 7

Full widths at half maximum (FWHM) for the most prominent low-angle peaks in the diffraction pattern of the collapsed phase of Co(bdp) as determined from simulations of a paracrystal and a periodic crystal are compared to the experimental observed values.

| Bragg peak | FWHM (observed) | FWHM (paracrystal) | FWHM (periodic) |
|---|---|---|---|
| 200 | 0.053 | 0.044 | 0.040 |
| 110 | 0.162 | 0.123 | 0.048 |
| 400 | 0.056 | 0.039 | 0.038 |
| 310 | 0.140 | 0.145 | 0.042 |

TABLE 7-continued

Full widths at half maximum (FWHM) for the most prominent low-angle peaks in the diffraction pattern of the collapsed phase of Co(bdp) as determined from simulations of a paracrystal and a periodic crystal are compared to the experimental observed values.

| Bragg peak | FWHM (observed) | FWHM (paracrystal) | FWHM (periodic) |
|---|---|---|---|
| 11-1 | 0.112 | 0.119 | 0.062 |
| 31-1 | 0.095 | 0.133 | 0.052 |

Single Crystal X-Ray Diffraction Measurements.

X-ray diffraction analyses were performed on a single crystal of Fe(bdp) that was coated with Paratone-N oil and mounted on a MiTeGen loop. The crystal of Fe(bdp) was first kept frozen at 100 K by an Oxford Cryosystems Cryostream 800 plus, and after a full data collection, the crystal was warmed to 298 K for a second data collection. Diffraction data for Fe(bdp) was collected at Beamline 11.3.1 at the Advanced Light Source, Lawrence Berkeley National Laboratory using synchrotron radiation ($\lambda$=0.7749 Å) with 10 omega scans for the 100 K structure, and 4° phi and 1° omega scans for the 298 K structure. A Bruker PHOTON100 CMOS diffractometer was used for data collection, and the corresponding Bruker AXS APEX II software was used for data collection and reduction. Raw data was integrated and corrected for Lorentz and polarization effects using the Bruker AXS SAINT software. Absorption corrections were applied using TWINABS for the 100 K structure and SADABS for the 298 K structure. Space group assignments were determined by examination of systematic absences, E-statistics, and successive refinement of the structures of Fe(bdp) at 100 K and 298 K. The structures were solved using direct methods with SHELXS and refined using SHELXL operated in the OLEX2 interface. Thermal parameters were refined anisotropically for all non-hydrogen atoms. Hydrogen atoms were placed in ideal positions and refined using a riding model for all structures.

The crystal was determined to be twinned at 100 K and a suitable unit cell was determined that is similar to that previously reported for Co(bdp).3DMF in the space group $P2_1/c$ (ref. 36). The program CELL_NOW was used to determine the orientation matrices, and the domains were found to related by a 179.90 rotation around the reciprocal axis [0.5 0 1]. Raw data for both matrices were integrated and corrected for absorption using TWINABS. Solution and refinement of the data in $P2_1/c$ required significantly less restraints in structure refinement and gave much lower values for R1 compared to those solved in other space groups. Solvent molecules could be refined anisotropically in the crystal of Fe(bdp) at 100 K, accounting for all pore void space.

When the crystal was warmed to 298 K, the space group was determined to be $C222_1$ instead of $P2_1/c$ and was refined as an inversion twin (BASF=0.52(4)). At 298 K, there was extensive solvent disorder that could not be modeled. A solvent mask was applied, as implemented in OLEX2, to account for unassigned electron density within the pores. The loss in intensity of spots upon warming to 298 K, and the large anisotropic displacement parameters that result from linker and solvent disorder, gave rise to A and B level alerts from checkCIF. Responses addressing these alerts have been included in the CIF and can be read in reports generated by checkCIF. Table 8 presents Crystallographic data for single crystal of Fe (bdp).

TABLE 8

Crystallographic data for single crystal X-ray diffraction structures of DMF-solvated Fe(bdp).

|  | Fe(bdp) 100 K | Fe(bdp) 298 K |
|---|---|---|
| Formula | $C_{21}H_{29}FeN_7O_3$ | $C_{12}H_8FeN_4$ |
| Crystal System | Monoclinic | Orthorhombic |
| Space Group | $P2_1/c$ | $C222_1$ |
| a, b, c (Å) | 13.4333(4), 13.8493(4), 26.7477(9) | 17.3648(10), 20.4338(11), 14.0029(8) |
| α, β, γ (°) | 90, 101.5505(18), 90 | 90 |
| V, (Å$^3$) | 4875.4(3) | 4968.6(5) |
| Z | 8 | 8 |
| Radiation, $\lambda$ (Å) | Synchrotron, 0.7749 | Synchrotron, 0.7749 |
| R1[a], wR2[b] (I > 2σ(I)) | 0.0670, 0.1547 | 0.0468, 0.1250 |
| R1[a], wR2[b] (all data) | 0.0874, 0.1645 | 0.0558, 0.1308 |

[a]$R_1 = \Sigma||F_o| - |F_c||/\Sigma|F_o|$. [b]$wR_2 = \{\Sigma[w(F_o^2 - F_c^2)^2]/\Sigma[w(F_o^2)^2]\}^{1/2}$.

TABLE 9

Selected structural information for the DEF-solvated compounds studied via single crystal X-ray diffraction.

|  | Co(bdp) | Co(D$_4$-bdp) | Co(F-bdp) | Co(o-F$_2$-bdp) | Co(p-F$_2$-bdp) |
|---|---|---|---|---|---|
| Formula | CoC$_{12}$H$_8$N$_4$ | CoC$_{12}$H$_4$D$_4$N$_4$ | CoC$_{12}$H$_7$FN$_4$ | CoC$_{12}$H$_6$F$_2$N$_4$ | CoC$_{12}$H$_6$F$_2$N$_4$ |
| Temperature (K) | 298(2) | 298(2) | 100(2) | 298(2) | 298(2) |
| Crystal System | Tetragonal | Tetragonal | Tetragonal | Tetragonal | Tetragonal |
| Space Group | $P4_122$ | $P4_322$ | $P4_322$ | $P4_322$ | $P4_3$ |
| a, b, c (Å) | 13.2708(4), 13.2708(4), 14.3502(5) | 13.2909(5), 13.2909(5), 14.3560(6) | 13.3100(5), 13.3100(5), 13.9569(6) | 13.2891(5), 13.2891(5), 43.2262(19) | 13.2715(5), 13.2715(5), 14.6258(6) |
| α, β, γ (°) | 90 | 90 | 90 | 90 | 90 |
| V, (Å$^3$) | 2527.27(18) | 2536.0(2) | 2472.6(2) | 7633.8(7) | 2576.1(2) |
| Z | 4 | 4 | 4 | 12 | 4 |
| Radiation, $\lambda$ (Å) | Synchrotron, 0.7749 | Synchrotron, 0.7749 | Synchrotron, 0.7749 | Synchrotron, 0.8856 | Synchrotron, 0.8856 |
| Data/Restraints/Parameters | 2322/0/81 | 3051/0/81 | 2271/0/99 | 6994/210/289 | 5895/103/175 |
| Goodness of Fit on F$^2$ | 1.128 | 1.149 | 1.116 | 1.066 | 1.072 |
| R1[a], wR2[b] (I > 2σ(I)) | 0.0279, 0.0810 | 0.0270, 0.0850 | 0.0297, 0.0816 | 0.0492, 0.1311 | 0.0354, 0.0909 |

TABLE 9-continued

Selected structural information for the DEF-solvated compounds studied via single crystal X-ray diffraction.

|  | Co(bdp) | Co($D_4$-bdp) | Co(F-bdp) | Co(o-$F_2$-bdp) | Co(p-$F_2$-bdp) |
|---|---|---|---|---|---|
| $R1^a$, $wR2^b$ (all data) | 0.0329, 0.0836 | 0.0300, 0.0868 | 0.0363, 0.0844 | 0.0601, 0.1409 | 0.0393, 0.0929 |
| Largest Diff. Peak and Hole (e Å$^{-3}$) | 0.190 and −0.294 | 0.227 and −0.243 | 0.300 and −0.365 | 0.836 and −1.552 | 0.259 and −0.241 |

$^{a}R_1 = \Sigma||F_o| - |F_c||/\Sigma|F_o|, ^{b}wR_2 = \{\Sigma[w(F_o^2 - F_c^2)^2]/\Sigma[w(F_o^2)^2]\}^{1/2}$

TABLE 10

Selected structural information for the compounds studied via in situ powder X-ray diffraction.

|  | Co($D_4$-bdp) | Co(p-$Me_2$-bdp) | Co(p-$F_2$-bdp) | Co(p-$F_2$-bdp) |
|---|---|---|---|---|
| Pressure/bar | 0 | 0 | 0 | 19.7 |
| Space group | C2/c | C2/c | P2$_1$/c | C2/c |
| a/Å | 24.687(9) | 24.640(3) | 7.028(2) | 20.912(9) |
| b/Å | 6.667(1) | 8.6962(9) | 24.520(7) | 16.530(5) |
| c/Å | 7.091(3) | 7.129(7) | 7.320(7) | 6.949(1) |
| α/° | 90 | 90 | 90 | 90 |
| β/° | 92.40(4) | 90.08(1) | 111.9(1) | 98.1(1) |
| γ/° | 90 | 90 | 90 | 90 |
| V/Å$^3$ | 1166.2(6) | 1527.7(3) | 1170.0(5) | 2378(1) |
| Density/ g/cm$^3$ | 1.5330(8) | 1.3357(3) | 1.7208(8) | 0.8298(5) |

Scanning Electron Microscopy.

Figure 21B:
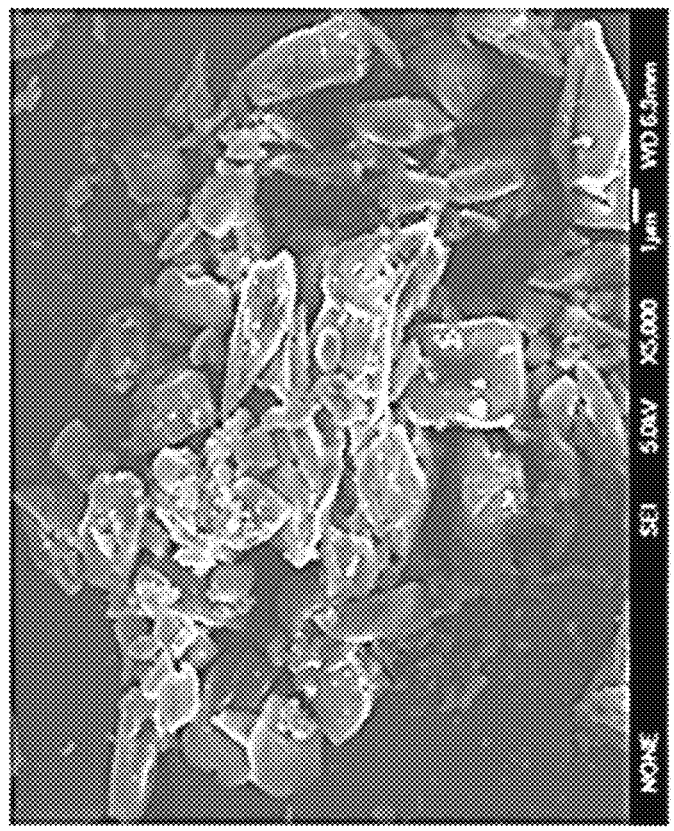
FIG. 21A-C presents SEM images Co(bdp) microcrystalline powders. (A), Scanning electron microscope (SEM) image of DMF-solvated Co(bdp) microcrystalline powder. The scale-bar corresponds to a distance of 10 μm. (B), SEM image of Co(bdp) microcrystalline powder after more than 100 $CH_4$ adsorption-desorption cycles. The scale-bar corresponds to a distance of 1 μm. (C), SEM image of desolvated Fe(bdp) microcrystalline powder. The scale-bar corresponds to a distance of 1 μm.
Figure 21A:
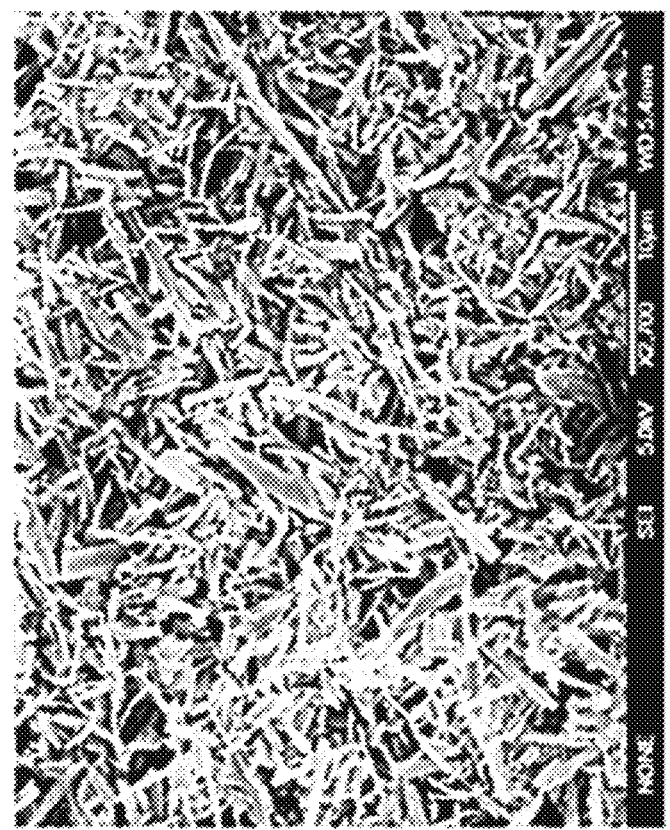
Figure 21C:
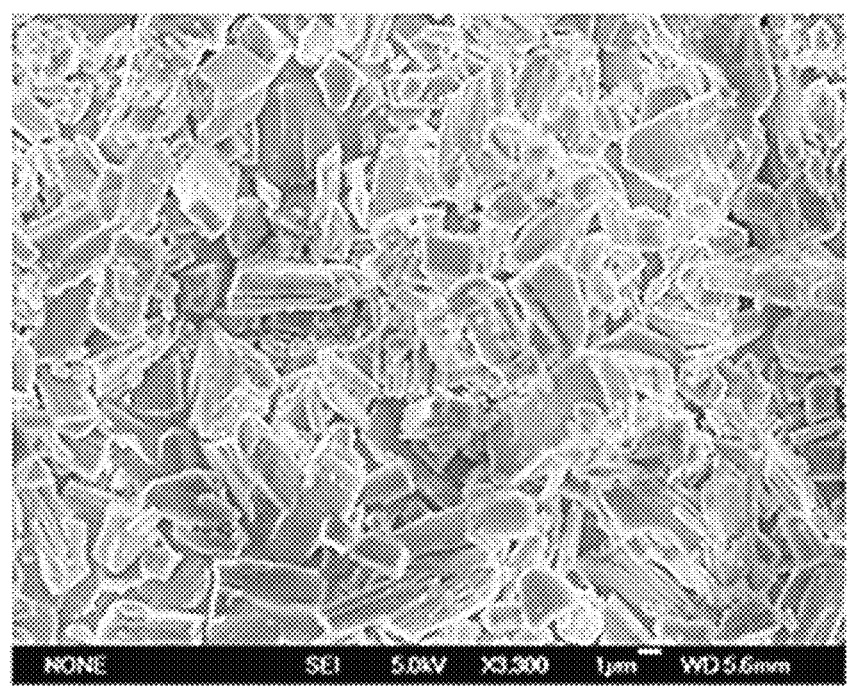

Scanning electron microscopy (SEM) samples of Co(bdp) and Fe(bdp) were prepared by dispersing microcrystalline powders into DCM and drop casting onto a silicon chip (see FIG. 21). In order to dissipate charge, the samples were sputter coated with ~3 nm of Au (Denton Vacuum, LLC). Crystals were imaged at 5 keV/12 μA by field emission SEM (JEOL FSM6430).

Microcalorimetry Measurements.

Approximately 0.2 g of Co(bdp) was used for combined microcalorimetry and high-pressure $CH_4$ adsorption experiments. Prior to each experiment, samples were outgassed ex situ at 423 K for 16 h under a dynamic vacuum of $10^{-3}$ mbar. The microcalorimetry experiments were performed using a home built manometric adsorption apparatus coupled with a Tian-Calvet type microcalorimeter. This experimental device allows the simultaneous determination of the adsorption isotherm and the adsorption enthalpy using a point by point introduction of gas to the sample. A multi-pneumovalve system allows the introduction of the adsorbate to the sample. An exothermic thermal effect accompanied each introduction, which is due to both the adsorption process and gas compression. This peak in the energy curve with time is thus integrated in order to calculate a pseudo-differential enthalpy of adsorption for each dose. Errors in this calculation can be estimated at ±1 kJ mol-1. Experiments were carried out at 303 K and up to 70 bar with $CH_4$ of a purity of above 99.999%.

Langmuir Surface Area Measurements.

Langmuir surface areas were determined by measuring $N_2$ adsorption isotherms in a 77 K liquid $N_2$ bath using a Micromeritics ASAP 2020 or 2420 instrument. Because all of the reported metal-organic frameworks are flexible and undergo $N_2$-induced phase changes throughout the $N_2$ adsorption isotherms, Langmuir surface areas were calculated using the $N_2$ uptake at 0.9 bar to approximate the saturation capacity. This value (in mmol $N_2$/g) was converted to m$^2$/g assuming a value of 16.2 Å$^2$ for the molecular cross-sectional area of $N_2$ (see Table Si). Note that BET surface areas cannot be accurately determined for either framework because of the steps in the low-pressure 77 K $N_2$ adsorption isotherms.

Accessible $N_2$ Surface Area and Pore Volume Calculations.

The accessible $N_2$ surface area of collapsed Co(p-$Me_2$-bdp) was calculated from the crystal structure of the activated material using an $N_2$-sized probe molecule, a technique that has been shown to be consistent with experimentally measured surface areas for a wide range of metal-organic frameworks. The calculated accessible surface area was then converted to a total pore volume using the cross-sectional area of $N_2$ (16.2 Å$^2$) and the density of liquid $N_2$ (0.808 g/mL), yielding a pore volume analogous to one that would be calculated from an experimentally measured 77 K $N_2$ adsorption isotherm.

Pre-Step $CH_4$ Adsorption in Co(F-Bdp).

In contrast to Co($D_4$-bdp), Co(p-$F_2$-bdp) and Co(o-$F_2$-bdp), the $CH_4$ adsorption isotherm for Co(F-bdp) shows some degree of adsorption before the step. To understand this, in situ powder X-ray diffraction data was collected on an activated sample of Co(F-bdp) under dynamic vacuum, but the sample showed a mixture of collapsed and expanded phases. Repeated syntheses failed to produce a completely collapsed material at 0 bar, so crystal structures could not be obtained. It was hypothesized that the pre-step $CH_4$ adsorption in Co(F-bdp) is the result of some particles failing to collapse under vacuum, which could be caused by the presence of impurities or unreacted ligand within the pores.

Stepped High-Pressure $CH_4$ Isotherms:

An adsorbent with a stepped high-pressure $CH_4$ isotherm, Co(bdp) (bdp$^{2-}$=1,4-benzenedipyrazolate), was compared with an adsorbent with a classical high-pressure $CH_4$ isotherm, $Cu_3$(btc)$_2$ (HKUST-1; btc$^{3-}$=1,3,5-benzenetricarboxylate). While Co(bdp) is a flexible metal-organic framework, HKUST-1 has the highest reported volumetric $CH_4$ usable capacity of any metal-organic framework. FIG. 1 illustrates the synthesis and structure of solvated Co(bdp). After de-solvating at 150° C., the framework collapses to a closed phase with negligible porosity.

Figure 2:
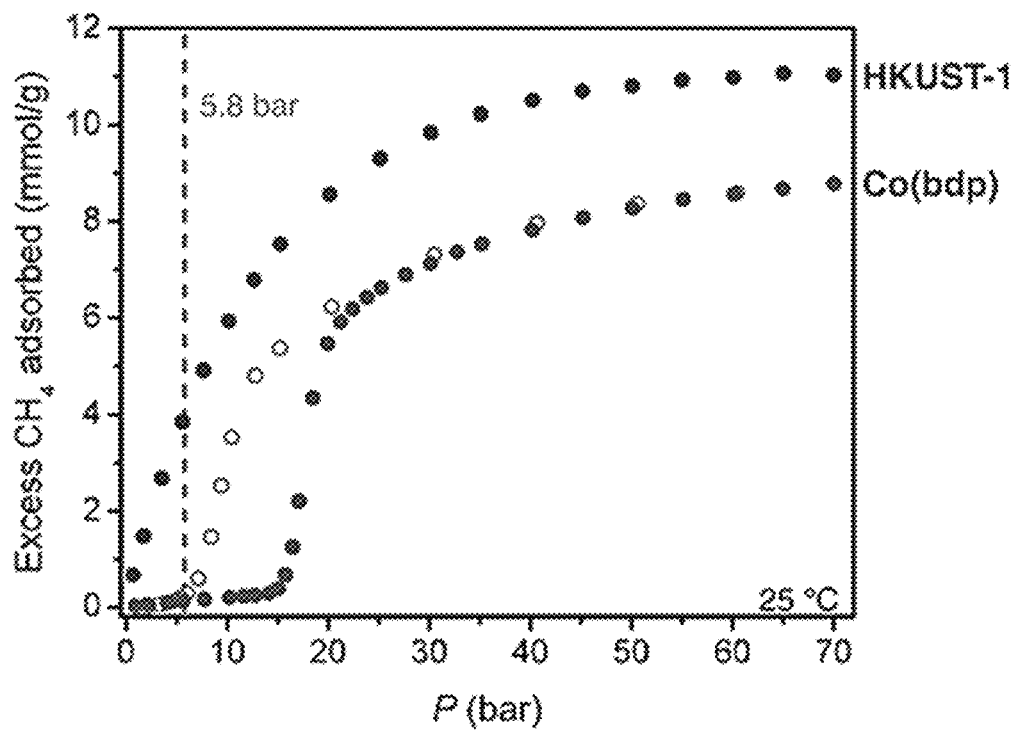
FIG. 2 provides for the comparison of the high-pressure excess $CH_4$ adsorption isotherms of HKUST-1 (blue) and Co(bdp) (green) at 25° C.

FIG. 2 shows that the S-shaped or stepped high-pressure $CH_4$ isotherm of Co(bdp) differed dramatically from the continuous, Langmuir-type isotherm that is characteristic of classical adsorbents such as HKUST-1. More specifically, Co(bdp) had negligible $CH_4$ adsorption at pressures below 15 bar. At a pressure of around 15 bar, however, there was a sudden, sharp increase in the amount of $CH_4$ adsorbed, and after a pressure of around 20 bar, the amount of $CH_4$ adsorbed began to approach that of HKUST-1. Considering that the fully activated Co(bdp) was collapsed and had negligible porosity, the step in this high-pressure isotherm could be attributed to a pore-opening process, whereby once $CH_4$ was at a sufficiently high pressure, the pores were opened and there was a rapid increase in the amount of $CH_4$ adsorbed.

Figure 3:
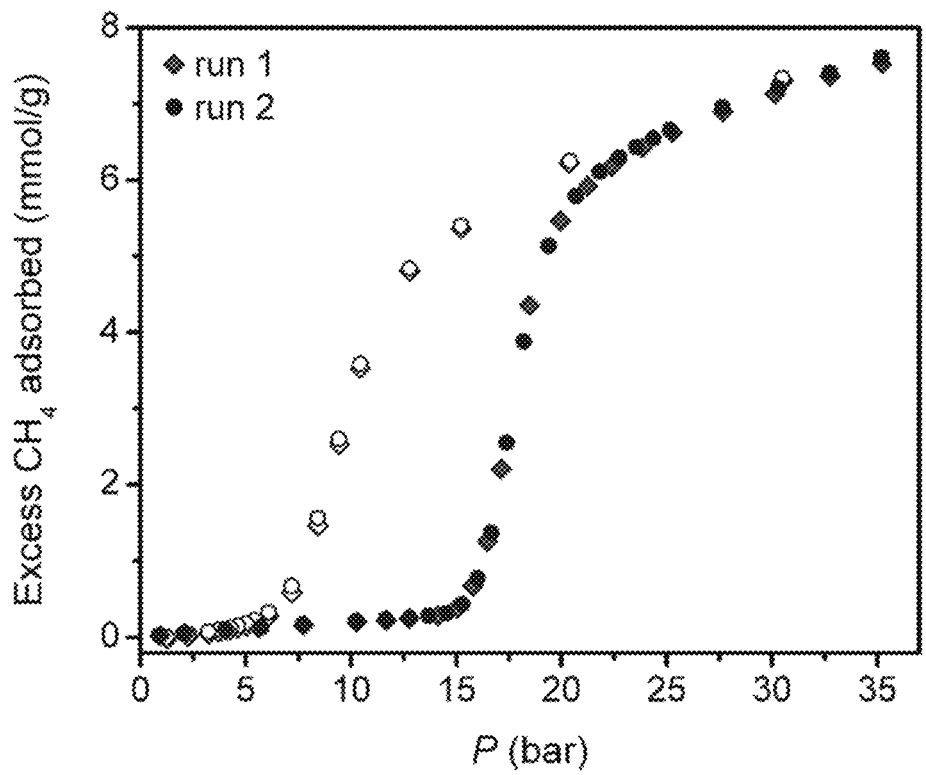
FIG. 3 provides for excess $CH_4$ adsorption isotherms for Co(bdp) showing the adsorption (filled symbols) and desorption (empty symbols) isotherms are fully reproducible after evacuation for 1 h at 25° C.

FIG. 3 shows that there was hysteresis in the high-pressure $CH_4$ desorption isotherm of Co(bdp) with the pores closing at a pressure near 8 bar. FIG. 3 also shows that the pore opening and closing is fully reproducible and that there were not any significant changes in the adsorption and desorption isotherms of Co(bdp) during initial cycling.

Figure 4:
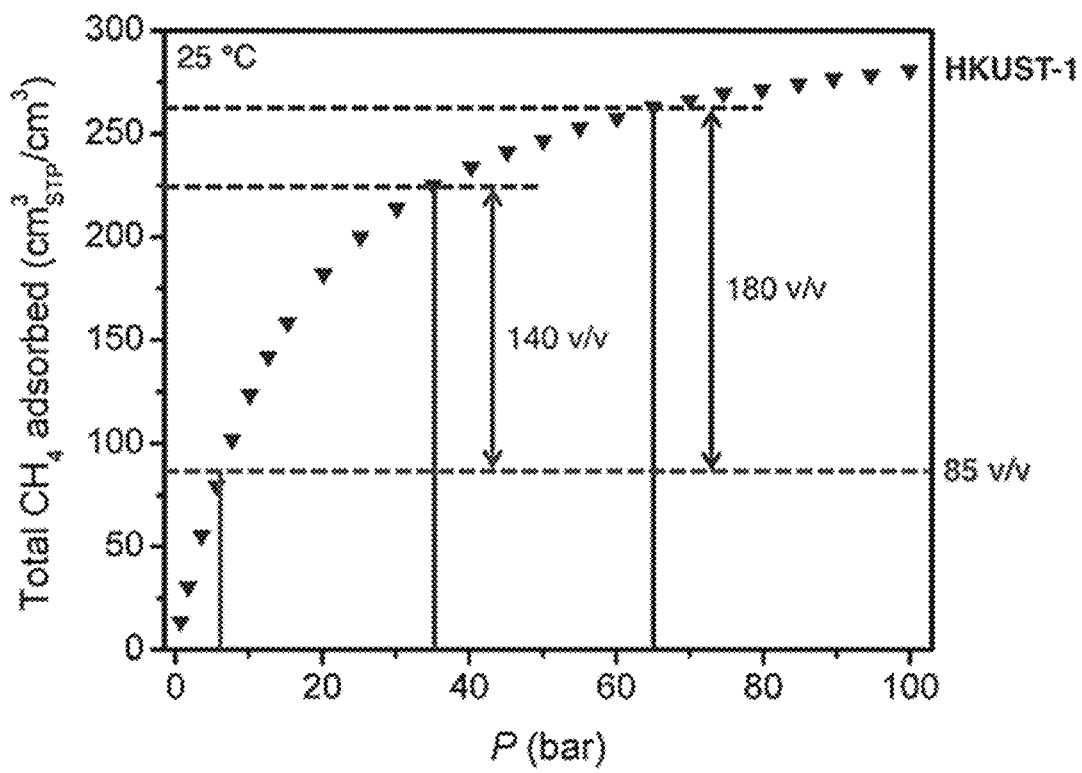
FIG. 4 presents the total volumetric usable capacity of the best classical adsorbent, HKUST-1, at 25° C. for adsorption at 35 or 65 bar and desorption at 5.8 bar.

Even though HKUST-1 adsorbed more $CH_4$ than Co(bdp) at high pressures, it is important to consider that some this capacity would be inaccessible for applications that impose a minimum delivery pressure, such as delivering natural gas to a vehicle's combustion engine. The usable capacity, rather than the total capacity, is more important and is defined as the amount of gas that can be delivered when decreasing from an adsorption pressure to a specific desorption pressure. For $H_2$ and $CH_4$ storage in passenger vehicles, increasing the volumetric usable capacity is more important than increasing the gravimetric usable capacity for maximizing driving range. For $CH_4$ storage applications, the minimum desorption pressure is expected to be near 5.8 bar, and the target adsorption pressure is between 35 and 65 bar. Assuming a minimum desorption pressure of 5.8 bar, the volumetric usable capacity of HKUST-1 at 25° C. is 140 $cm_{STP}^3$ $cm_{adsorbent}^{-3}$ (v/v) and 180 v/v for adsorption at 35 bar and 65 bar, respectively. FIG. 4 illustrates the usable $CH_4$ capacity calculation for HKUST-1 and shows that 85 v/v of stored $CH_4$ is inaccessible because it is still adsorbed at 5.8 bar.

Figure 5:
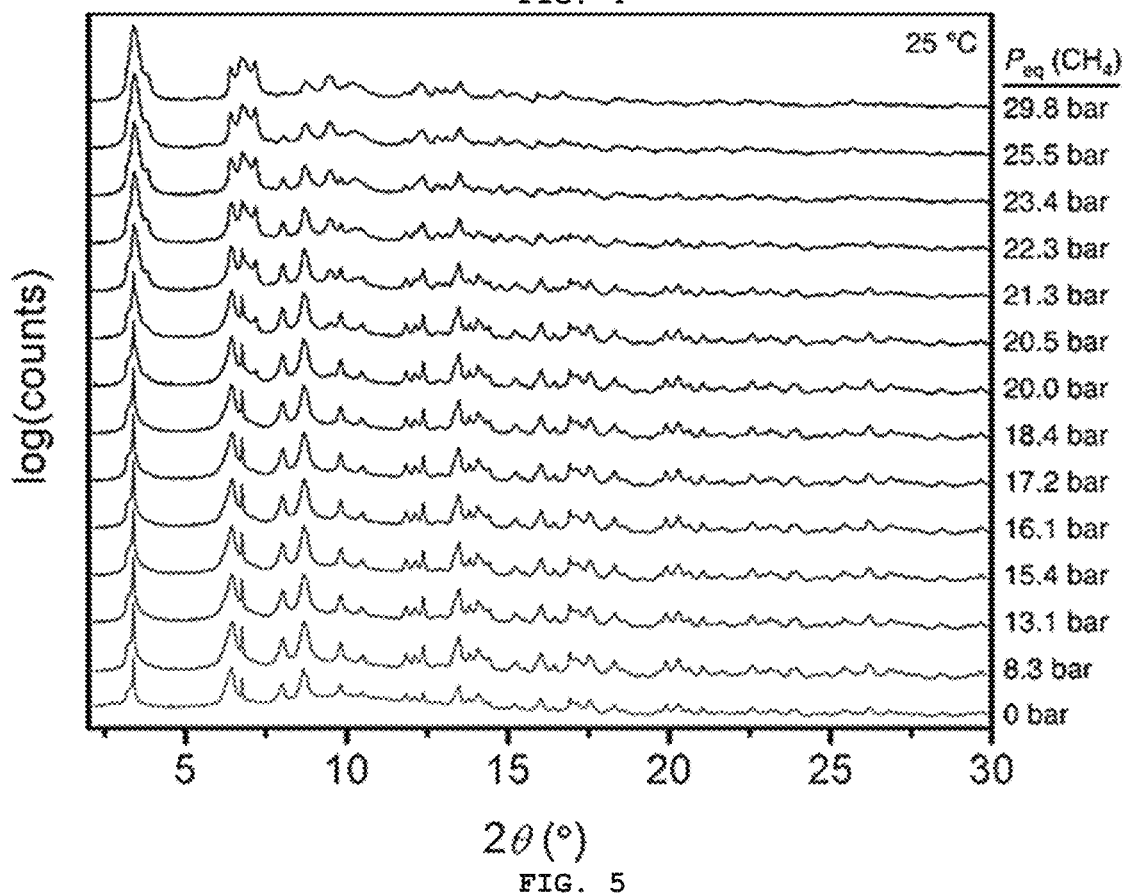
FIG. 5 presents in situ X-ray powder diffraction patterns for Co(bdp) at 25° C. as the pressure of $CH_4$ is increased from 0 to 29.8 bar. The wavelength is 0.72959 Å.
Figure 6:
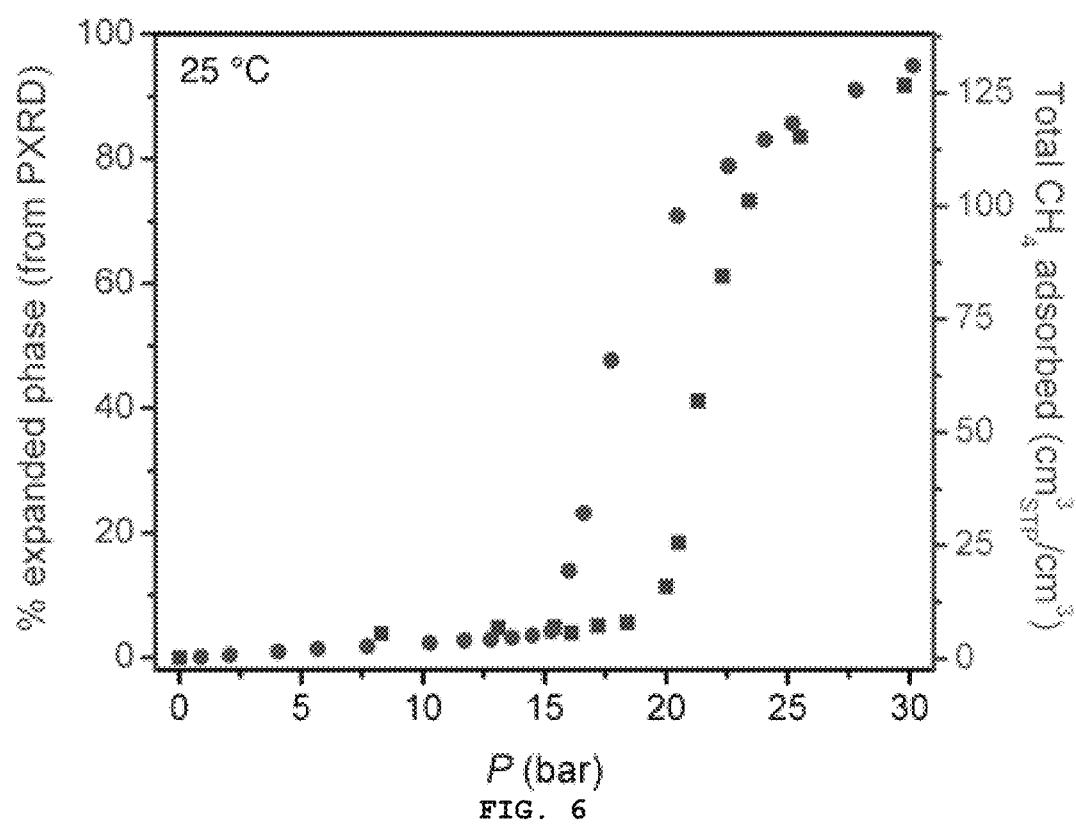
FIG. 6 presents the percentage of the expanded Co(bdp) phase present (purple), as determined from in situ X-ray powder diffraction, and is overlaid with the total $CH_4$ adsorption isotherm (green). Both the diffraction and adsorption experiments are at 25° C.
Figure 7:
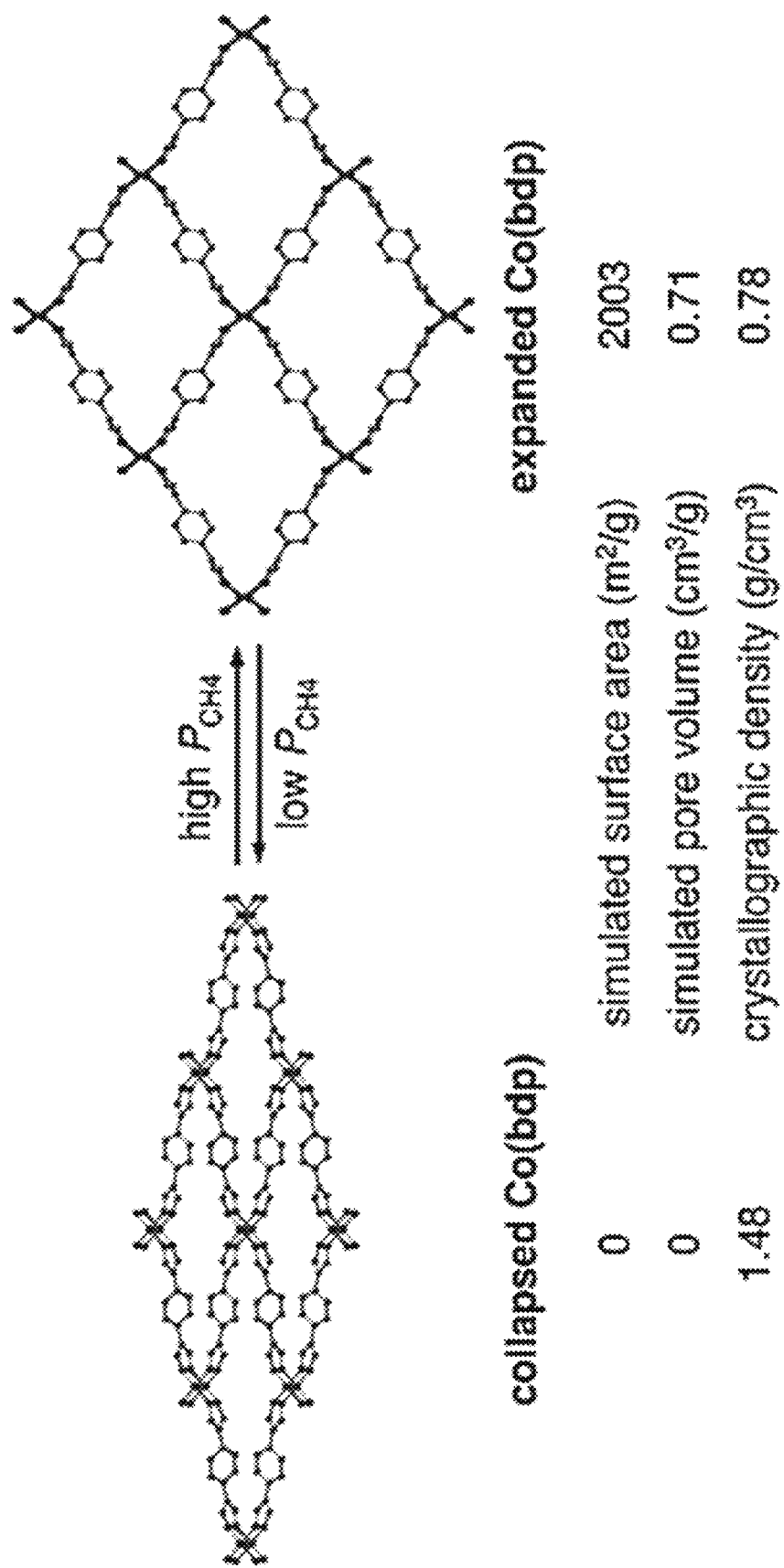
FIG. 7 presents crystals structures of Co(bdp) for the collapsed and expanded phases. Gray, blue, and purple spheres represent C, N, and Co atoms, respectively; H atoms have been omitted for clarity.

In Situ X-Ray Powder Diffraction Experiments:

In order to calculate the volumetric usable $CH_4$ capacity of Co(bdp), the structure of the framework over the entire pressure range of interest must be known precisely so that an accurate crystallographic density can be determined. In situ X-ray powder diffraction experiments were used to show that Co(bdp) undergoes a single phase change from a collapsed to expanded structure as the pressure of $CH_4$ was increased from 0 to 30 bar at 25° C. (see FIGS. 5-6). The structures of both the collapsed and expanded phases were solved and fully refined using the Rietveld method (see FIG. 7). The crystallographic densities of the collapsed and expanded phases are 1.48 and 0.78 g/cm³, respectively, and these values can be used to calculate the volumetric usable capacities. Since the framework exists as the collapsed phase at low $CH_4$ pressures, Co(bdp) adsorbs less than 4% the amount of $CH_4$ adsorbed by HKUST-1 at the minimum desorption pressure of 5.8 bar. TABLE 11 summarizes the volumetric usable capacity calculations for Co(bdp) and HKUST-1.

TABLE 11

Summary of usable $CH_4$ capacities for Co(bdp) and HKUST-1 at 25° C.:

|  | Co(bdp) | HKUST-1 |
| --- | --- | --- |
| collapsed pore volume (cm³/g) | 0 | — |
| collapsed cryst. density (g/cm³) | 1.48 | — |
| expanded pore volume (cm³/g) | 0.71 | 0.77 |
| Expanded cryst. density (g/cm³) | 0.78 | 0.88 |
| 35 bar total $CH_4$ adsorbed (v/v) | 152 | 225 |
| 65 bar total $CH_4$ adsorbed (v/v) | 190 | 265 |
| 5.8 bar total $CH_4$ desorbed (v/v) | 4 | 85 |
| 35 bar usable capacity (v/v) | 148 | 140 |
| 65 bar usable capacity (v/v) | 186 | 180 |

Highlighting a principle advantage of adsorbents with stepped isotherms, the volumetric usable capacity of Co(bdp) is 6% higher than HKUST-1 for adsorption at 35 bar and 3% higher for adsorption at 65 bar. While less important, it is still worth noting that the gravimetric usable capacity of Co(bdp) is 19% higher than HKUST-1 for adsorption at 35 bar and 16% higher for adsorption at 65 bar.

Isosteric Heat of Adsorption from High-Pressure Adsorption Isotherms.

Figure 8:
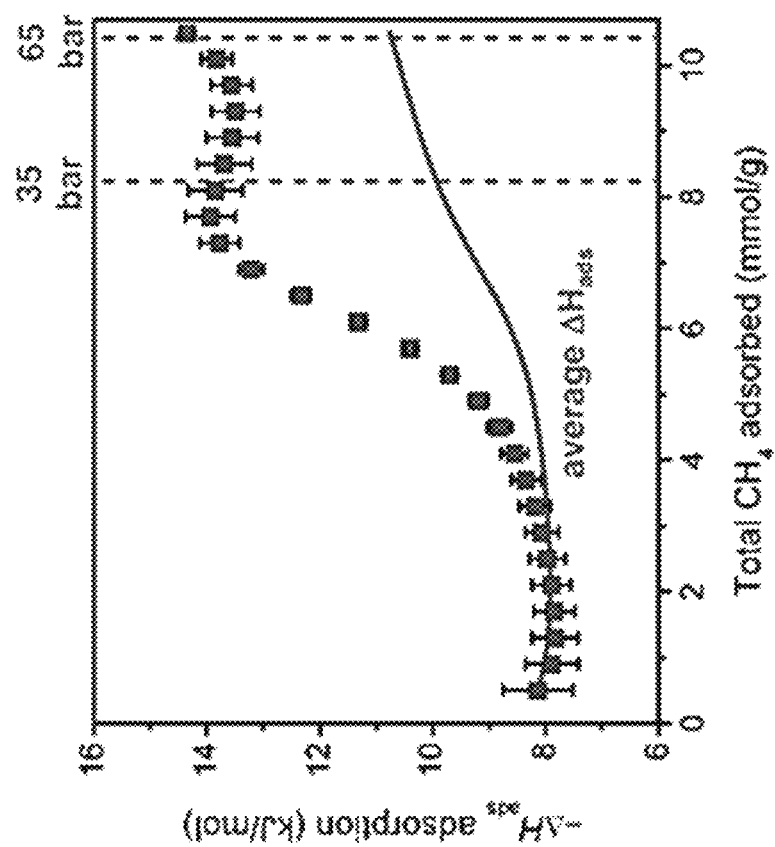
FIG. 8 presents: left, total $CH_4$ adsorption isotherms for Co(bdp) at 0, 12, 25, and 50° C. The black lines correspond to mathematical fits to the isotherm data using offset Langmuir-Freundlich equations. Right, isosteric heat of $CH_4$ adsorption for Co(bdp) as a function of the total amount of $CH_4$ adsorbed. The red line corresponds to the average total heat of adsorption at a given loading.
Figure 8:
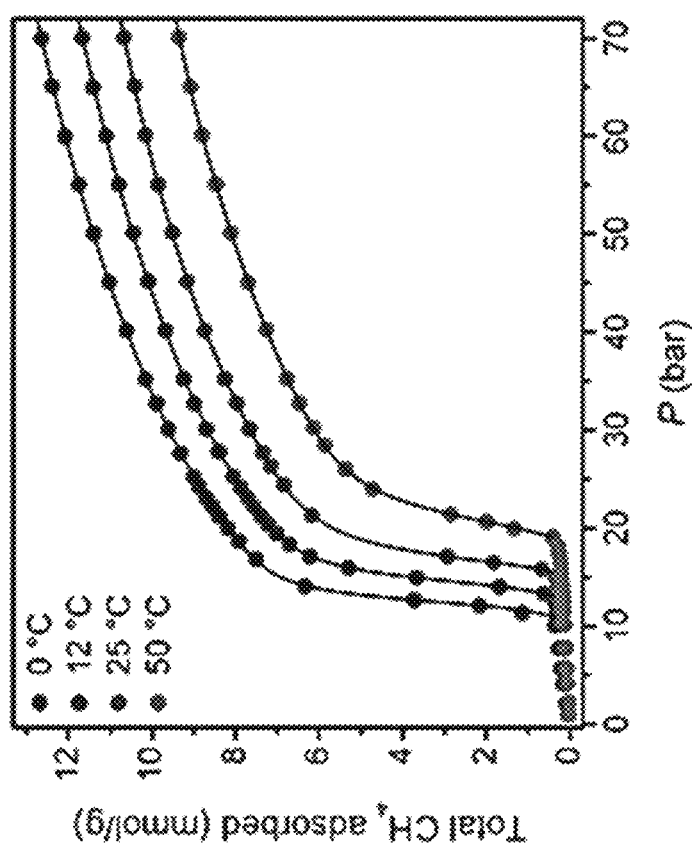

To calculate the isosteric heat of adsorption for $CH_4$ in Co(bdp) and Fe(bdp), high-pressure adsorption isotherms were measured at 0, 12, 25, and 50° C. The step in the adsorption isotherm of Co(bdp) and Fe(bdp) shifted to higher pressures as the temperature was increased. By fitting these isotherms with Langmuir-Freundlich equations that have been offset by the step pressure at each temperature (see FIG. 8) the Clausius-Clapeyron relation was used to calculate the isosteric heats of adsorption as a function of the amount of $CH_4$ adsorbed (see Tables 12-15).

TABLE 12

Single-site Langmuir parameters (Eqn 2.8) for $CH_4$ absorption in the expanded phases of Co(bdp) and Fe(bdp).

|  | Co(bdp) | Fe(bdp) |
| --- | --- | --- |
| $n_{sat}$ (mol $CH_4$ per mol MOF) | 4.23 | 4.97 |
| $h_{ads}$ (kJ per mol $CH_4$) | −13.5 | −12.7 |
| $S_{ads}$ (R) | −8.8 | −8.6 |

TABLE 13

Single-site Langmuir parameters (Eqn 2.18) for $CH_4$ adsorption in the pre-step region of Co(bdp) and Fe(bdp) isotherms.

|  | Co(bdp) | Fe(bdp) |
| --- | --- | --- |
| $n_{sat}$ (mmol g$^{-1}$) | 1.79 | 25 |
| $h_{ads}$ (kJ per mol $CH_4$) | −13.0 | −11.9 |
| $S_{ads}$ (R) | −9 | −11.4 |

TABLE 14

Offset dual-site Langmuir-Freundlich parameters (Eqn 2.18) for $CH_4$ adsorption in Co(bdp).

|  | 0° C. | 12° C. | 25° C. | 38° C. | 50° C. |
| --- | --- | --- | --- | --- | --- |
| $n_{sat, 1}$ (mmol g$^{-1}$) | 5.3 | 5.1 | 4.3 | 3.7 | 3.2 |
| $b_1$ (bar$^{-v1}$) | 0.014 | 0.0046 | 0.0067 | 0.0016 | 0.00032 |
| $v_1$ | 4.6 | 4.5 | 3.9 | 4.4 | 4.9 |
| $n_{sat, 2}$ (mmol g$^{-1}$) | 22.8 | 17.8 | 12.2 | 10.1 | 9.2 |
| $b_2$ (bar$^{-v2}$) | 0.041 | 0.036 | 0.042 | 0.037 | 0.030 |
| $v_2$ | 0.61 | 0.71 | 0.84 | 0.99 | 1.1 |
| $P_{trans}$ (bar) | 10.4 | 12.1 | 14.5 | 16.1 | 17.2 |

TABLE 15

Offset dual-site Langmuir-Freundlich parameters (Eqn 2.18) for $CH_4$ adsorption in Fe(bdp).

|  | 0° C. | 12° C. | 25° C. | 38° C. | 50° C. |
| --- | --- | --- | --- | --- | --- |
| $n_{sat, 1}$ (mmol g$^{-1}$) | 7.5 | 6.9 | 5.7 | 5.5 | 4.2 |
| $b_1$ (bar$^{-v1}$) | 0.0024 | 5.3 × 10$^{-5}$ | 2.3 × 10$^{-4}$ | 2.8 × 10$^{-4}$ | 2.8 × 10$^{-5}$ |
| $v_1$ | 5.9 | 7.2 | 6.2 | 5.4 | 6.3 |
| $n_{sat, 2}$ (mmol g$^{-1}$) | 22.5 | 18.7 | 7.9 | 9.7 | 7.2 |
| $b_2$ (bar$^{-v2}$) | 0.040 | 0.040 | 0.085 | 0.052 | 0.037 |

TABLE 15-continued

Offset dual-site Langmuir-Freundlich parameters
(Eqn 2.18) for CH$_4$ adsorption in Fe(bdp).

| | 0° C. | 12° C. | 25° C. | 38° C. | 50° C. |
|---|---|---|---|---|---|
| v$_2$ | 0.60 | 0.69 | 1.0 | 0.99 | 1.5 |
| P$_{trans}$ (bar) | 16.4 | 18.9 | 22.6 | 26.0 | 28.7 |

Figure 9:
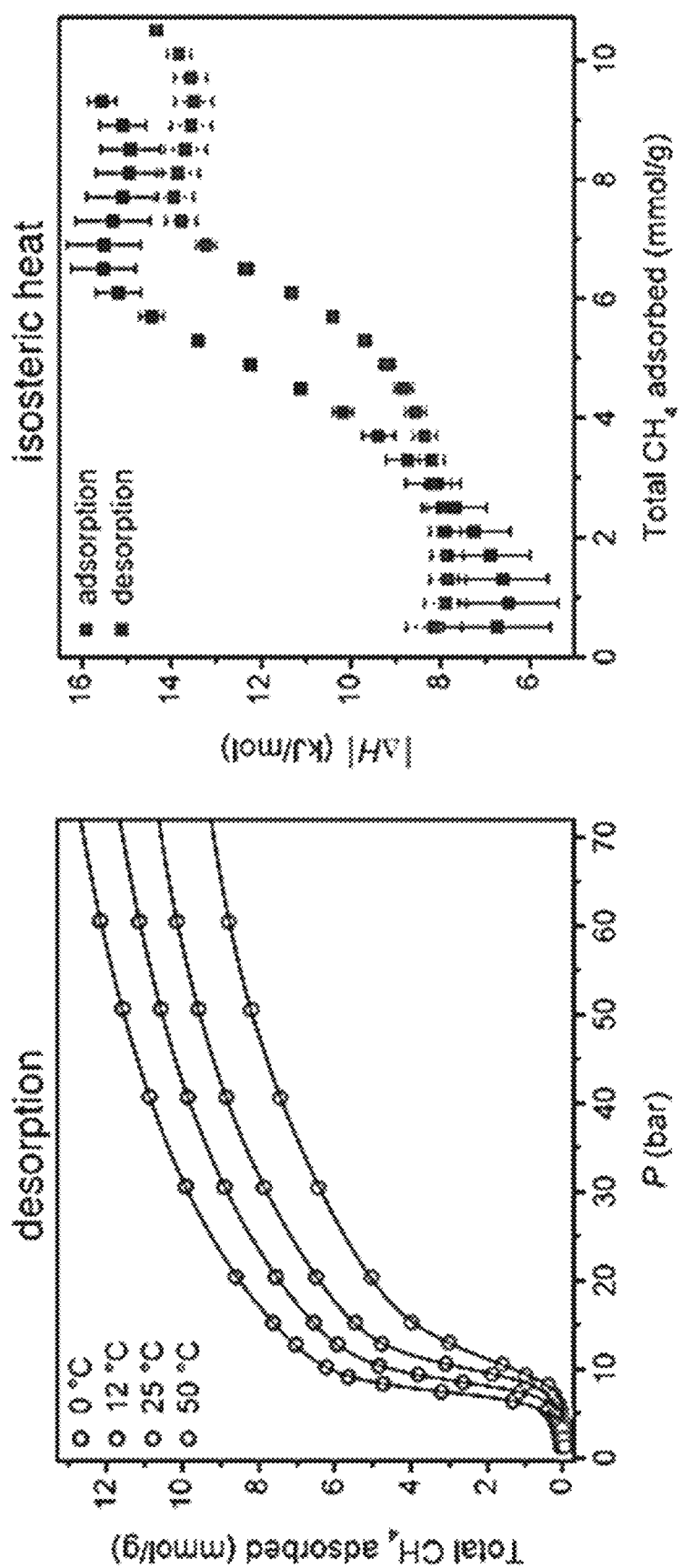
FIG. 9 presents: left, total $CH_4$ desorption isotherms for Co(bdp) at 0, 12, 25, and 50° C. The black lines correspond to mathematical fits to the isotherm data using offset Langmuir-Freundlich equations. Right, isosteric heat of $CH_4$ adsorption for Co(bdp) as a function of the total amount of $CH_4$ adsorbed during adsorption (green) and desorption (blue).
Figure 10:
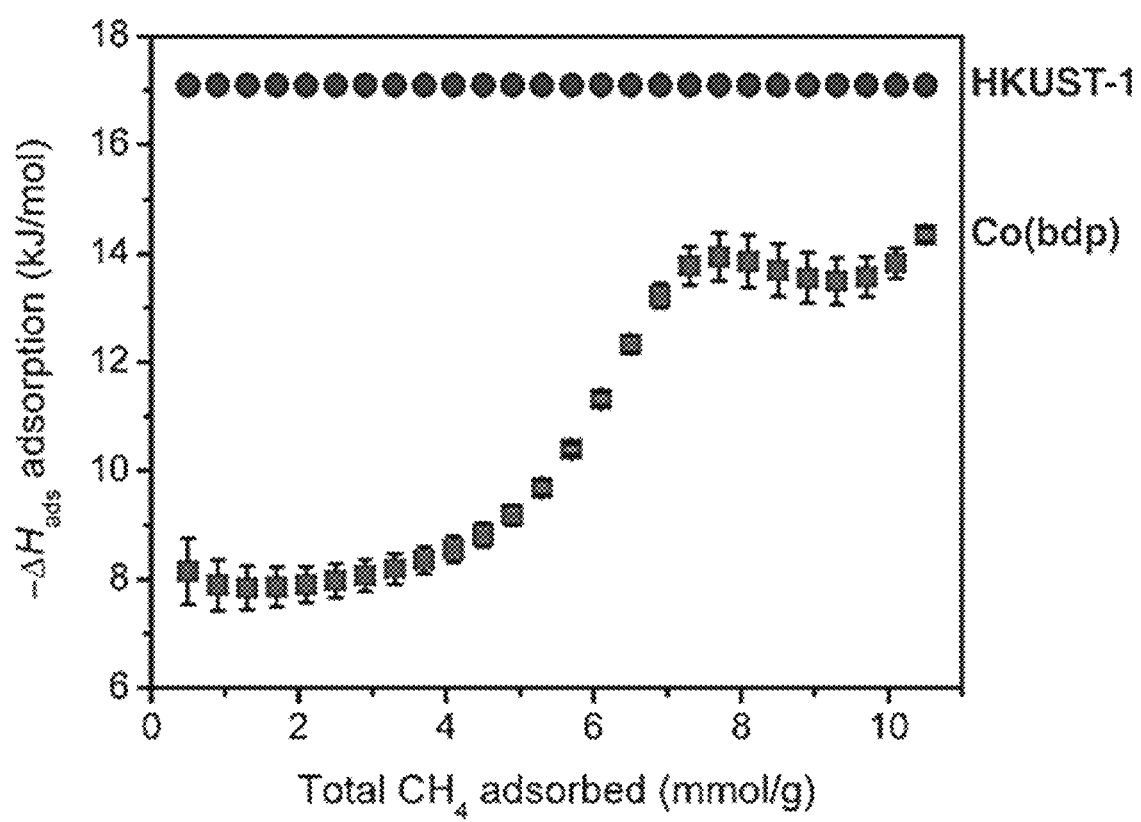
FIG. 10 presents the isosteric heats of adsorption for Co(bdp) and HKUST-1 as a function of the total amount of $CH_4$ adsorbed.

Significantly, the heat of adsorption for CH$_4$ at the steep region of the isotherm was only −7.9(3) kJ/mol, and the average heat of adsorption for 35 bar CH$_4$ adsorption was just −9.9(3) kJ/mol. This was nearly half of the −17 kJ/mol observed for CH$_4$ adsorption in HKUST-1, and was due to the endothermic pore opening process offsetting some of the heat released during adsorption. FIG. 9 shows that heat of desorption was similar to the heat of adsorption, with values below −8 kJ/mol at low CH$_4$ loadings. FIG. 10 shows a comparison of the isosteric heat of adsorption for CH$_4$ in Co(bdp) to that in HKUST-1 as a function of the total amount of CH$_4$ adsorbed.

Investigating the ANG Storage Potential of Co(Bdp).

Figure 22C:
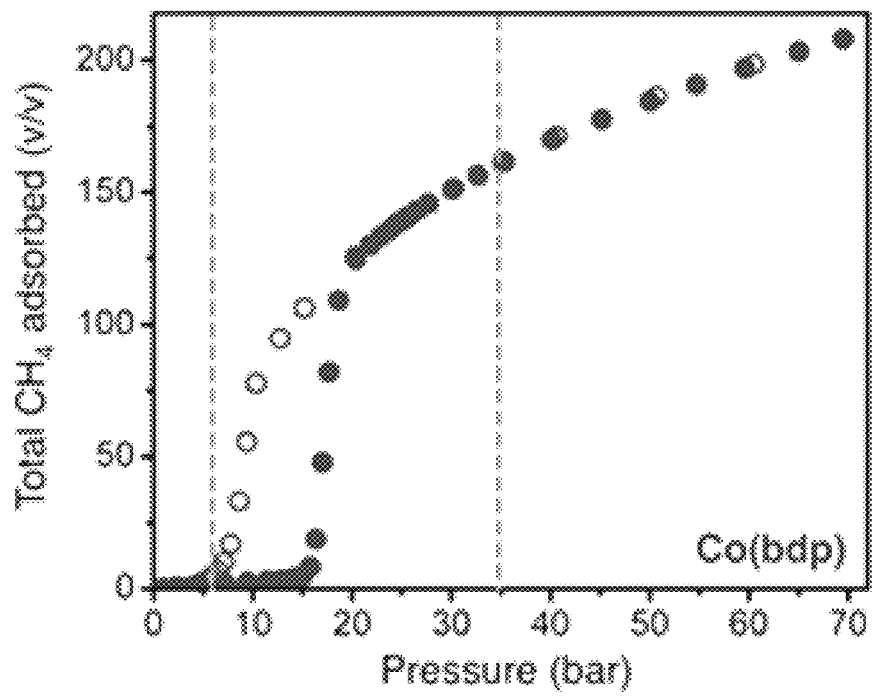

A high-pressure CH$_4$ adsorption isotherm was measured at 25° C. (see FIG. 22C). Significantly, there is minimal CH$_4$ uptake at low pressures and a sharp step in the adsorption isotherm at 16 bar. While there is hysteresis in the desorption isotherm, the hysteresis loop is closed by 7 bar, such that there is less than 0.2 mmol/g of CH$_4$ adsorbed at pressures below 5.8 bar. The step in the CH$_4$ isotherm is fully reproducible over at least 100 adsorption-desorption cycles (see FIG. 23) and can be attributed to a reversible structural phase transition between a collapsed, nonporous framework and an expanded, porous framework at transition pressures that are ideal for ANG storage.

Determining the Specific Structural Changes Responsible for the Stepped CH$_4$ Adsorption Isotherm of Co(Bdp).

Figure 24A:
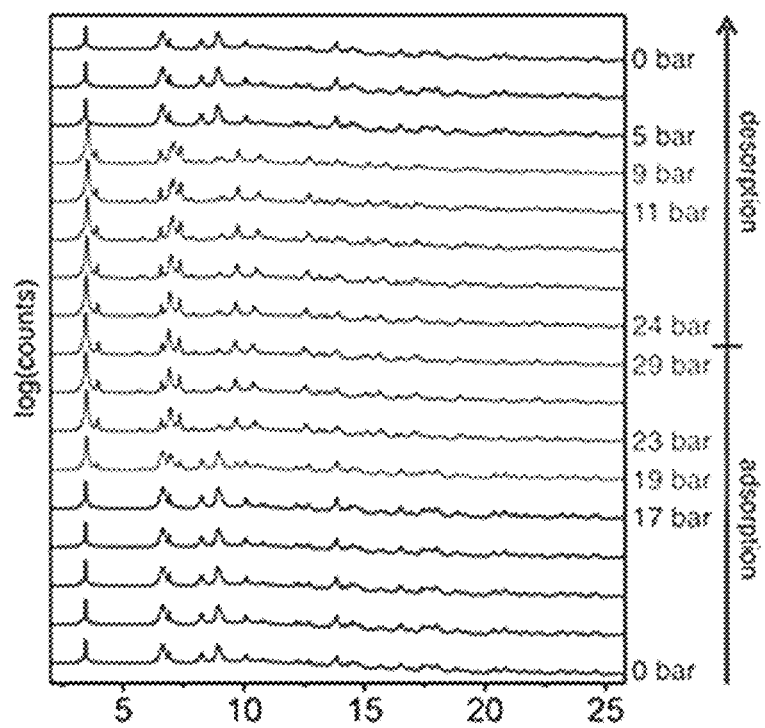
FIG. 24A-F presents X-ray powder diffraction patterns and solid-state structures. X-ray powder diffraction patterns are shown for Co(bdp) (A) and Fe(bdp) (B) at 25° C. and variable $CH_4$ pressures, with X-ray wavelengths of 0.75009 Å and 0.72768 Å, respectively. For Co(bdp), the blue and green patterns correspond to the collapsed and expanded phases, respectively. For Fe(bdp), the blue, red, and orange patterns correspond to the collapsed, 40-bar expanded, and 50-bar expanded phases, respectively. (C) The bridging ligand precursor $H_2$bdp is depicted along with (D) the crystal structures of the collapsed (0 bar) and $CH_4$ expanded (30 bar) phases of Co(bdp). (E) Each benzene ring in the collapsed phase of Co(bdp) has four edge-to-face interactions with neighboring benzene rings. (F) Crystal structure of the $CH_4$ expanded (40 bar) phase of Fe(bdp). Purple, orange, gray, blue, and white spheres represent Co, Fe, C, N, and H atoms, respectively; some H atoms are omitted for clarity.

In situ powder X-ray diffraction experiments were performed under various pressures of CH$_4$ at 25° C. Under vacuum, only one crystalline phase is observed in the diffraction pattern, consistent with the complete conversion of Co(bdp) to a collapsed phase upon desolvation. From 17 to 23 bar, there are substantial changes to both the positions and intensities of the diffraction peaks, as peaks corresponding to the collapsed phase decrease in intensity and peaks corresponding to a new expanded phase increase in intensity (see FIG. 24A). During desorption this expanded phase is fully converted back to the collapsed phase between 10 and 5 bar.

Figure 24B:
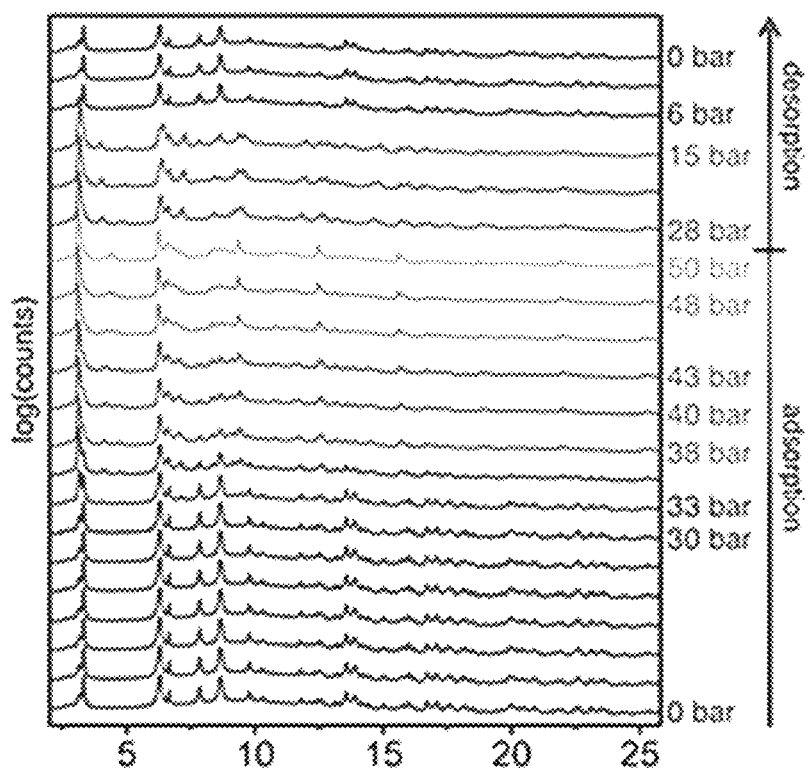
Figure 24C:
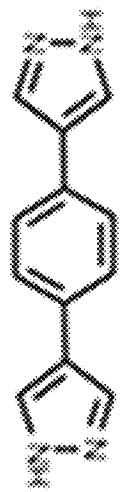
Figure 24D:
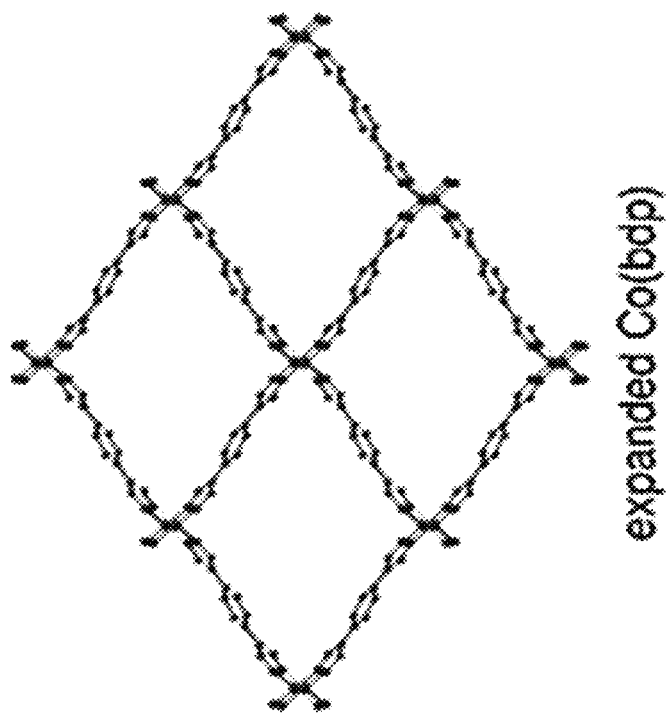
Figure 24D:
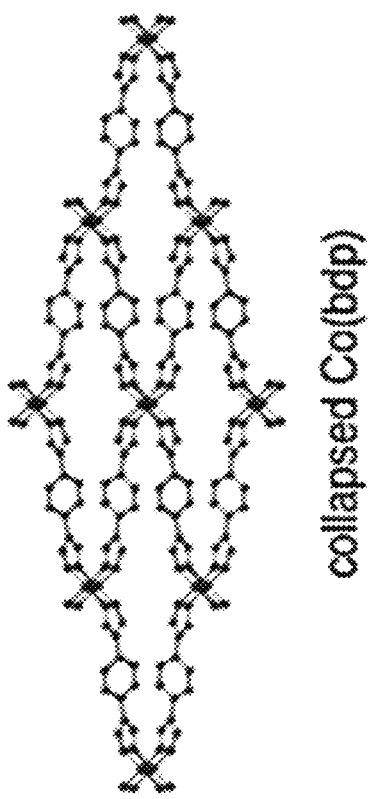
Figure 25A:
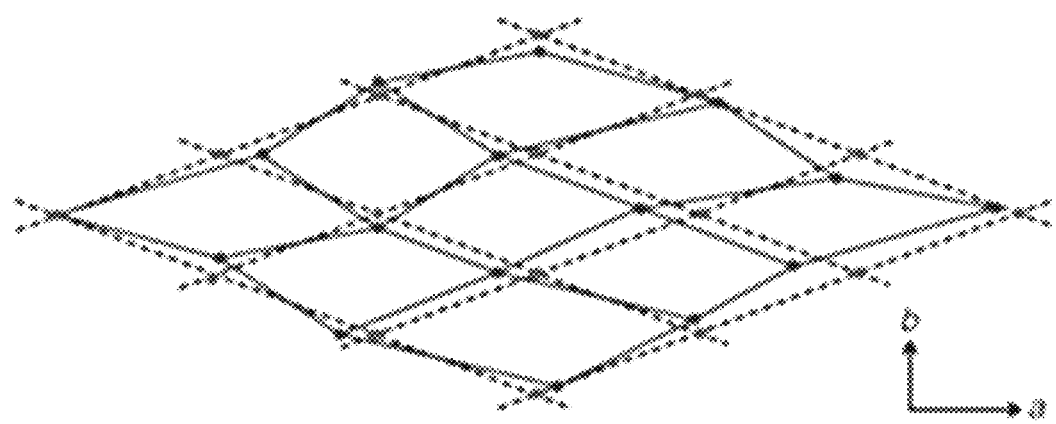
FIG. 25A-B provides a paracrystalline model. (A), An illustration of the paracrystalline distortion in the crystallographic ab plane of the collapsed phases of Co(bdp) and Fe(bdp) that leads to complex Bragg peak broadening. Black dashed lines represent the periodic crystal lattice, while the blue lines represent the paracrystal. Red circles represent the positions of metal-pyrazolate chains in the periodic lattice, while blue circles represent their positions in a paracrystal. Note that the magnitude of the paracrystalline distortion has been exaggerated for clarity. (B) Simulated diffraction patterns are shown for a periodic collapsed Co(bdp) nanocrystal (75 nm×60 nm×43 nm; red trace) and for a paracrystal of equivalent size (blue trace). The upper trace (black) corresponds to the background-subtracted experimental diffraction pattern of the collapsed phase of Co(bdp) at 25° C. For clarity, the three patterns have been given an arbitrary y offset. Very similar anisotropic peak broadening, which inflates hk0 peaks (but not h00 nor 0k0 ones), is clearly visible in the experimental diffraction pattern and the paracrystalline simulation. The exact full widths at half maximum for the experimental and simulated Bragg peaks are given in Table 6.
Figure 25B:
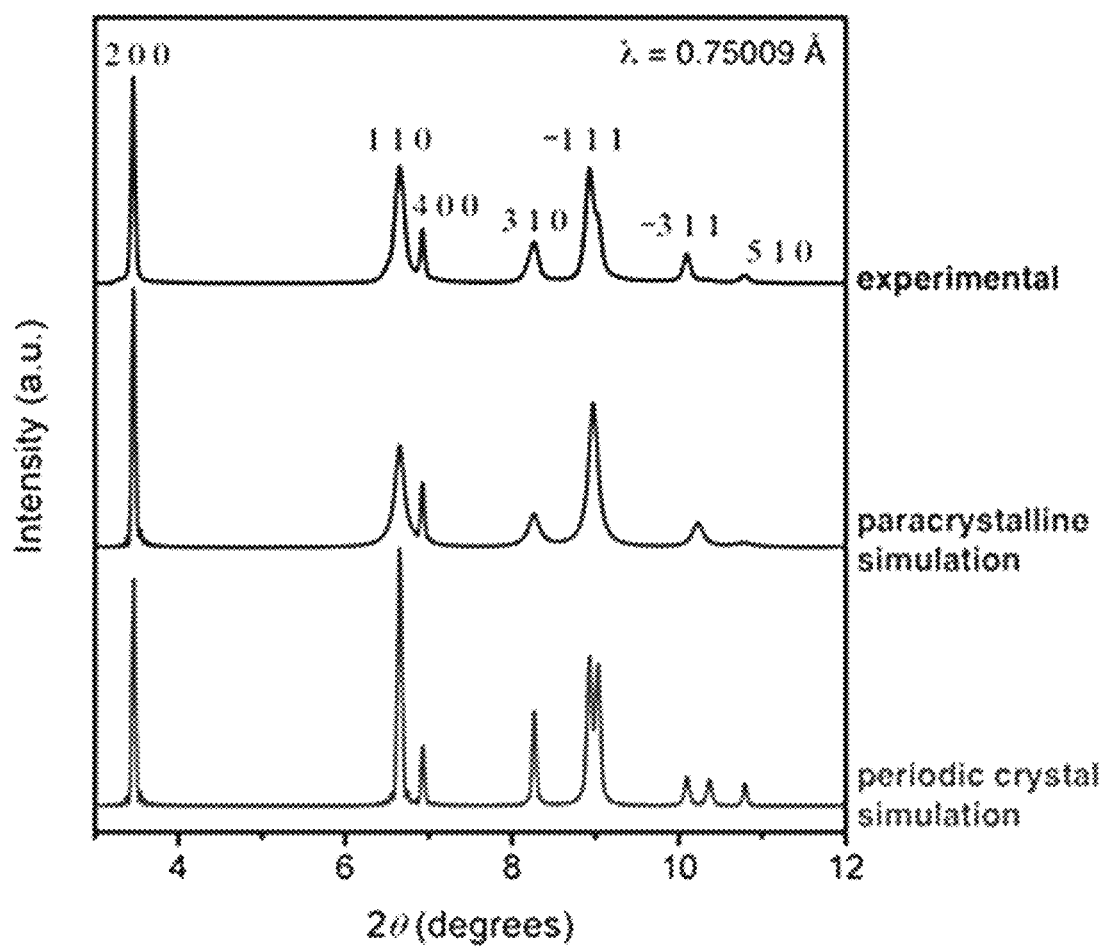
Figures 26A, 26B:
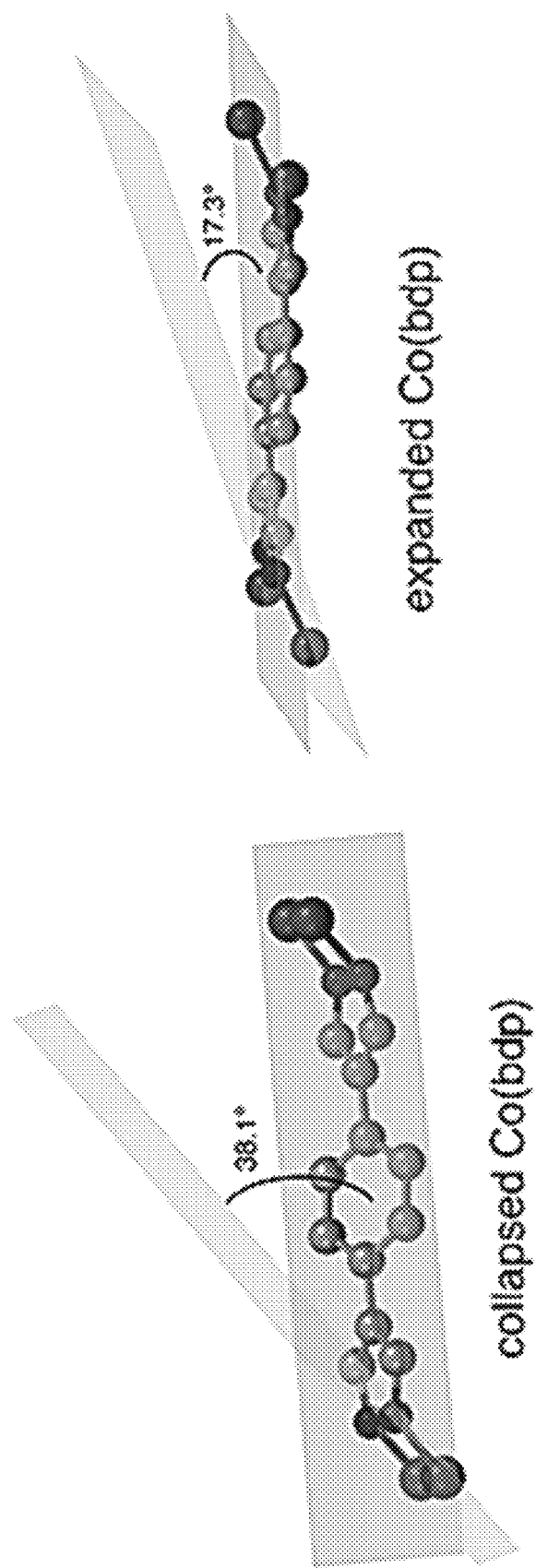
FIG. 26A-F presents solid-state structures. (A) The angle between the plane of the pyrazolate (light orange) and the Co—N—N—Co plane (light blue) is 38.1° in the collapsed phase of Co(bdp). (B) The angle between the plane of the pyrazolate (light orange) and the Co—N—N—Co plane (light blue) is 17.3° in the $CH_4$ expanded phase of Co(bdp). (C) The angle between the plane of the pyrazolate (light orange) and the Fe—N—N—Fe plane (light blue) is 40.1° in the collapsed phase of Fe(bdp). (D) Structure of the collapsed phase of Fe(bdp) under vacuum at 25° C. (E) Structure of the DMF-solvated phase of Fe(bdp) at 100 K. f, Idealized average structure of the 50 bar of $CH_4$ expanded phase of Fe(bdp) at 25° C. Gray, blue, red, purple, and orange spheres represent C, N, O, Co, and Fe atoms, respectively; H atoms are omitted for clarity.
Figure 26D:
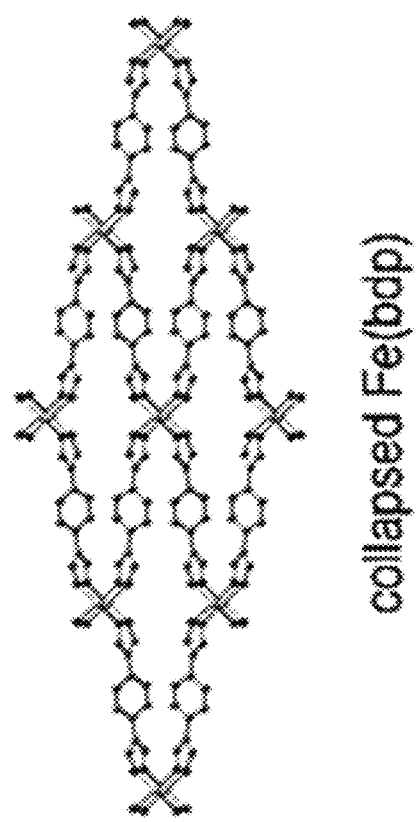
Figure 26C:
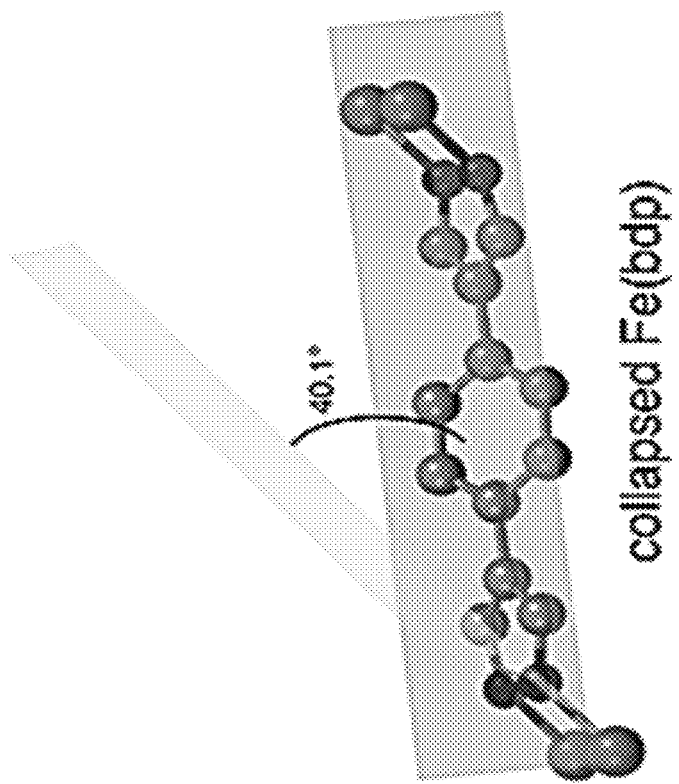
Figure 26F:
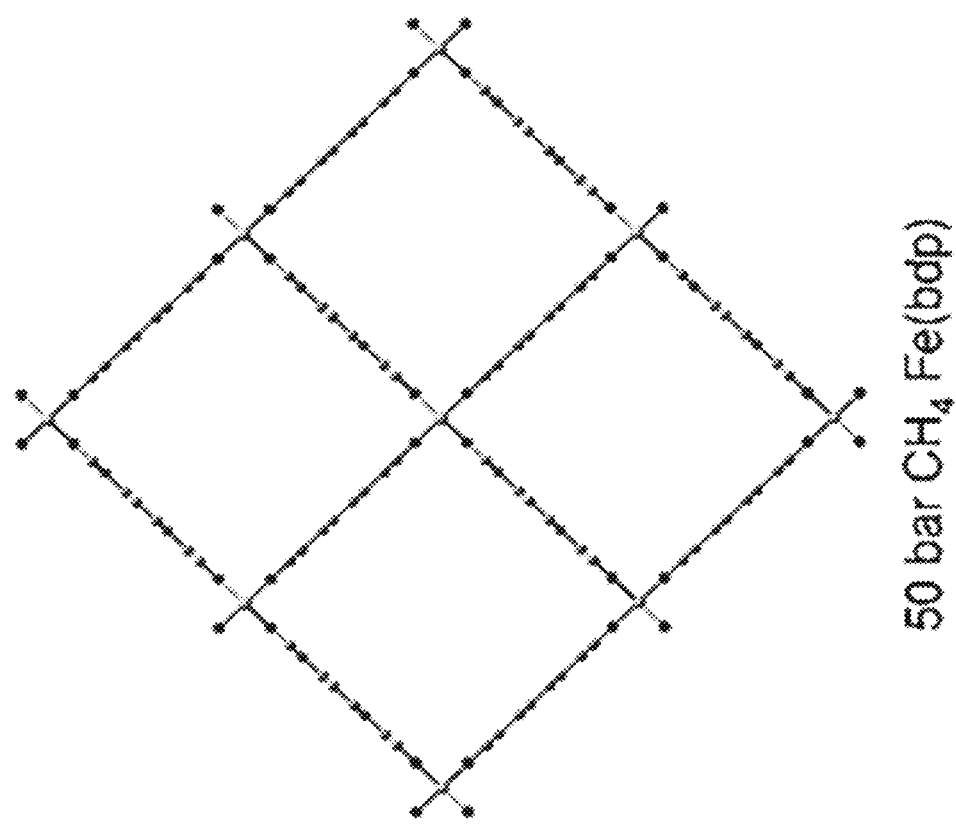
Figure 26E:
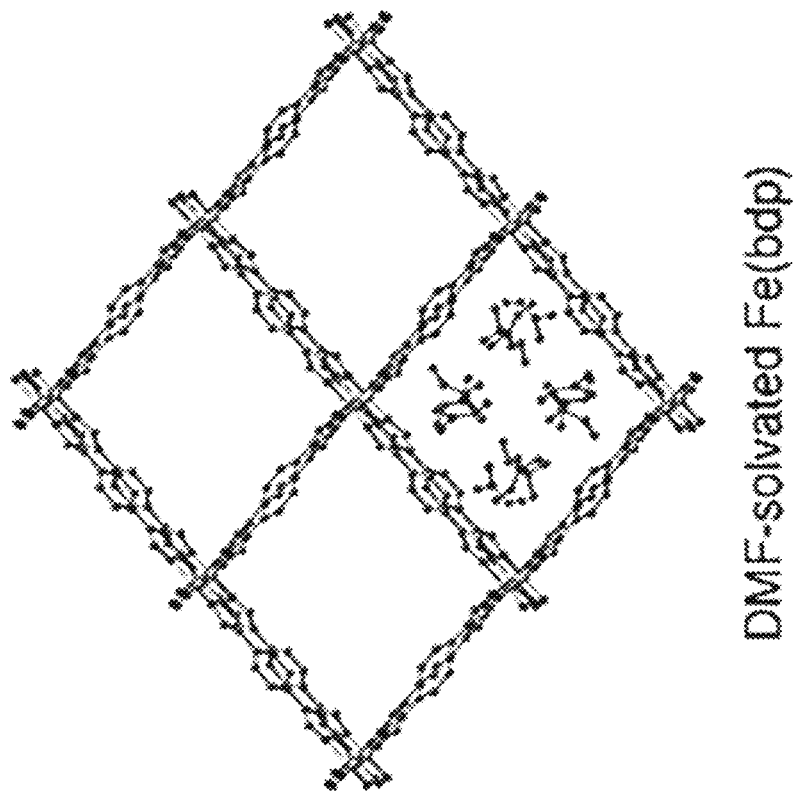

Owing to the anisotropic peak widths and complex peak shapes that result from paracrystallinity effects, analysis of the powder diffraction data is not trivial, but ab initio structure solutions followed by Rietveld refinements (see FIG. 20) were successfully performed against the diffraction data at 0 and 30 bar to provide crystal structures of the collapsed and expanded phases of Co(bdp) (see FIG. 24D). As shown in FIG. 25, paracrystallinity, which is particularly prominent in the collapsed phase, arises from highly correlated shifts to the positions of Co-pyrazolate chains in the crystallographic ab plane, whereby neighboring chains exhibit average displacements of approximately 0.5 Å from their average periodic positions. Importantly, this minor systematic disordering has no effect on the accuracy of the equilibrium crystal structures or the calculated crystallographic densities of each phase. Additionally, a substantial diffuse scattering component is present in the experimental powder diffraction patterns, particularly at high CH$_4$ loadings. While most of the diffuse scattering can be attributed to the thick-walled quartz glass capillaries used as sample holders in the diffraction experiments at high CH$_4$ pressures, there may also be some diffuse scattering that is intrinsic to Co(bdp). This could arise from minor local disorder or from scattering by adsorbed CH$_4$ molecules, which would be expected to appear as a broad, weak hump centered near 10° 2Ø based on extrapolating from the scattering of liquid CH$_4$. Regardless, any local structural disorder in the crystal structures would not impact the CH$_4$ storage properties of the bulk material.

Figure 24E:
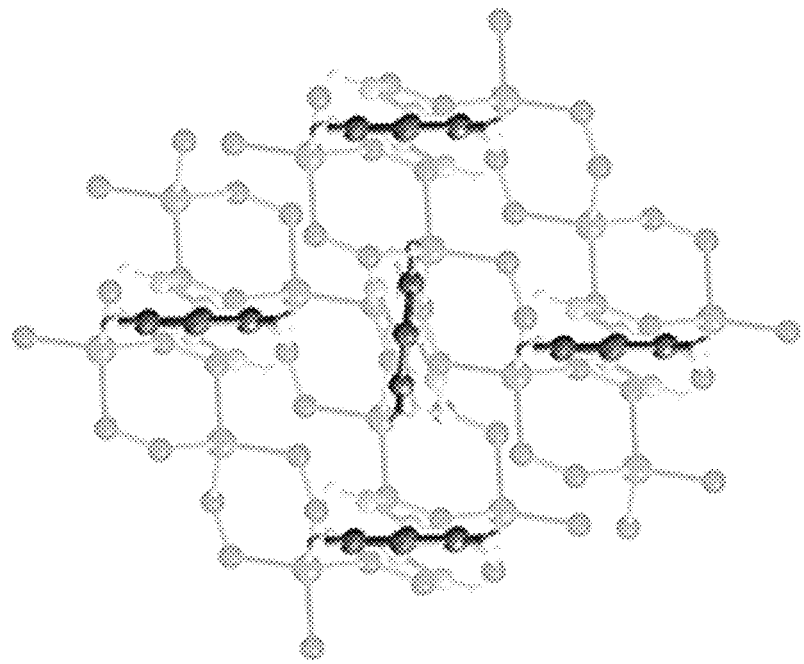

Even though the density of the collapsed phase (1.50 g/cm$^3$) is nearly double that of the expanded phase (0.77 g/cm$^3$), the Co$^{2+}$ ions adopt a similar pseudotetrahedral geometry in both structures. During the phase transition, the angles between the planes of the pyrazolate rings and the Co—N bonds decrease as the framework expands (see FIG. 26). In addition, the central benzene ring of the bdp$^{2-}$ ligand twists out of the plane of the two pyrazolates by 25° in the collapsed structure of Co(bdp), resulting in edge-to-face Π-Π interactions with four neighboring benzene rings that likely provide most of the thermodynamic driving force for the collapse of Co(bdp) at low gas pressures (see FIG. 24E). Additionally, the close contacts between neighboring bdp$^{2-}$ ligands due to Π-Π stacking leads to no accessible porosity, and thus no CH$_4$ adsorption, in the collapsed phase.

Significantly, the usable CH$_4$ capacity of Co(bdp) at 25° C. is 155 v/v for adsorption at 35 bar and 197 v/v for adsorption at 65 bar, which are the highest values ever reported under these conditions (see Table 16).

TABLE 16

Summary of the total volumetric usable CH$_4$ capacity (cm$^3_{STP}$/cm$^3$) calculations at 25° C. for Co(bdp), Fe(bdp), and a selection of the best previously reported metal-organic frameworks. The minimum desorption pressure is 5.8 bar.

| | 5.8 bar total (v/v) | 35 bar total (v/v) | 65 bar total (v/v) | 35 bar usable (v/v) | 65 bar usable (v/v) |
|---|---|---|---|---|---|
| Co(bdp) | 6 | 161 | 203 | 155 | 197 |
| Co(bdp) | 6 | 161 | 203 | 155 | 197 |
| Fe(bdp) | 6 | 156 | 196 | 150 | 190 |
| HKUST-1 | 81 | 224 | 262 | 143 | 181 |
| UTSA-76a | 68 | 211 | 257 | 143 | 189 |
| MOF-5 | 30 | 149 | 215 | 119 | 185 |
| MOF-519 | 55* | 200* | 260* | 145* | 205* |

*The volumetric capacities reported for MOF-519 are expected to be artificially inflated by a significant amount because the crystallographic density used for the framework was likely far too high. The true usable capacities for MOF-519 are thus expected to be much lower than originally reported.

In fact, a recent computational analysis of a database containing over 650,000 classical adsorbents predicted a theoretical maximum 65-bar usable capacity of 196 v/v. It is worth mentioning that all adsorbents in this large-scale computational screening were rigid, and the potential utility of flexible adsorbents for CH$_4$ storage was not considered. The record Co(bdp) usable capacities, which reach this predicted upper bound, are a direct result of the transition from the expanded to collapsed phase leading to near complete CH$_4$ desorption by 5.8 bar. For comparison, the highest previously reported 35- and 65-bar experimental usable capacities for any adsorbent are 143 v/v and 189 v/v, which were obtained for the metal-organic frameworks HKUST-1 and UTSA-76a, respectively. Both of these Cu$_2$ paddlewheel-based frameworks have high densities of CH$_4$ adsorption sites, with a near optimal binding enthalpy of −15 to −17 kJ/mol, but classical Langmuir-type adsorption isotherms that leave a substantial amount of unusable CH$_4$ adsorbed at 5.8 bar. Total volumetric usable CH4 capacity for Co(bdp) and Fe(bdp) versus other adsorbents are presented in Tables 17 and 18.

TABLE 17

Summary of the total volumetric usable $CH_4$ capacity ($cm^3_{STP}/cm^3$) calculations for adsorption at 25° C. and desorption at 0 °C. for Co(bdp), Fe(bdp), HKUST-1, and MOF-5. The minimum desorption pressure is 5.8 bar.

|  | 5.8 bar total (v/v) | 35 bar total (v/v) | 65 bar total (v/v) | 35 bar usable (v/v) | 65 bar usable (v/v) |
|---|---|---|---|---|---|
| Fe(bdp) | 9 | 156 | 196 | 147 | 187 |
| Co(bdp) | 32 | 161 | 203 | 129 | 171 |
| HKUST-1 | 125 | 224 | 262 | 99 | 137 |
| MOF-5 | 52 | 149 | 215 | 97 | 163 |

TABLE 18

Summary of the total volumetric usable $CH_4$ capacity ($cm^3_{STP}/cm^3$) calculations for adsorption at 25° C. and desorption at −25° C. for Co(bdp), Fe(bdp), HKUST-1, and MOF-5. The minimum desorption pressure is 5.8 bar.

|  | 5.8 bar total (v/v) | 35 bar total (v/v) | 65 bar total (v/v) | 35 bar usable (v/v) | 65 bar usable (v/v) |
|---|---|---|---|---|---|
| Fe(bdp) | 23 | 156 | 196 | 133 | 173 |
| Co(bdp) | 113 | 161 | 203 | 48 | 90 |
| HKUST-1 | 189 | 224 | 262 | 35 | 73 |
| MOF-5 | 69 | 149 | 215 | 80 | 146 |

Examining the Exothermic Heat of Adsorption and Endothermic Heat of Desorption of Co(Bdp).

One major, and often overlooked, challenge in developing adsorbents for natural gas storage, or indeed for any gas storage application, involves managing the exothermic heat of adsorption and endothermic heat of desorption, both of which always reduce the usable capacity of an adsorbent. These heat effects can be substantial, with temperature changes of as much as 80° C. observed during testing of prototype activated carbon-based ANG systems, and result in large reductions in the usable $CH_4$ capacity. On-board thermal management systems are essential to minimizing the negative impacts of the heats of sorption, but these engineering controls take up already limited space on a vehicle and add significant cost and complexity.

Responsive adsorbents, such as Co(bdp), offer the intriguing possibility of managing heat intrinsically within a material, rather than through an external system, by using the enthalpy change of a phase transition to partially, or perhaps even fully, offset the heats of sorption. For Co(bdp), the expansion of the framework during adsorption is endothermic, since energy is needed to overcome the greater thermodynamic stability of the collapsed phase. As a result, some of the enthalpy of $CH_4$ adsorption should go toward providing the heat needed for the transition to the expanded phase, lowering the overall amount of heat released compared to adsorption in the absence of a phase transition. Similarly, the transition to the collapsed phase is exothermic, and some of the heat released by the framework as it collapses should offset the endothermic desorption of $CH_4$. A summary of thermodynamic parameters for the phase transition in Co(bdp) and Fe(bdp) are presented in Tables 19 and 20.

TABLE 19

Summary of thermodynamic parameters for the phase transition in Co(bdp).

| T | 25° C. |
|---|---|
| $n_{tot}$ | 1.9 mol $CH_4$ per mol MOF |
| $\Delta H_{tot}$ | −18.2 kJ/mol MOF |
| $h_{trans}$ | −8.4 kJ/mol $CH_4$ |
| $n_{trans}$ | 1.37 mol $CH_4$ per mol MOF |
| $P_{trans}$ | 14.0 bar |
| $\Omega(P_{trans})$ | −4.1 kJ/mol MOF |
| $\Delta H_{MOF}$ | 7.0 kJ/mol MOF |
| $\Delta S_{MOF}$ | 9.5 J/mol · K |
| $\Delta G_{MOF}$ | 4.1 kJ/mol MOF |
| $T\Delta S_{MOF}$ | 2.8 kJ/mol MOF |

TABLE 20

Summary of thermodynamic parameters for the phase transition in Fe(bdp).

| T | 25° C. |
|---|---|
| $n_{tot}$ | 2.5 mol $CH_4$ per mol MOF |
| $\Delta H_{tot}$ | −23.3 kJ/mol MOF |
| $h_{trans}$ | −8.5 kJ/mol $CH_4$ |
| $n_{trans}$ | 1.92 mol $CH_4$ per mol MOF |
| $P_{trans}$ | 20.2 bar |
| $\Omega(P_{trans})$ | −6.0 kJ/mol MOF |
| $\Delta H_{MOF}$ | 8.1 kJ/mol MOF |
| $\Delta S_{MOF}$ | 6.9 J/mol · K |
| $\Delta G_{MOF}$ | 6.0 kJ/mol MOF |
| $T\Delta S_{MOF}$ | 2.0 kJ/mol MOF |

Figure 27B:
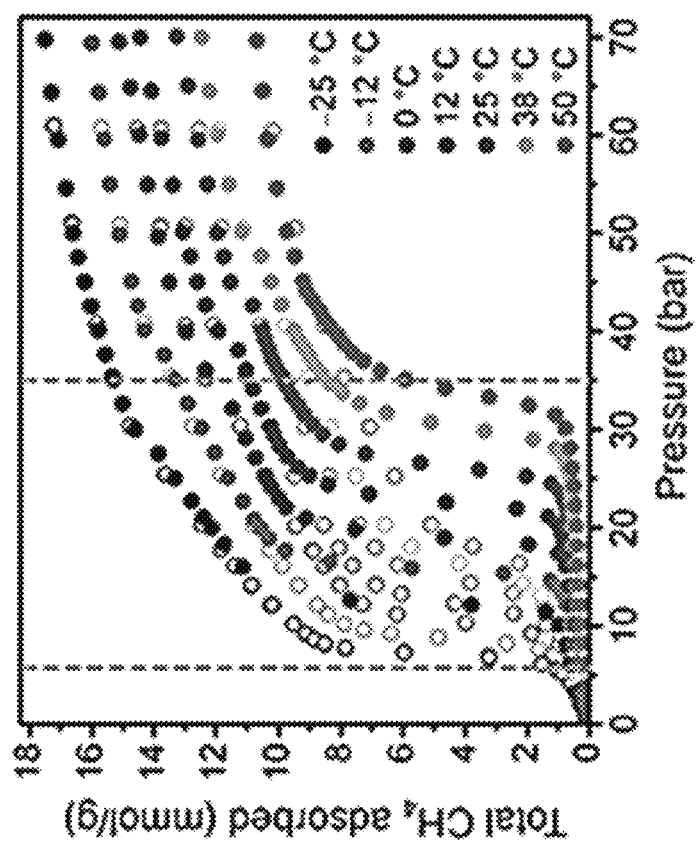
FIG. 27A-D presents variable temperature equilibrium isotherms and differential enthalpies. Total $CH_4$ adsorption isotherms at variable temperatures for Co(bdp) (A) and Fe(bdp) (B), where a minimum desorption pressure of 5.8 bar and a maximum adsorption pressure of 35 bar are indicated by dashed gray lines. Filled circles represent adsorption, while empty circles represent desorption. (C) Differential enthalpies of $CH_4$ adsorption for Co(bdp) as determined from variable temperature adsorption isotherms (purple line) and three separate microcalorimetry experiments (empty symbols). (D) Differential enthalpies of $CH_4$ adsorption for Fe(bdp) as determined from variable temperature adsorption isotherms. Dashed gray lines indicate the amount of $CH_4$ adsorbed at 5.8 and 35 bar.
Figure 27A:
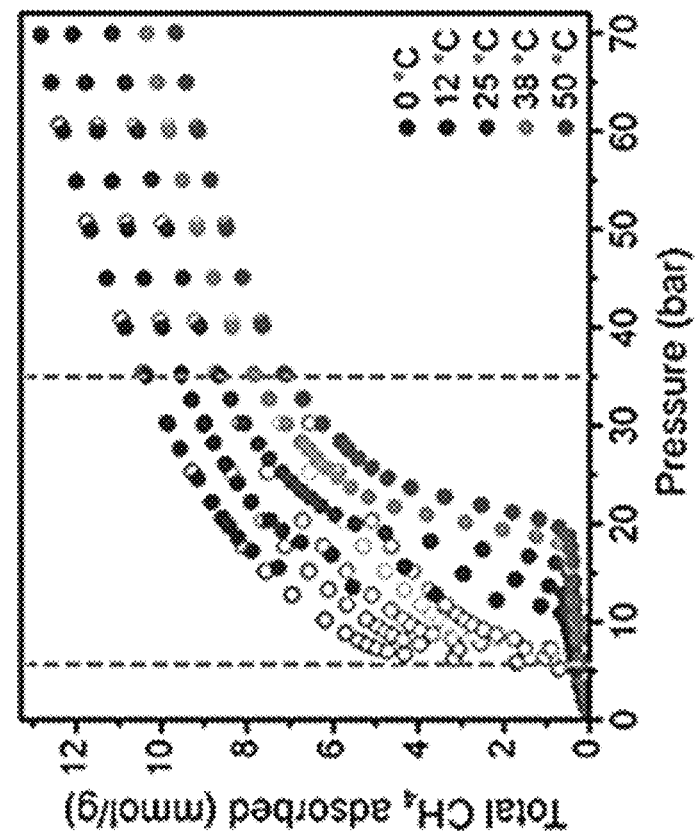
Figure 27D:
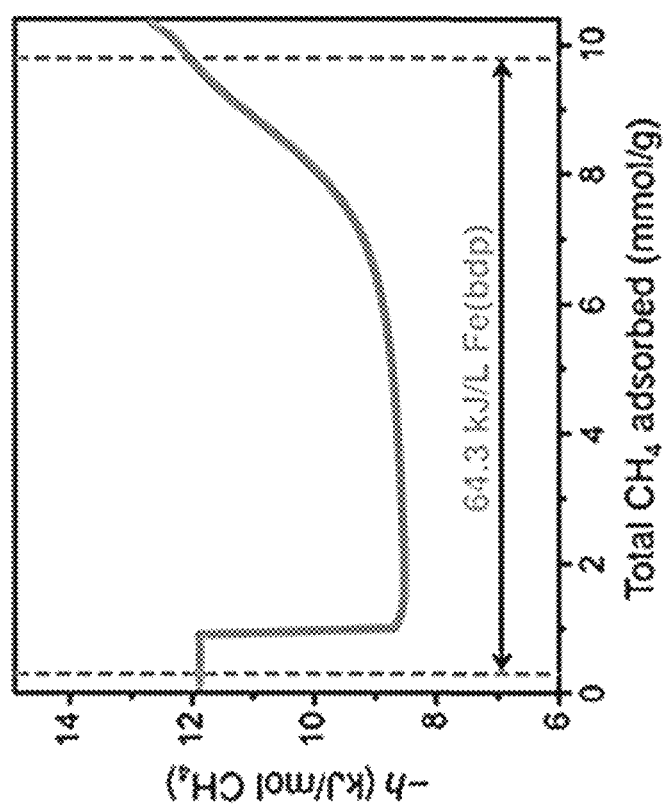
Figure 27C:
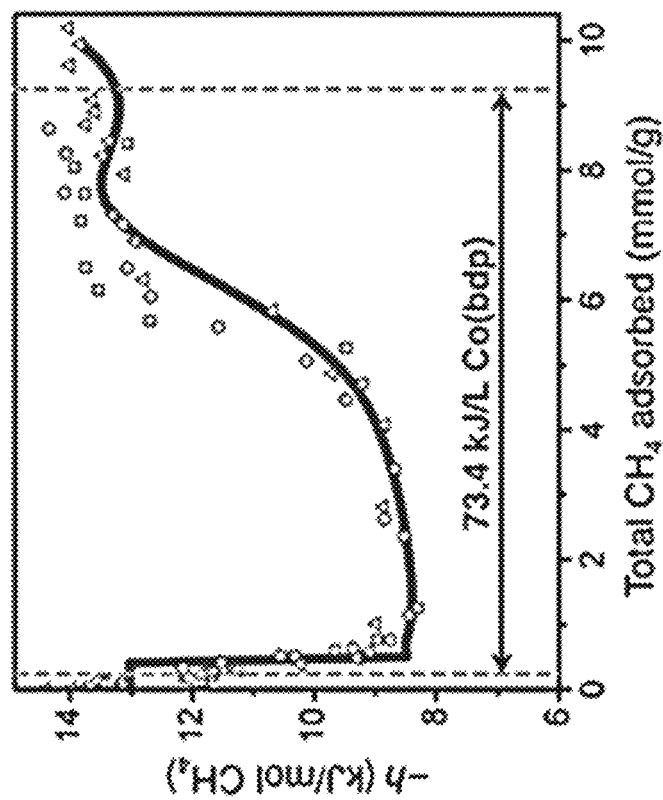
Figure 28A:
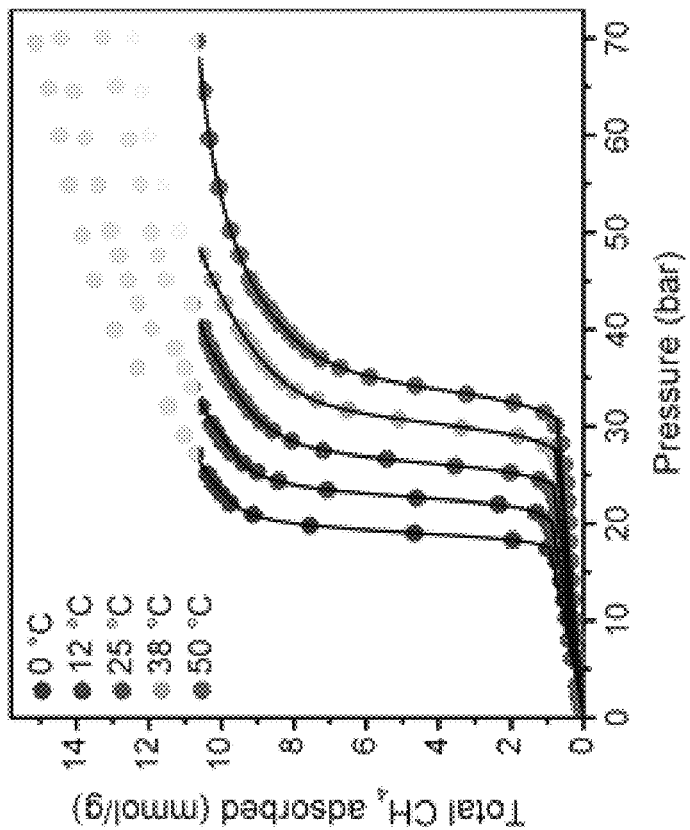
FIG. 28A-D presents adsorption isotherm fitting. (A) Total $CH_4$ adsorption isotherms at 0, 12, 25, 38, and 50° C. for Co(bdp) with adsorption after the step fit independently at each temperature with an offset dual-site Langmuir-Freundlich equation. The small pre-step adsorption was fit with a single-site Langmuir model. (B), Total $CH_4$ adsorption isotherms at 0, 12, 25, 38, and 50° C. for Fe(bdp) with adsorption after the phase transition fit independently at each temperature with an offset dual-site Langmuir-Freundlich equation. The pre-step adsorption was fit with a single-site Langmuir model. Additionally, the isotherms were only fit to a maximum loading of 10.6 mmol/g, as indicated by the shading, to avoid complications from the $2^{nd}$ transition at higher $CH_4$ loadings. As such, differential enthalpies are only calculated up to a maximum loading of 10.6 mmol/g. (C), Total $CH_4$ adsorption isotherms at 0, 12, 25, 38, and 50° C. for Co(bdp) with the corresponding single-site Langmuir fit for $CH_4$ adsorption in the expanded phase. (D), Total $CH_4$ adsorption isotherms at 0, 12, 25, 38, and 50° C. for Fe(bdp) with the corresponding single-site Langmuir fit for $CH_4$ adsorption in the 40 bar expanded phase. Note that the data were only fit for the region of the isotherms that falls after the initial hysteresis loop closes and before the $2^{nd}$ isotherm step. All single- and dual-site Langmuir-Freundlich fits are shown as black lines.
Figure 28B:
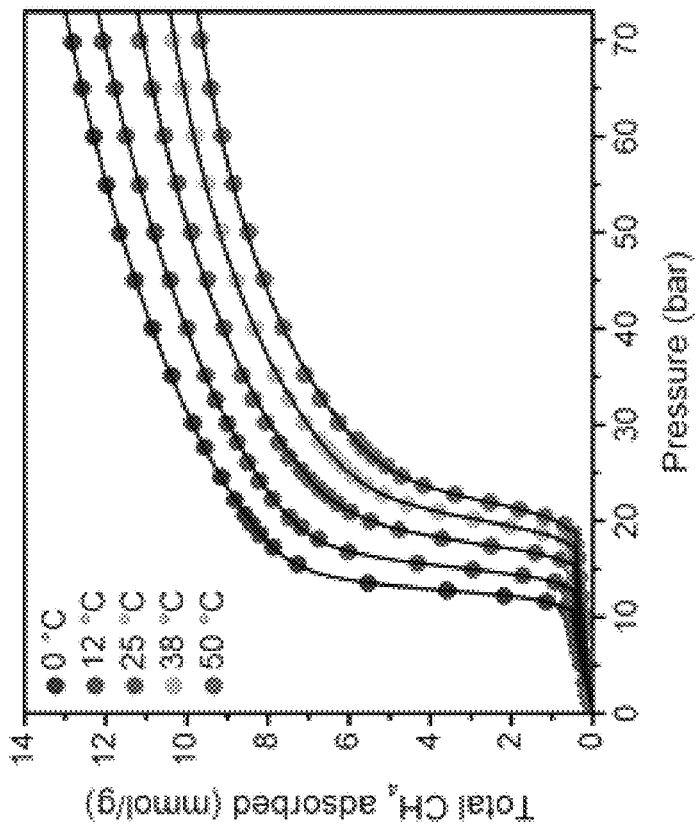
Figure 28D:
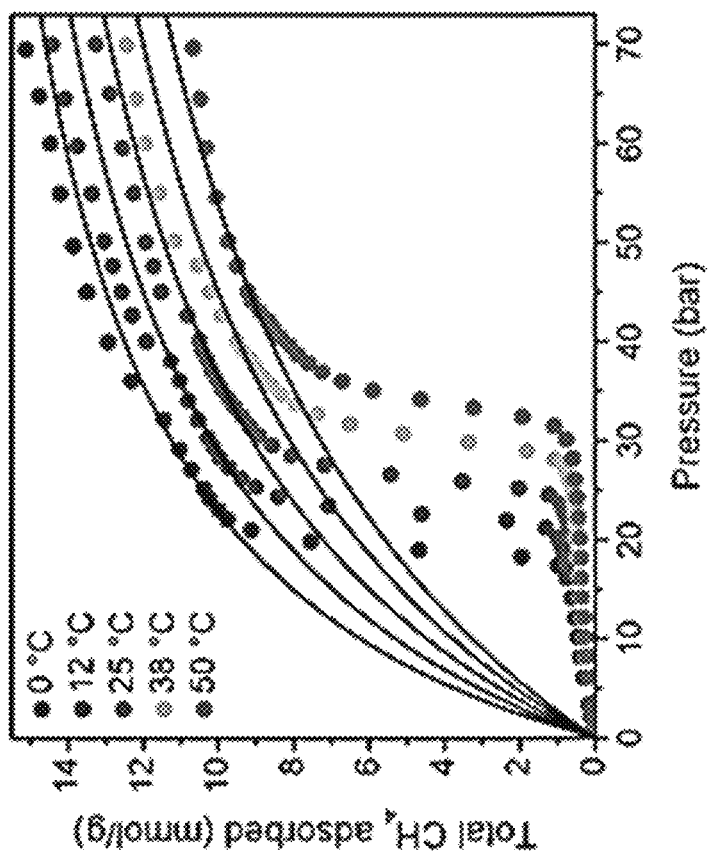
Figure 28C:
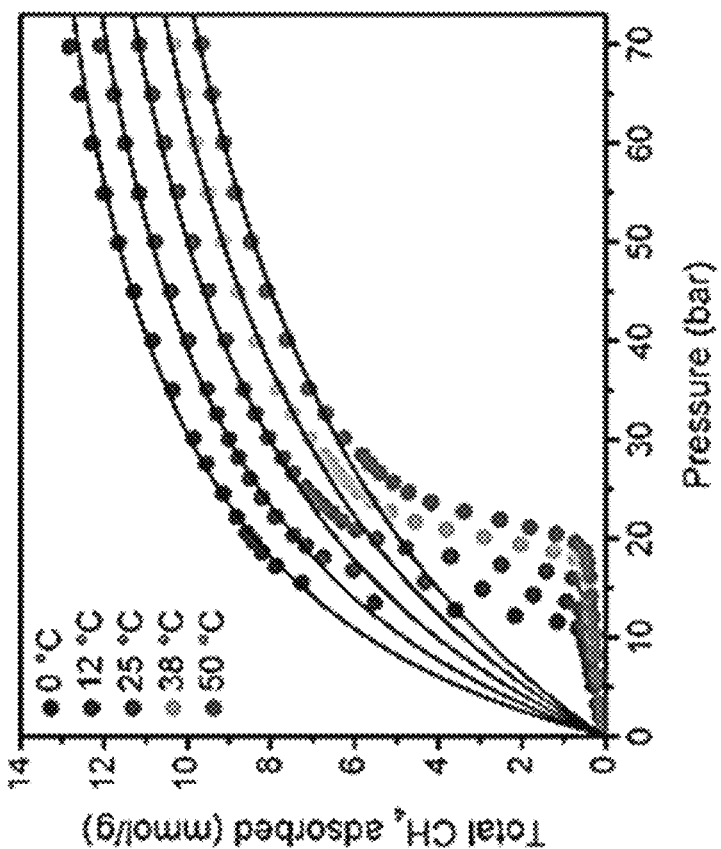

In classical porous materials, low-coverage differential $CH_4$ adsorption enthalpies are generally −12 to −15 kJ/mol $CH_4$ for adsorbents that do not have any strong $CH_4$ binding sites and are closer to −15 to −25 kJ/mol for adsorbents with the highest volumetric $CH_4$ capacities. For the steepest region of the $CH_4$ adsorption isotherm of Co(bdp), the differential enthalpy is considerably lower, at just −8.4(3) kJ/mol, since the endothermic framework expansion partially offsets the exothermic heat of adsorption (see FIG. 27C). After the transition to the expanded Co(bdp) phase is complete, the differential enthalpy approaches −13 kJ/mol, which is consistent with weak $CH_4$ physisorption in the absence of a phase transition to mitigate heat. To confirm the accuracy of the calculated differential enthalpies, the heat released during $CH_4$ adsorption was directly measured by performing variable-pressure microcalorimetry experiments. As shown in FIG. 27C, the differential enthalpies obtained from calorimetry are in excellent agreement with those calculated from the variable-temperature adsorption isotherms (see also Table 21).

TABLE 21

Summary of the amount of heat released in kJ per L MOF during $CH_4$ adsorption from 5.8 to 35 or 65 bar in Co(bdp), Fe(bdp), and HKUST-1. The values in parentheses are the average differential enthalpy of $CH_4$ adsorption in kJ per mol $CH_4$.

|  | 35 bar adsorption | 65 bar adsorption |
|---|---|---|
| Co(bdp) | 73.4 (10.5) | 90.4 (11.0) |
| Fe(bdp) | 64.3 (9.5) | 87.1 (10.2) |
| HKUST-1 | 109 (17.1) | 138 (17.1) |

The total amount of heat released when increasing the pressure of $CH_4$ adsorbed in Co(bdp) from 5.8 to 35 bar, as would occur during refueling of an ANG vehicle, can be calculated by integrating the differential enthalpy curve.

Significantly, the 73.4 kJ of heat released per L of Co(bdp) represents a 33% reduction relative to the 109 kJ/L of heat released by HKUST-1 under the same conditions, even though the amount of $CH_4$ adsorbed in Co(bdp) is 8% greater. 93.9 kJ/L of heat was further calculated to be released for hypothetical $CH_4$ adsorption in a rigid Co(bdp) framework-28% higher than when adsorption occurs with a phase transition to provide heat mitigation.

Developing New Flexible MOFs that have Greater Intrinsic Heat Management than Co(Bdp).

Figure 22D:
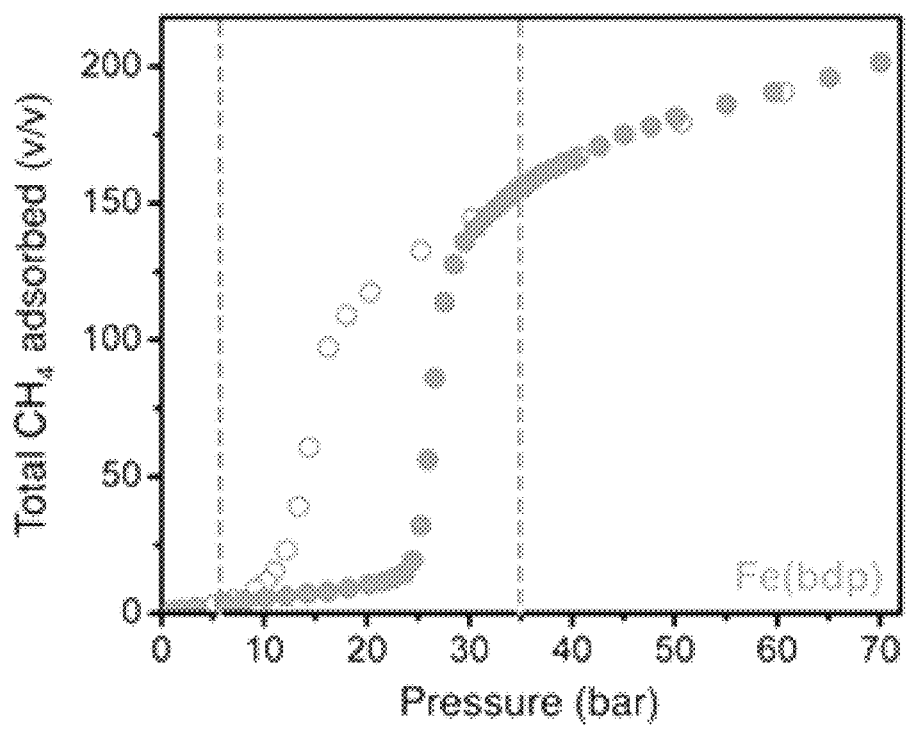
Figure 23A:
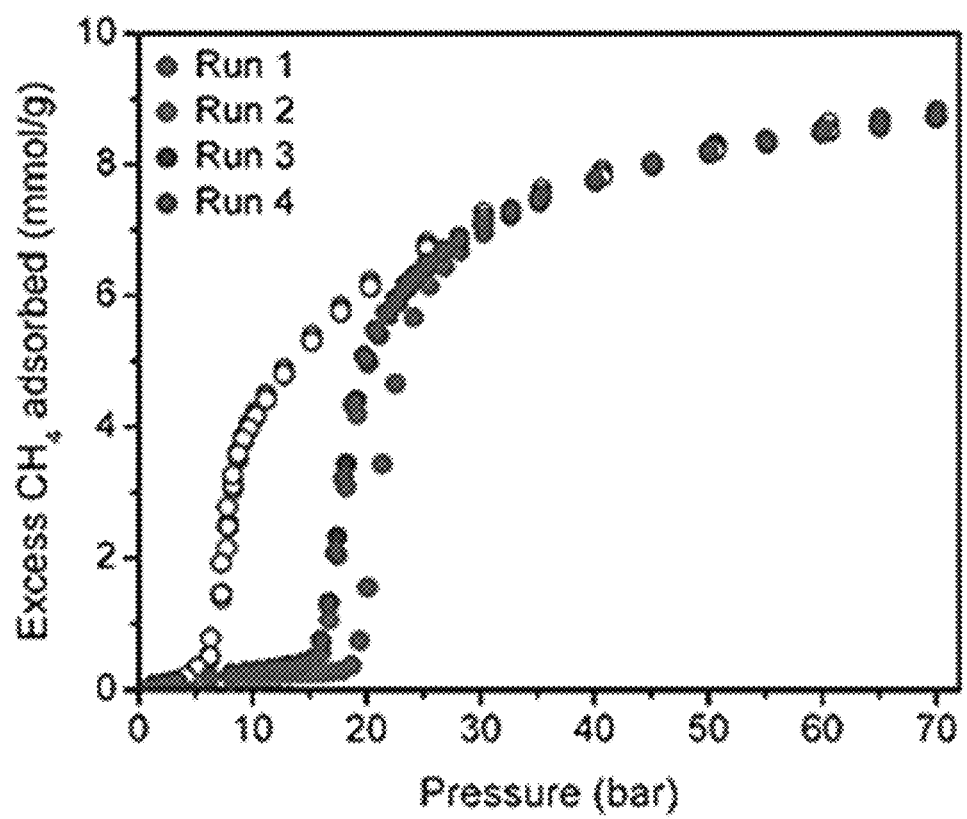
FIG. 23A-D presents high-pressure $CH_4$ cycling data. (A), Excess $CH_4$ isotherms at 25° C. for Co(bdp) repeated 4 times on the same sample, which was regenerated under vacuum at 25° C. for 2 h between measurements. Note that the adsorption step is at a slightly higher pressure during the first run because there is likely a slightly higher energy barrier to the first expansion of a freshly packed sample; however, the desorption steps occur at identical pressures for all four runs. (B) The adsorption and desorption pressures are shown as green and red circles, respectively, for 100 $CH_4$ adsorption-desorption cycles in Co(bdp) at 25° C. (C), Excess $CH_4$ adsorption isotherms at 25° C. for Co(bdp) after 0, 25, 50, 75, and 100 cycles of 35 bar adsorption and 5 bar desorption. (D), Excess $CH_4$ isotherms at 25° C. for Co(bdp) before (green) and after (blue) the 100 adsorption-desorption cycles between 35 and 5 bar. Filled and empty circles correspond to adsorption and desorption, respectively.
Figure 23B:
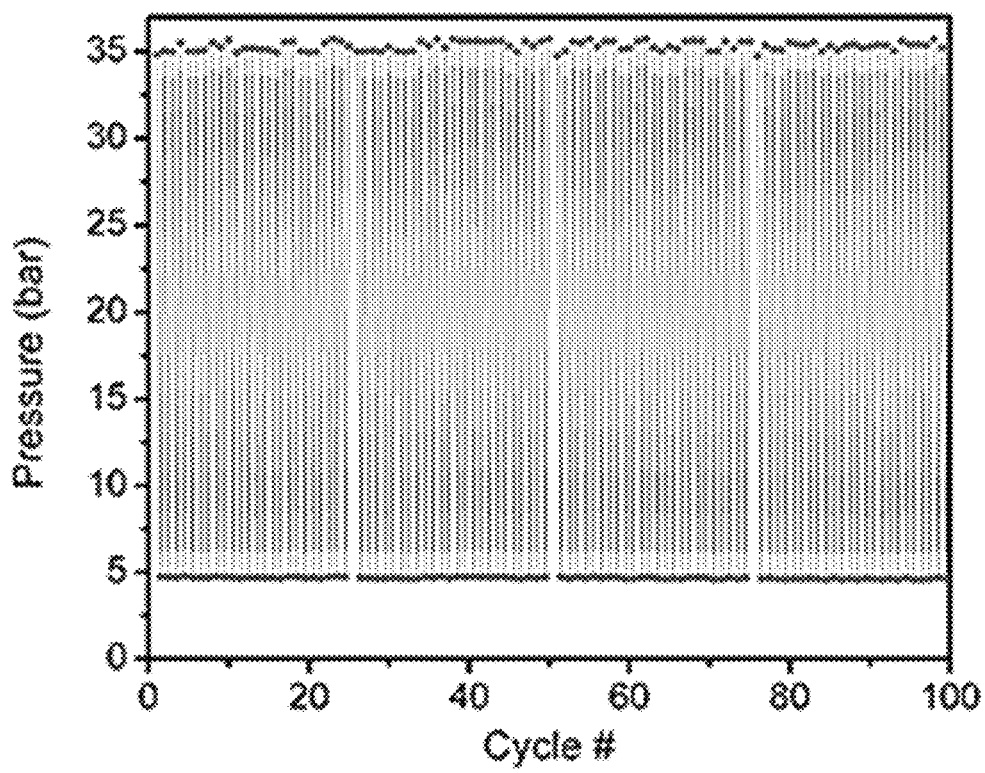
Figure 23C:
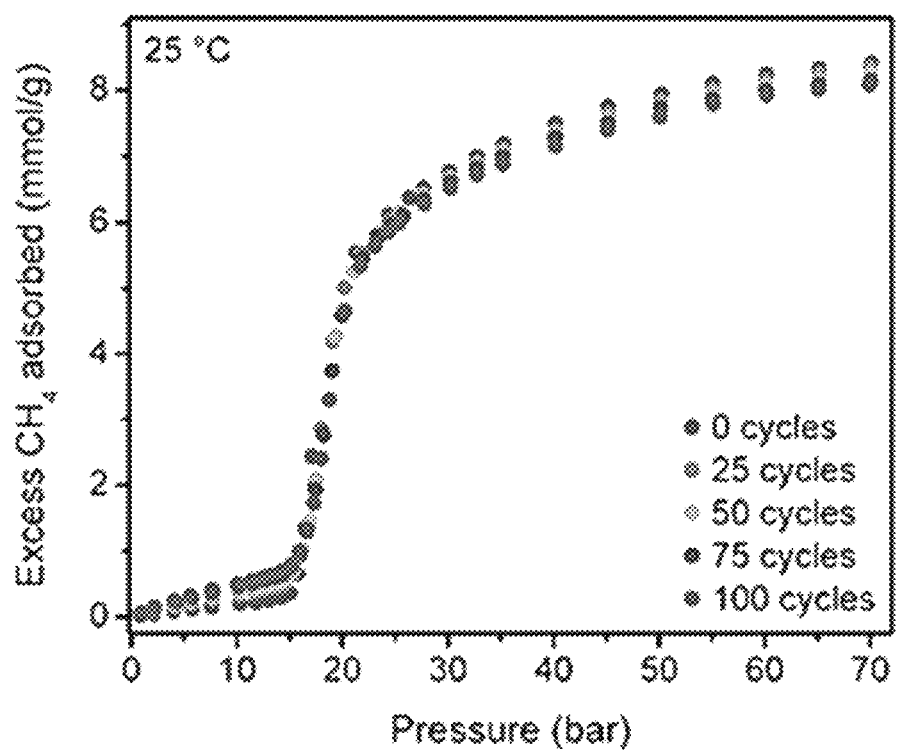
Figure 23D:
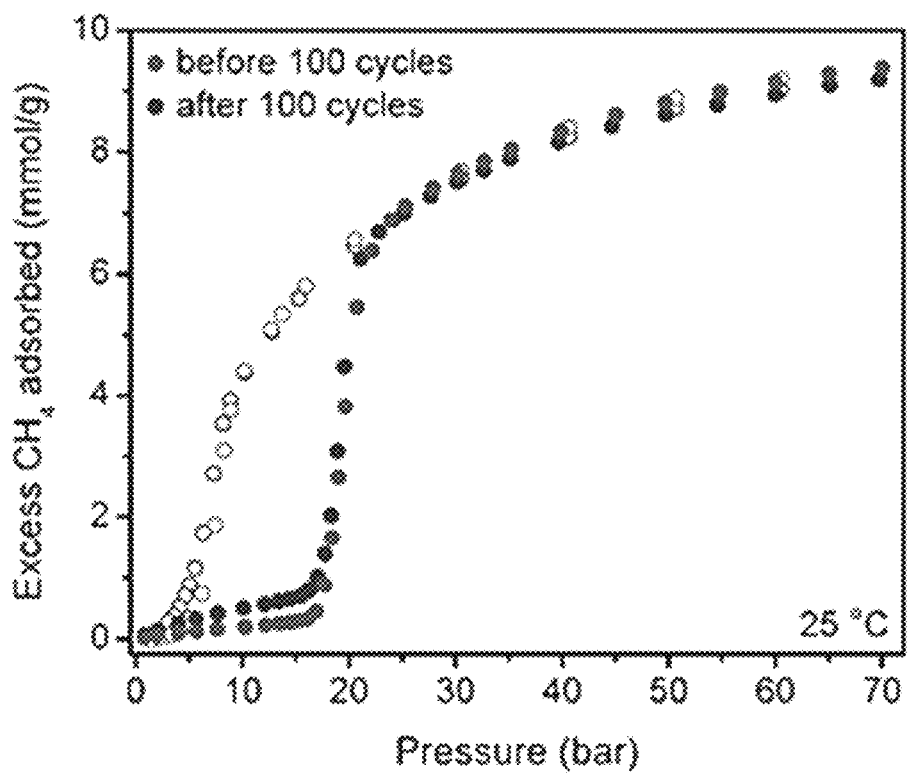

By chemically modifying Co(bdp), it was hypothesized that it might be possible to obtain a new flexible framework with a similar stepped $CH_4$ isotherm, but a higher-energy phase transition that could provide even greater intrinsic heat management. Since one-dimensional chains are known to form with tetrahedral $Fe^{2+}$ ions bridged by $\mu^2$-pyrazolate units, it was anticipated that it might be possible to synthesize an isostructural iron analogue of Co(bdp). By heating $FeCl_2$ and $H_2bdp$ in a mixture of N,N-dimethylformamide (DMF) and methanol, Fe(bdp) was obtained as yellow, block-shaped crystals. X-ray analysis of a DMF-solvated crystal (see FIG. 26) confirmed that Fe(bdp) is isostructural to Co(bdp). Significantly, Fe(bdp) has a stepped high-pressure $CH_4$ isotherm at 25° C. (see FIG. 22D), suggesting that this new compound also undergoes a reversible phase transition between a collapsed and expanded framework. While the total $CH_4$ uptake is comparable to Co(bdp), the adsorption and desorption steps occur at the considerably higher pressures of 24 and 10 bar, respectively, suggesting that replacing Co with Fe has in fact increased the energy of the phase transition.

Figure 24F:
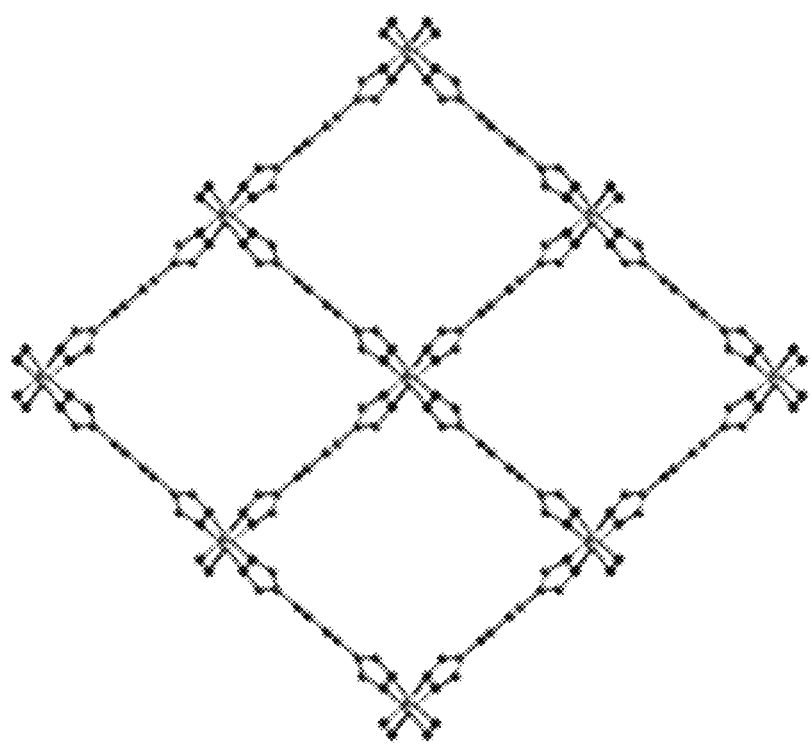

In situ powder X-ray diffraction experiments from 0 to 50 bar of $CH_4$ (see FIG. 24B) and subsequent Rietveld refinements (see FIG. 20) afforded the collapsed and $CH_4$ expanded crystal structures of Fe(bdp). While the collapsed phase is nearly identical to that of Co(bdp) (see FIG. 26), with edge-to-face H—H interactions and no accessible porosity, the volume of the expanded Fe(bdp) phase at 40 bar is 9% greater than that of Co(bdp) (see FIG. 24F). Interestingly, in contrast to Co(bdp), a second transition for Fe(bdp) was observed at pressures above 40 bar, wherein Fe(bdp) slightly expands to a framework with nearly perfect square channels (see FIG. 26). In spite of its greater expansion, and lower crystallographic density, the usable $CH_4$ capacity of Fe(bdp) is still higher than all known adsorbents at 150 and 190 v/v for 35 and 65 bar adsorption, respectively.

Although Fe(bdp) and Co(bdp) have similar 35-bar usable capacities, the Fe(bdp) phase transition offsets more heat, and only 64.3 kJ of heat is released per L of adsorbent during $CH_4$ adsorption, which is 12% lower than for Co(bdp) and 41% lower than for HKUST-1. This is a direct consequence of the larger increase in the enthalpy of Fe(bdp) (8.1 kJ/mol) than of Co(bdp) (7.0 kJ/mol) during the phase transition, which mitigates more heat of adsorption, thereby providing a greater source of intrinsic thermal management. Importantly, this result demonstrates how a slight variation in the metal-organic framework can be used to improve its intrinsic thermal management, and it is very likely that similar effects will prove possible through alteration of the $bdp^{2-}$ bridging ligand.

Examining the temperature dependence of the $CH_4$ isotherms of Co(bdp) and Fe(bdp) reveals yet another advantage of these materials, involving a reduction in the impact of cooling during desorption. Consistent with other gate-opening metal-organic frameworks, the $CH_4$ adsorption and desorption steps in Co(bdp) and Fe(bdp) shift to lower pressures at lower temperatures (see FIG. 27A-B). As long as the temperature stays above 0° C. in Co(bdp) or −25° C. in Fe(bdp), however, the transition to the collapsed phase occurs above 5.8 bar, and the usable $CH_4$ capacity will not be affected by cooling (Tables 3 and 4). This has practical benefits for driving in cold-weather climates and should further reduce the overall thermal management required in an ANG system.

Tuning $CH_4$ Adsorption of Co(Bdp) and Fe(Bdp) by Mechanical Pressure.

It is possible to induce a phase transition in flexible metal-organic frameworks by applying external mechanical pressure. With this in mind, it was hypothesized that applying moderate mechanical pressure could provide a means of further tuning the $CH_4$ adsorption and desorption step pressures in Co(bdp) and Fe(bdp) and of increasing the energy of the phase transition to offset more heat. To investigate this, high-pressure $CH_4$ adsorption isotherms were measured for Co(bdp) at different levels of applied uniaxial mechanical pressure (see FIG. 18).

Figure 19:
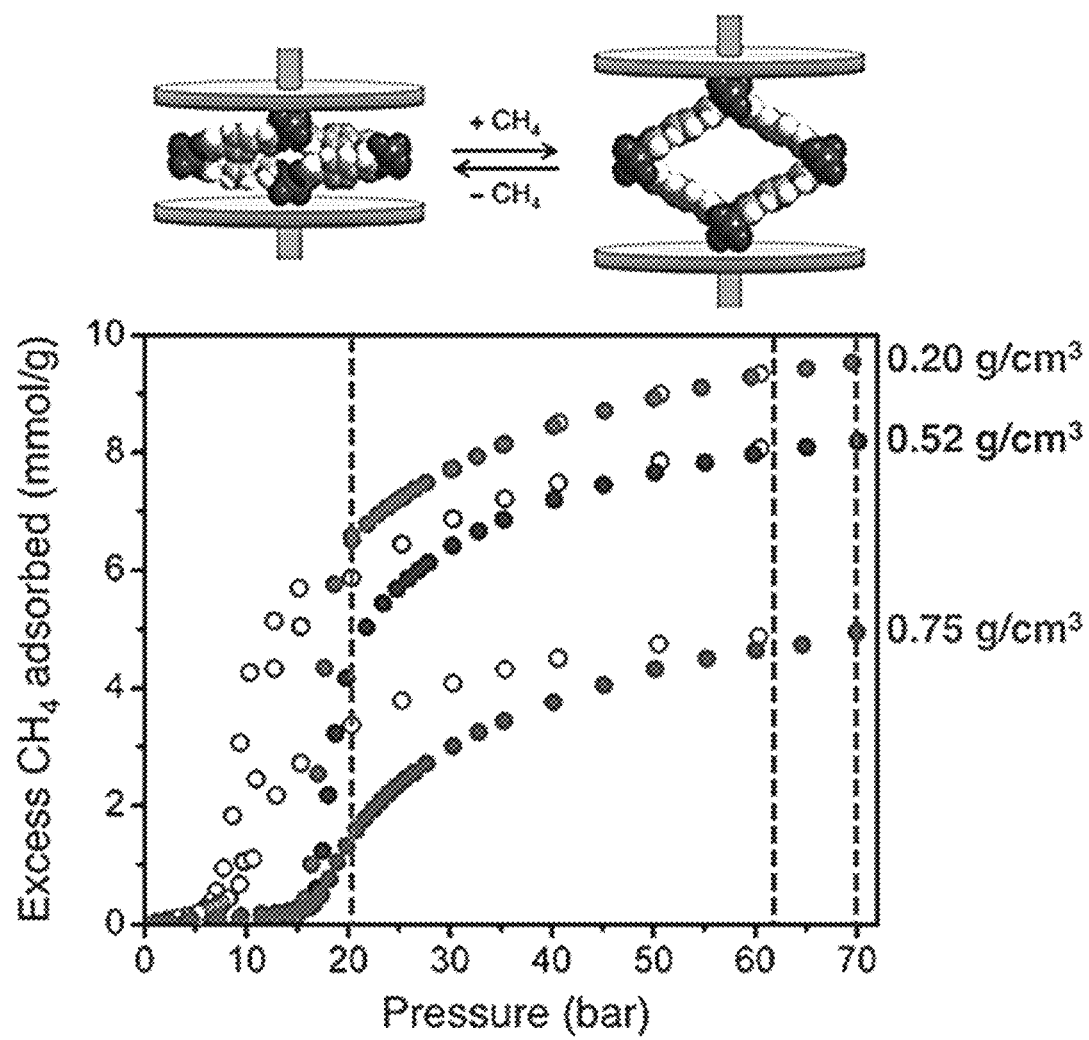
FIG. 19 presents additional mechanical pressure data. Excess $CH_4$ adsorption isotherms for Co(bdp) at 25° C. with different levels of applied external mechanical pressure are shown along with the corresponding bulk powder densities indicated at the right, wherein higher densities indicate greater applied mechanical pressure. The maximum $CH_4$ pressure for which hysteresis is still present is indicated by a colored dashed line for each bulk density. Filled circles represent adsorption, while empty circles represent desorption. In the space-filling models of collapsed and $CH_4$ expanded Co(bdp), purple, gray, blue, and white spheres represent Co, C, N, and H atoms, respectively.
Figure 20B:
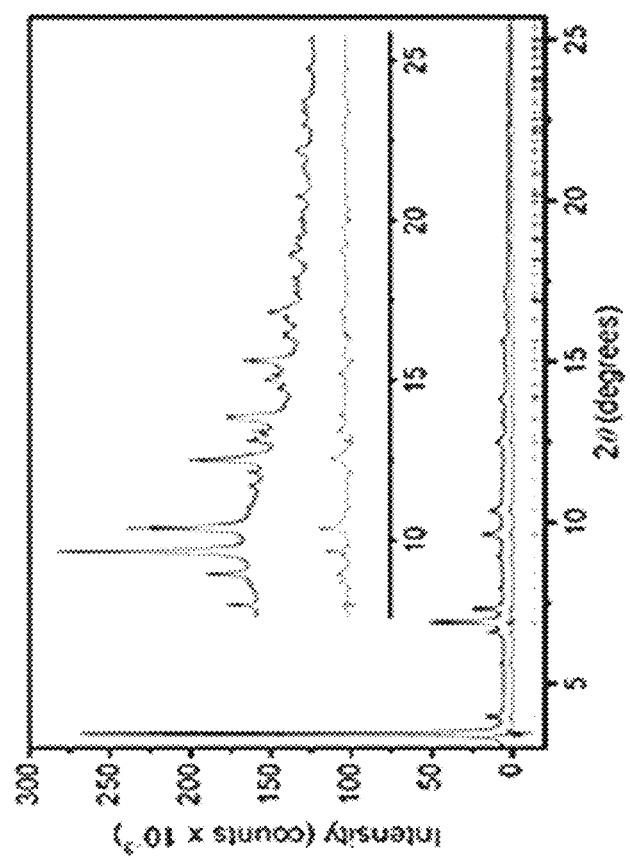
FIG. 20A-F presents powder X-ray diffraction data for Co(bdp) and Fe(bdp). (A)-(D), Rietveld refinements for powder X-ray diffraction data for Co(bdp) at 25° C. and under vacuum with $\lambda=0.77475$ Å (A), for Co(bdp) at 30 bar of $CH_4$ and 25° C. with $\lambda=0.75009$ Å (B), for Fe(bdp) under vacuum at 25° C. with $\lambda=0.72768$ Å (C), and for Fe(bdp) at 40 bar of $CH_4$ and 25° C. with $\lambda=0.72768$ Å. (D) Red and blue lines represent the observed and calculated diffraction patterns, respectively. Gray lines represent the difference between observed and calculated patterns, and tick marks indicate calculated Bragg peak positions. Note that the broad hump observed at 10° in the diffraction patterns is due to diffuse scattering from the sample holder (a thick-walled quartz glass capillary). (E) Powder X-ray diffraction data for Fe(bdp) at 50 bar of $CH_4$ and 25° C. ($\lambda=0.72768$ Å). Green tick marks indicate Bragg angles for space group-permitted reflections, and the corresponding Miller indices are indicated for the most prominent peaks. Blue arrows indicate broad humps where multiple reflections overlap. (F) The percentage of the expanded phase of Co(bdp) that is present in the variable pressure experimental powder X-ray diffraction patterns is plotted as a function of $CH_4$ pressure. The filled squares represent data collected during adsorption, while the empty squares represent data collected during desorption.
Figure 20A:
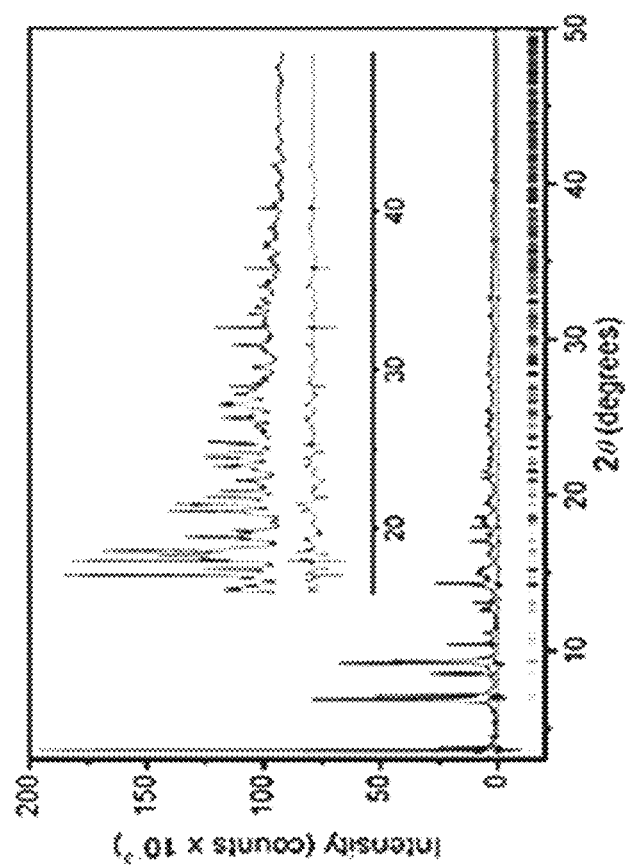
Figure 20D:
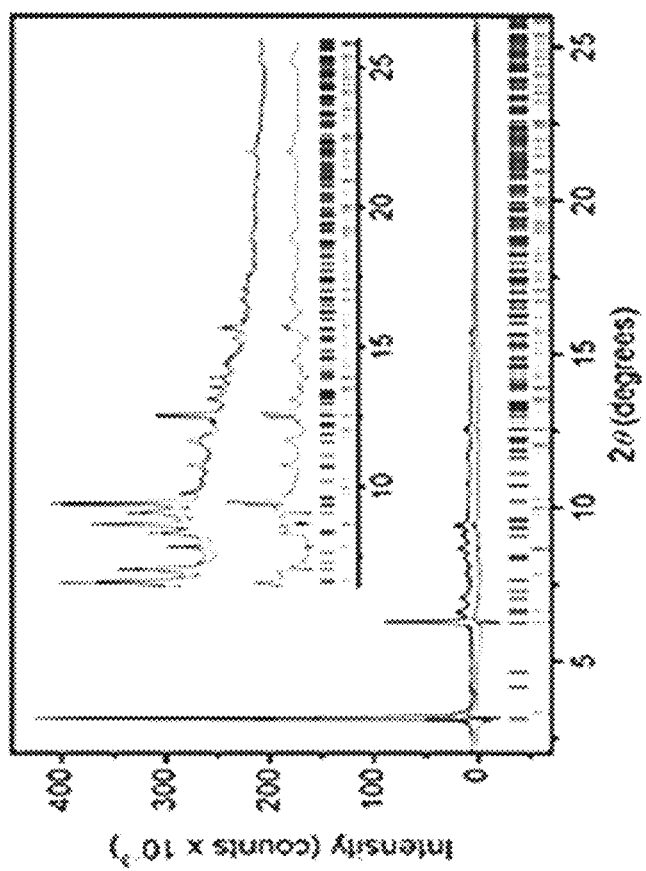
Figure 20C:
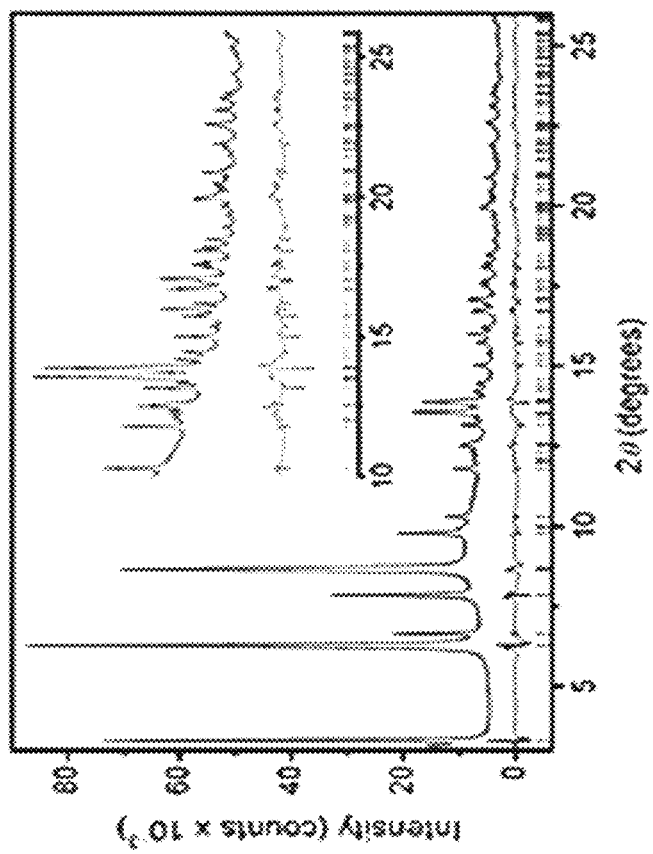
Figure 20F:
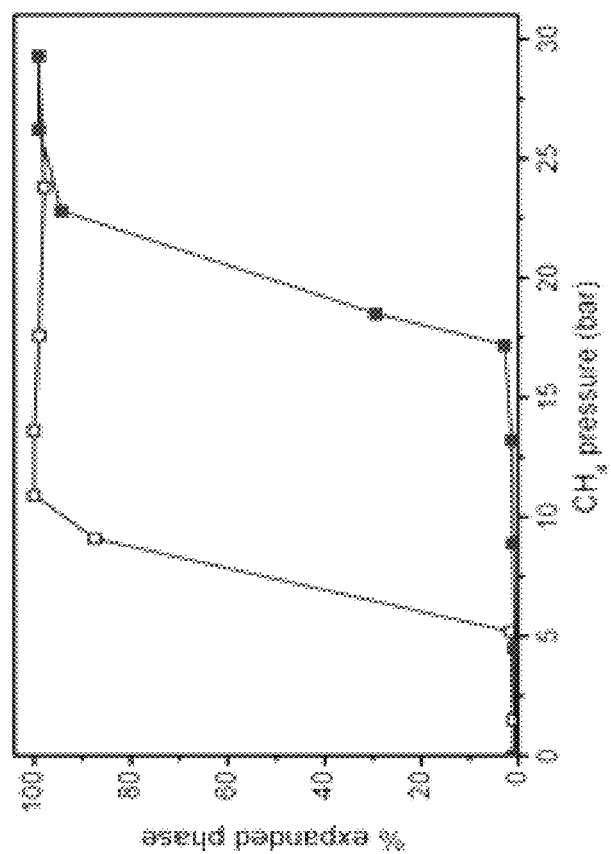
Figure 20E:
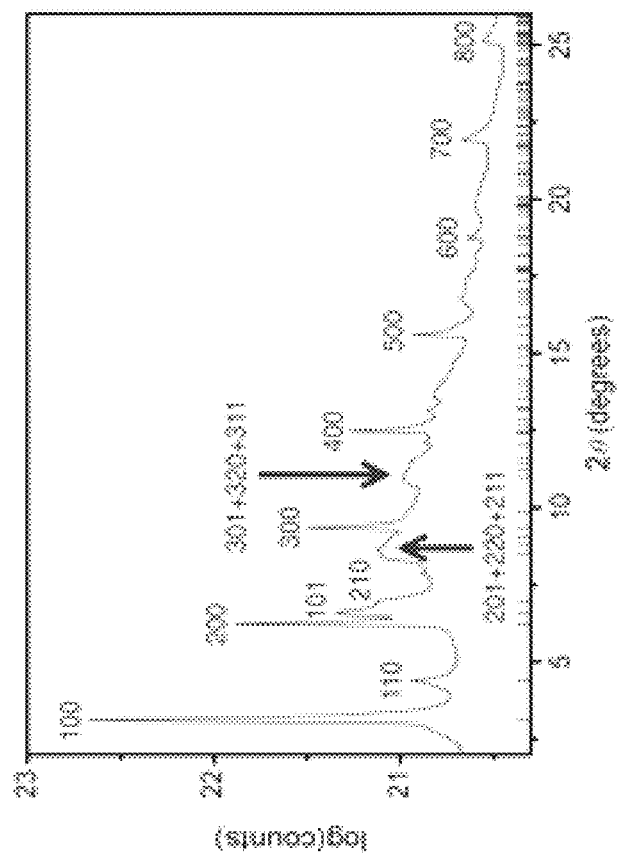

At higher mechanical pressures and higher compaction densities, both the adsorption and desorption isotherm steps shift to higher $CH_4$ pressures, which is consistent with an increase in the energy of the phase transition (see FIG. 19). In addition, the isotherm hysteresis loop remains opened until higher $CH_4$ pressures, with hysteresis observed to at least 70 bar for the highest applied mechanical pressure. Since hysteresis at a given pressure implies that a phase transition is still occurring, this result suggests that some Co(bdp) crystallites are expanding at much higher $CH_4$ pressures when under an applied external mechanical pressure. Because Co(bdp) crystallites in a bulk powder will be at different orientations with respect to the direction of uniaxial compression (see FIG. 21), there will be a distribution of local mechanical pressures experienced by different crystallites. Crystallites that experience higher external pressures will have a greater free energy change associated with the phase transition and open at higher pressures. Overall, these results present the tantalizing prospect of using mechanical work, such as perhaps provided through an elastic bladder, as a means of thermal management in a gas storage system based upon a flexible adsorbent.

The foregoing results demonstrate the extraordinary potential of the metal-organic frameworks Co(bdp) and Fe(bdp) as adsorbents for methane storage. Designing new flexible adsorbents with stronger gas binding sites and higher-energy phase transitions provides a promising route to achieving even higher usable capacities and greater intrinsic heat management in a next generation of gas storage materials. Moreover, clever compaction and packing strategies should allow further reductions to external thermal management requirements and optimization of the overall storage system performance.

A number of embodiments have been described herein. Nevertheless, it will be understood that various modifications may be made without departing from the spirit and scope of this disclosure. Accordingly, other embodiments are within the scope of the following claims.

What is claimed is:

1. An adsorbent having a stepped isotherm comprising a flexible metal-organic framework which has repeating cores comprising the formula M-L-M, wherein L is a linking moiety comprising a structure of Formula I:

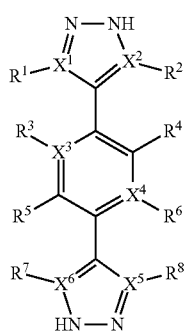

Formula I wherein, $X^1$-$X^6$ are each independently a C or a N;

$R^1$-$R^2$ and $R^7$-$R^8$ are each independently selected from the group consisting of H, D, optionally substituted $C_1$-$C_3$ alkyl, optionally substituted $C_1$-$C_3$ alkenyl, halo, hydroxyl, aldehyde, carboxyl, amine, nitrile, azide, and nitro;

$R^3$-$R^6$ are each independently selected from the group consisting of H, D, FG, optionally substituted ($C_1$-$C_{12}$) alkyl, optionally substituted hetero-($C_1$-$C_{12}$)alkyl, optionally substituted ($C_2$-$C_{12}$)alkenyl, optionally substituted hetero-($C_1$-$C_{12}$)alkenyl, optionally substituted ($C_2$-$C_{12}$)alkynyl, optionally substituted hetero-($C_2$-$C_{12}$)alkynyl, optionally substituted cycloalkyl, optionally substituted cycloalkenyl, optionally substituted aryl, optionally substituted heterocycle, optionally substituted mixed ring system, —C($R^{11}$)$_3$, —CH($R^{11}$)$_2$, —CH$_2$$R^{11}$, —C($R^{12}$)$_3$, —CH($R^{12}$)$_2$, —CH$_2$$R^{12}$, —OC($R^{11}$)$_3$, OCH($R^{11}$)$_2$, —OCH$_2$$R^{11}$, —OC($R^{12}$)$_3$, —OCH($R^{12}$)$_2$, OCH$_2$$R^{12}$, and adjacent R groups can be linked together to form an optionally substituted ring;

$R^{11}$ is selected from the group consisting of FG, optionally substituted ($C_1$-$C_{12}$)alkyl, optionally substituted hetero-($C_1$-$C_{12}$)alkyl, optionally substituted ($C_1$-$C_{12}$) alkenyl, optionally substituted hetero-($C_1$-$C_{12}$)alkenyl, optionally substituted ($C_1$-$C_{12}$)alkynyl, optionally substituted hetero-($C_1$-$C_{12}$)alkynyl; and $R^{12}$ is selected from the group consisting of cycloalkyl, aryl and heterocycle; and wherein M is selected from the group consisting of $Be^{2+}$, $Mg^{2+}$, $Ca^{2+}$, $Sr^{2+}$, $Ba^{2+}$, $Sc^{2+}$, $Y^{2+}$, $Ti^{2+}$, $Zr^{2+}$, $V^{2+}$, $Nb^{2+}$, $Ta^{2+}$, $Cr^{2+}$, $Mo^{2+}$, $W^{2+}$, $Re^{2+}$, $Fe^{2+}$, $Ru^{2+}$, $Os^{2+}$, $Rh^{2+}$, $Ir^{2+}$, $Ni^{2+}$, $Pd^{2+}$, $Pt^{2+}$, $Cu^{2+}$, $Ag^{2+}$, $Au^{2+}$, $Hg^{2+}$, $Al^2$, $In^{2+}$, $Si^{2+}$, $Ge^{2+}$, $Sn^{2+}$, $Pb^{2+}$, $As^{2+}$, $Te^{2+}$, $La^{2+}$, $Ce^{2+}$, $Pr^{2+}$, $Nd^{2+}$, $Sm^{2+}$, $Eu^{2+}$, $Gd^{2+}$, $Tb^{2+}$, $Db^{2+}$, $Tm^{2+}$, $Yb^{2+}$, $La^{2+}$, and combinations thereof, including any complexes which contain the metals or metal ions, as well as any corresponding metal salt counter-anions;

wherein tetrahedrally or pseudo-tetrahedrally M is bridged by $\mu^2$-pyrazolate units of L; and wherein M is selected from the croup consisting of $Mg^{2+}$, $Ca^{2+}$, $Ba^{2+}$, $Zr^{2+}$, $V^{2+}$, $Cr^{2+}$, $Mo^{2+}$, $W^{2+}$, $Fe^{2+}$, $Ni^{2+}$, $Cu^{2+}$, and $Ce^{2+}$.

2. The adsorbent of claim 1, wherein L comprises a structure of Formula I(a):

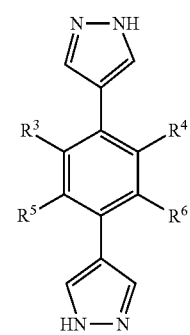

Formula I(a)

wherein, $R^3$-$R^6$ are each independently selected from the group consisting of H, D, halos, hydroxyls, carboxyls, carbonates, carboxylates, aldehydes, esters, ethers, amines, amides, azides, nitriles, sulfides, nitros, optionally substituted ($C_1$-$C_6$)alkyl, optionally substituted hetero-($C_1$-$C_6$)alkyl, optionally substituted ($C_2$-$C_6$)alkenyl, optionally substituted hetero-($C_1$-$C_6$)alkenyl, optionally substituted ($C_2$-$C_6$)alkynyl, optionally substituted hetero-($C_2$-$C_6$)alkynyl.

3. The adsorbent of claim 2, wherein L comprises a structure of Formula I(b):

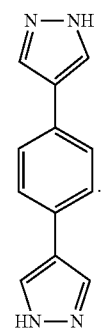

Formula I(b)

4. The adsorbent of claim 1, wherein M is $Fe^{2+}$.

5. A gas storage device comprising an adsorbent of claim 1.

6. The gas storage device of claim 5, wherein L is a linking moiety comprising a structure of Formula I(b)

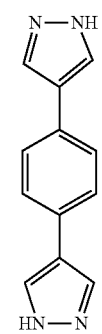

Formula I(b)

and wherein M is selected from the group consisting of $Mg^{2+}$, $Ca^{2+}$, $Ba^{2+}$, $Zr^{2+}$, $V^{2+}$, $Cr^{2+}$, $Co^{2+}$, $Mo^{2+}$, $W^{2+}$, $Fe^{2+}$, $Ni^{2+}$, $Cu^{2+}$, and $Ce^{2+}$.

7. The adsorbent of claim 1, wherein the adsorbent's volumetric usable capacity is (i) not significantly reduced when there is a minimum desorption pressure requirement, (ii) not significantly reduced due to heat released during adsorption of the one or more gases to the adsorbent, and/or (iii) is not significantly reduced due to cooling resulting from de-adsorption of the one or more gases from the adsorbent.

8. The adsorbent of claim 1, wherein the minimum desorption pressure requirement is around 5.8 bar and the one or more gases is a natural gas.

9. The absorbent or device of claim 8, wherein natural gas is adsorbed under an adsorption pressure between 35 and 65 bar.

10. The device of claim 5, wherein the one or more gases are selected from natural gas, hydrogen or methane.

11. The device of claim 5, wherein the device is a fuel tank or fuel cylinder.

12. The device of claim 11, wherein the fuel tank or fuel cylinder delivers stored natural gas, methane or hydrogen to a combustion engine.

13. An automobile, bus, or truck comprising the device of claim 11.

14. A method to reversibly store one or more gases comprising contacting the one or more gases with the adsorbent of claim 1.

15. The method of claim 14, wherein L comprises a structure of Formula I(a):

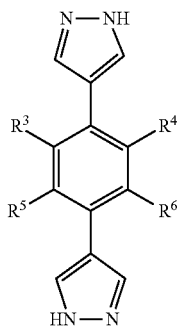

Formula I(a)

wherein, $R^3$-$R^6$ are each independently selected from the group consisting of H, D, halos, hydroxyls, carboxyls, carbonates, carboxylates, aldehydes, esters, ethers, amines, amides, azides, nitriles, sulfides, nitros, optionally substituted ($C_1$-$C_6$)alkyl, optionally substituted hetero-($C_1$-$C_6$)alkyl, optionally substituted ($C_2$-$C_6$)alkenyl, optionally substituted hetero-($C_1$-$C_6$)alkenyl, optionally substituted ($C_2$-$C_6$)alkynyl, optionally substituted hetero-($C_2$-$C_6$)alkynyl.

16. The method of claim 15, wherein L comprises a structure of Formula I(b):

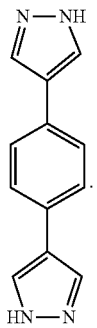

Formula I(b)

17. The method claim 14, wherein M is selected from the group consisting of $Mg^{2+}$, $Ca^{2+}$, $Ba^{2+}$, $Zr^{2+}$, $V^{2+}$, $Cr^{2+}$, $Mo^{2+}$, $W^{2+}$, $Fe^{2+}$, $Ni^{2+}$, $Cu^{2+}$, $Co^{2+}$ and $Ce^{2+}$.

18. The method of claim 17, wherein M is $Fe^{2+}$ or $Co^{2+}$.

19. The method claim 14, wherein the one or more gases are selected from natural gas, hydrogen or methane.

* * * * *